US008758874B2

(12) United States Patent
Taketa et al.

(10) Patent No.: US 8,758,874 B2
(45) Date of Patent: Jun. 24, 2014

(54) PREPREG BASE MATERIAL, LAYERED BASE MATERIAL, FIBER-REINFORCED PLASTIC, PROCESS FOR PRODUCING PREPREG BASE MATERIAL, AND PROCESS FOR PRODUCING FIBER-REINFORCED PLASTIC

(71) Applicant: Toray Industries, Inc., Tokyo (JP)

(72) Inventors: Ichiro Taketa, Ehime (JP); Narumichi Sato, Ehime (JP); Eisuke Wadahara, Ehime (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 13/708,127

(22) Filed: Dec. 7, 2012

(65) Prior Publication Data

US 2013/0095282 A1    Apr. 18, 2013

Related U.S. Application Data

(62) Division of application No. 12/524,958, filed as application No. PCT/JP2008/051342 on Jan. 30, 2008, now Pat. No. 8,354,156.

(30) Foreign Application Priority Data

Feb. 2, 2007    (JP) ................... 2007-023868
Feb. 2, 2007    (JP) ................... 2007-023870

(51) Int. Cl.
  *B32B 5/12*  (2006.01)
  *B32B 3/26*  (2006.01)
  *B29C 43/20* (2006.01)

(52) U.S. Cl.
  USPC ........... 428/113; 428/157; 428/167; 428/220; 428/292.1; 428/295.4; 428/364; 428/374; 428/401; 442/59; 442/181; 442/189; 442/304

(58) Field of Classification Search
  USPC ........... 428/113, 157, 167, 220, 292.1, 295.4, 428/364, 374, 401; 442/59, 181, 189, 304, 442/308

See application file for complete search history.

(56) References Cited

U.S. PATENT DOCUMENTS 3,448,502 A    6/1969  Tesch
4,464,087 A    8/1984  Muller (Continued)

FOREIGN PATENT DOCUMENTS

GB    2 438 715 A    5/2007
JP    63-247012 A    10/1988

(Continued)

OTHER PUBLICATIONS

The Korean Office Action issued on Jan. 7, 2014 in corresponding Korean Application No. 10-2009-7010863.

*Primary Examiner* — Brent O'Hern
(74) *Attorney, Agent, or Firm* — DLA Piper LLP (US)

(57) ABSTRACT

A laminated base material includes a lamination and integration of prepreg base materials each of which includes many reinforcing fibers arranged substantially in one direction and a matrix resin adhered to the reinforcing fibers, wherein at least one of the laminated prepreg base materials is formed with a prepreg base material having, throughout its whole surface, many incisions each extending in a direction crossing the reinforcing fibers, substantially all of the reinforcing fibers divided by incisions, and wherein a length L of each of reinforcing fiber segments formed by the incisions is 10 to 100 mm, a thickness H of the prepreg base material is 30 to 300 μm, and a fiber volume content Vf of the reinforcing fibers is 45 to 65% and arranging directions of the reinforcing fibers between one and another laminated prepreg base materials have at least two directions different each other.

7 Claims, 17 Drawing Sheets

(56) References Cited

U.S. PATENT DOCUMENTS

| | | |
|---|---|---|
| 4,990,207 A * | 2/1991 | Sakai et al. .................. 156/242 |
| 4,992,127 A | 2/1991 | Kishi et al. |
| 5,104,718 A | 4/1992 | Asada et al. |
| 6,421,924 B2 | 7/2002 | Anderson et al. |
| 6,454,893 B1 | 9/2002 | McKague, Jr. |

FOREIGN PATENT DOCUMENTS

| | | |
|---|---|---|
| JP | 1-289837 A | 11/1989 |
| JP | 2-115236 A | 4/1990 |
| JP | 9-254227 A | 9/1997 |

\* cited by examiner

PREPREG BASE MATERIAL, LAYERED BASE MATERIAL, FIBER-REINFORCED PLASTIC, PROCESS FOR PRODUCING PREPREG BASE MATERIAL, AND PROCESS FOR PRODUCING FIBER-REINFORCED PLASTIC

RELATED APPLICATIONS

This is a divisional of U.S. Ser. No. 12/524,958, filed Jul. 29, 2009, now U.S. Pat. No. 8,354,156, which is a §371 of International Application No. PCT/JP2008/051342, with an international filing date of Jan. 30, 2008 (WO 2008/099670 A1, published Aug. 21, 2008), which is based on Japanese Patent Application Nos. 2007-023868, filed Feb. 2, 2007, and 2007-023870, filed Feb. 2, 2007, the subject matter of which is incorporated herein by reference.

TECHNICAL FIELD

This disclosure relates to a prepreg base material comprising many reinforcing fibers and a matrix resin. This disclosure also relates to a laminated base material in the form of a laminate of several reinforcing fiber sheets at least some of which comprise the prepreg base material. This disclosure further relates to a fiber-reinforced plastic produced by molding the laminated base material. Furthermore, this disclosure also relates to a production process for the prepreg base material and a production process for the fiber reinforced plastic.

When the prepreg base material is molded into a fiber reinforced plastic, reinforcing fibers show a high flowability attributable to flow of a matrix resin, resulting in a highly flexible shaping ability which serves to produce moldings in a desired shape. If a laminated product of reinforcing fibers sheets at least some of which comprise the prepreg base material is used to produce fiber reinforced plastic moldings, the resulting moldings will have good dynamic physical properties and serve in manufacturing various structural members. Such moldings will be small in non-uniformity of mechanical characteristics and therefore they will have a high dimensional stability. The fiber-reinforced plastic will serve effectively in manufacturing, for instance, automobile members, sports tools, etc.

BACKGROUND

A fiber reinforced plastic comprising reinforcing fibers and a matrix resin generally have a high specific strength, high specific modulus and good mechanical characteristics, as well as good functional characteristics such as high weather resistance and chemical resistance. Therefore increasing attention has been focused on them in various industrial fields and demands for them are mounting in recent years.

As a molding method for a fiber reinforced plastic having good functional characteristics, there is an autoclave molding method in which prepregs, i.e., semicured basic elements (prepreg sheets) comprising continuous reinforcing fibers impregnated with a matrix resin, are laminated, followed by heating and pressing in a high-temperature, high-pressure vessel for curing of the matrix resin to provide a molded fiber reinforced plastic. The autoclave molding method is used commonly.

As another molding method for a fiber reinforced plastic, there is an RTM (resin transfer molding) method in which, to improve the production efficiency, a basic element (preform) comprising continuous reinforcing fibers and having a form shaped to a form of a member being produced is impregnated with a matrix resin and then cured.

Fiber reinforced plastics produced by these molding methods have good mechanical properties because the reinforcing fibers are in a continuous form. In addition, because the continuous fibers are arranged regularly, the fiber-reinforced plastics can be designed to have required mechanical properties by laminating base materials in proper arrangements. Moreover, the resulting fiber reinforced plastics have small variation in mechanical properties. On the other hand, the use of continuous fibers makes it difficult to produce a product in a complicated shape such as three-dimensional ones, and therefore, these molding methods have been used almost exclusively for producing products in a nearly planar shape.

A molding method called an SMC (sheet molding compound) molding method is useful to produce moldings in a three-dimensional or other complicated shape. In the SMC molding method, chopped strands of reinforcing fibers, commonly having a length of about 25 mm, are impregnated with a thermosetting matrix resin to provide SMC sheets in a semicured state, which will be molded by heating and pressing in a heating-pressing machine. In many cases, SMC sheets are cut before pressing to a size smaller than a form of a molding and put on a mold, and the cut SMC sheets having the small sizes are extended (i.e., made to flow) in the molding method. Thus, the flow of the matrix resin and many cut reinforcing fibers serves to achieve the ability of flexible shaping into a three-dimensional or other shape.

However, the SMC molding method inevitably gives rise to irregular distribution and irregular orientation of chopped strands during the SMC sheet production step, leading to moldings having poor mechanical properties or a large variation in them. Furthermore, such irregular distribution and irregular orientation of chopped strands tends to result in warp, surface sinks, etc., in thin moldings in particular. Such moldings will not serve effectively for some structural uses.

To eliminate such defects in the aforementioned materials, JP 63-247012 A and JP 09-254227 A have disclosed prepreg base materials in a form of a prepreg sheet comprising continuous fibers and a thermoplastic resin in which incisions are made to sever the continuous fibers to allow the fibers to flow and to provide molding having a decreased variation in mechanical properties.

However, although moldings produced from the prepreg base materials having the incisions have largely improved mechanical characteristics with a decreased variation as compared with those produced by the SMC molding method, they cannot be said to have a sufficient strength to serve as structural members. As compared with prepreg base materials comprising continuous fibers, the incisions contained in the prepreg base materials act as defects where stress concentrates to cause destruction in the resulting moldings, causing, in particular, problems such as a decrease in tensile strength and tension fatigue strength of the moldings.

It could therefore be helpful to provide a prepreg base material that comprises reinforcing fibers maintaining a high flowability during a molding process and has a flexible shaping ability to form a molding in a complicated shape. It could also be helpful to provide a laminated base material comprising reinforcing fiber sheets at least some of which are the prepreg base material and a fiber-reinforced plastic that are produced by molding a laminated base material. It could still further be helpful to provide a process to produce the prepreg base material and a process to produce a fiber reinforced plastic from the prepreg base material.

SUMMARY

Our prepreg base material is a prepreg base material comprising many reinforcing fibers arranged substantially in one direction and a matrix resin adhered to the reinforcing fibers, wherein many incisions, each in a direction across the reinforcing fibers, are provided over the entire face of the prepreg base material so that substantially all of the reinforcing fibers are cut into reinforcing fiber segments with a length L in the range of 10 to 100 mm while the thickness H of the prepreg base material and the volume fraction Vf of the reinforcing fibers in the prepreg base material are maintained in the range of 30 to 300 µm and 45 to 65%, respectively.

In the prepreg base material, it is preferred that each of the incisions is in the form of a slit segment with a certain length, and that when the slit segment is projected in the orientation direction of the reinforcing fibers, a projected length Ws of the slit segment in the perpendicular direction to the orientation of the reinforcing fibers is in the range of 1 to 10 mm while the thickness H of the prepreg base material is maintained in the range of 30 to 150 µm. This aspect of the prepreg base material is hereinafter referred to as a constant-length incision prepreg base material.

In the prepreg base material, it is preferred that each of the incisions is in the form of a slit segment with a certain length, and that when the slit segment is projected in the orientation direction of the reinforcing fibers, the projected length Ws of the slit segment in the perpendicular direction to the orientation of the reinforcing fibers is in the range of 30 µm to 1.5 mm. This aspect of the prepreg base material is hereinafter referred to as a constant-length incision prepreg base material.

In the prepreg base material, it is preferred that the slit segments are aligned along at least three straight lines running in the same direction to form at least three rows and also that all intervals between the rows of slit segments in the orientation direction of the reinforcing fibers are the same.

In the prepreg base material, it is preferred that the slit segments are aligned at an oblique angle to the perpendicular direction to the orientation of the reinforcing fibers. This aspect of the prepreg base material is referred to as an oblique incision prepreg base material.

In the prepreg base material, it is preferred that the slit segments are formed from the top and bottom faces of the prepreg base material in the thickness direction of the prepreg base material without penetrating the prepreg base material, that the cut depth Hs of the slit segments is in the range of 0.4 to 0.6 times the thickness H of the prepreg base material, that the interval La between any slit segment A in the top face and another slit segment B in the top face adjacent to the slit segment A in the orientation direction of the reinforcing fibers is in the range of 10 to 100 mm, that a slit segment C exists in the bottom face with its geometrical center located at the point where its distance measured from the slit segment A toward the slit segment B in the orientation direction of the reinforcing fibers is 0.4 to 0.6 times La, that part of the reinforcing fibers existing between the slit segment A and the slit segment B in the top face are cut by both the slit segment A in the top face and the slit segment C in the bottom face or both the slit segment B in the top face and the slit segment C in the bottom face, and that all slit segments in the top face and/or all slit segments in the bottom face have the same geometrical shape. This aspect of the prepreg base material is referred to as a two-face incision prepreg base material.

If the slit segments in the prepreg base material are inclined with an inclination angle Θa in the thickness direction of the prepreg base material, with a distance S between the cut line of a slit in the reinforcing fibers in the top face of the prepreg base material and that of the slit in the bottom face, measured in the orientation direction of the reinforcing fibers, then the inclination angle Θa determined by the following equation (Formula I) from the distance S and the thickness H of the prepreg base material should preferably be in the range of 1 to 25°:

$$\Theta a = \tan^{-1}\left(\frac{H}{S}\right).\qquad\text{Formula I}$$

This aspect of the prepreg base material is referred to as a sloped incision prepreg base material.

In the prepreg base material, it is preferred that the absolute value of an oblique angle Θb of each of the incisions in the faces of the prepreg base material from the orientation direction of the reinforcing fibers is in the range of 2 to 25°. This aspect of the prepreg base material is referred to as a specific-angle oblique incision prepreg base material.

In the prepreg base material, it is preferred that each of the incisions is continuous over the total width of the prepreg base material. This aspect of the prepreg base material is referred to as a specific-angle oblique continuous incision prepreg base material.

In the prepreg base material, it is preferred that each of the incisions is in the form of a slit segment with a certain length, and that when the slit segment is projected in the orientation direction of the reinforcing fibers, the projected length Ws of the slit segment in the perpendicular direction to the orientation of the reinforcing fibers is in the range of 30 µm to 100 mm and the slit segment has the same geometrical shape as that of the slit segment that is adjacent to the former in the orientation direction of the reinforcing fibers. This aspect of the prepreg base material is referred to as a specific-angle oblique constant-length incision prepreg base material.

In the prepreg base material, it is preferred that each of the incisions is linear and that all of the reinforcing fiber segments have substantially the same length L. This aspect of the prepreg base material is referred to as a linear oblique incision prepreg base material.

A laminated base material is a laminated base material produced by combining more than one prepreg base material layer into one plate, each prepreg base material layer comprising a large number of reinforcing fibers oriented substantially in one direction and a matrix resin adhered to the reinforcing fibers, wherein at least some of the combined prepreg base material layers are the prepreg base material, the combined prepreg base material layers comprising bundles of reinforcing fibers oriented in at least two different orientation directions.

A laminated base material is a laminated base material produced by combining more than one prepreg base material layers into one plate, each prepreg base material layer comprising a large number of reinforcing fibers oriented substantially in one direction and a matrix resin adhered to the reinforcing fibers, wherein at least two of the combined prepreg base material layers are the constant-length incision prepreg base material adjacent to each other, the reinforcing fibers in the two adjacent prepreg base material layers being oriented in substantially the same direction, the slit segments in the two adjacent prepreg base material layers being aligned at regular intervals in the orientation direction of the reinforcing fibers, and the positions of the slit segments in one of the two adjacent prepreg base material layers being shifted in the orientation direction of the reinforcing fibers relative to the positions of the slit segments in the other prepreg base material layer.

A fiber reinforced plastic is a fiber reinforced plastic comprising a matrix resin and a laminate produced by combining more than one reinforcing fiber layer of reinforcing fibers oriented substantially in one direction wherein at least two of the reinforcing fiber layers are combined with their reinforcing fibers orientated in different directions, the fiber volume fraction Vf being in the range of 45 to 65%, at least one of the fiber-resin layers, each comprising one aforementioned reinforcing fiber layer and the accompanying matrix resin, having more than one incised opening, scattered over the entire face of the layer, that is free of the reinforcing fibers and contains the matrix resin or the reinforcing fibers of the adjacent layer, the incised opening cutting the reinforcing fibers into segments, the reinforcing fiber segments of the cut reinforcing fibers having a length L of 10 to 100 mm, the total area of the incised openings at the face of the layer accounting for 0.1 to 10% of the total surface area of the layer, and the layer having an average thickness Hc of 15 to 300 μm.

A prepreg base material production process comprises a step to prepare a preliminary prepreg by orienting a large number of reinforcing fibers in one direction and impregnating them with a matrix resin and another step to incise the preliminary prepreg by pressing a rotary blade roller, which includes a helical blade provided on the external surface of a roller, against the preliminary prepreg to cut the reinforcing fibers.

A fiber reinforced plastic production process comprises putting the laminated base material in a molding die, maintaining the charge rate of the laminated base material at 50 to 95%, and press-molding the laminated base material.

The prepreg base material comprises many reinforcing fiber segments arranged in one direction and having a length L of 10 to 100 mm, and a matrix resin. A thickness H of the prepreg base material is in the range of 30 to 300 μm and a fiber volume content Vf of the reinforcing fibers in the prepreg base material is in the range of 45 to 65%. Accordingly, where a fiber-reinforced plastic is produced by molding such prepreg base material, the reinforcing fiber segments can flow smoothly as the matrix resin flows during the molding step. Thus, the reinforcing fibers in the prepreg base material show a high flowability during the molding step for a fiber reinforced plastic. As a result, when a fiber reinforced plastic having a complicated shape is to be produced, a highly flexible shaping ability can be achieved to fit to a molding shape. The fiber-reinforced plastic thus produced will have good mechanical properties with little variation, and good dimensional stability.

REFERENCE SIGNS LIST

Figure 1:
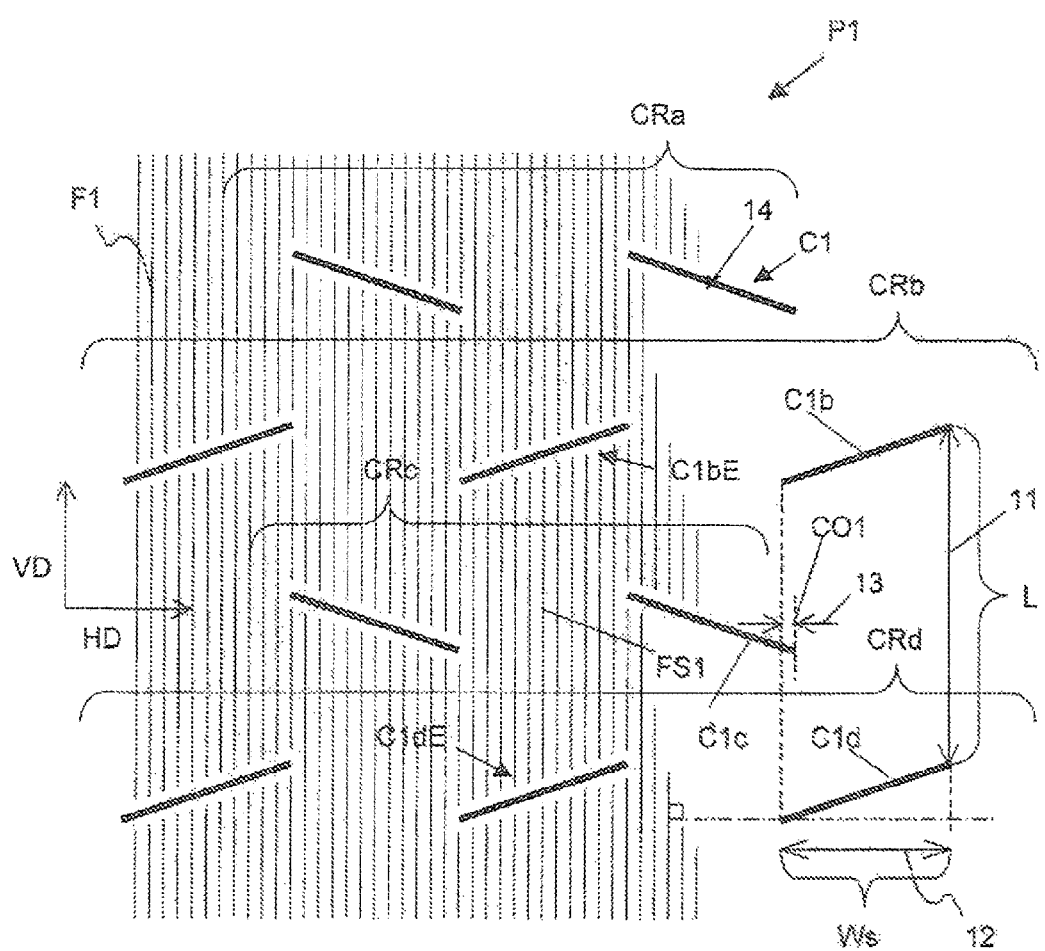
FIG. 1 shows a plan view of an aspect of the prepreg base material.

C: incision or slit segment
CA: cutting device of reinforcing fibers
CE: cut edge of reinforcing fibers
CO: overlap portion of incisions
CP: incision pattern
CR: incision row
F: reinforcing fibers
FP: fiber-reinforced plastic (molding)
FS: reinforcing fiber segment
H: thickness of prepreg base material
HD: horizontal direction
Hs: incised depth of incision
L: length of fiber segment
La: distance between adjacent incisions in fiber arranging direction
LB: laminated base material
P: prepreg base material
RP: elemental prepreg base material (preliminary prepreg base material)
S: distance between slits in fibers at top face of prepreg base material and those in fibers at bottom face of prepreg base material, measured in the fiber's arranging direction.
VD: vertical direction
W: incised length of slit in length direction
Ws: projected length of slit (incised length)
Θa: inclination angle of incision from thickness direction of prepreg base material
Θb: inclination angle of incision from arranging direction of fibers at surface of prepreg base material
43: flow direction of resin
44: gap (opening)
62: cut line in reinforcing fibers in sloped-incision prepreg base material

DETAILED DESCRIPTION

We carried out earnest studies aiming to develop a prepreg base material that comprises reinforcing fibers having a high flowability and a flexible shaping ability to fit to a complicated shape in a fiber reinforced plastic production process and can produce fiber reinforced plastic having good mechanical properties with little variation and a good dimensional stability, reaching the finding that all conventional problems are solved by preparing a specific type of a base material, i.e., a prepreg base material comprising many reinforcing fibers arranged in one direction and a matrix resin and having a specific incision pattern inserted therein, combining such prepreg base materials, together with other base material materials comprising other components as required, into a laminated product, which is then molded by pressing.

The prepreg base material proposed in the present description typically comprises a sheet comprising many reinforcing fibers arranged in one direction or other type of sheet comprising many reinforcing fibers, completely impregnated with a matrix resin that fills all gaps between the reinforcing fibers, but may be a semi-resin-impregnated prepreg base material that comprises a matrix resin sheet, i.e., a matrix resin in a form of sheet, combined with reinforcing fibers to form an integrated body in which the gaps between the reinforcing fibers are not completely impregnated with the resin in the sheet. Such a semi-resin-impregnated prepreg base material is sometimes referred to as a semi-preg.

Since the prepreg base material comprises many reinforcing fibers arranged in one direction, moldings having desired mechanical properties can be designed by using several such prepreg base materials with properly adjusted fiber directions between laminated base materials. In the present description, the word fiber used either independently or as part of a phrase (such as fiber direction) means reinforcing fiber unless otherwise specified.

The prepreg base material is a prepreg base material comprising many reinforcing fibers arranged substantially in one direction and a matrix resin adhered to the reinforcing fibers wherein many incisions, each in a direction crossing the reinforcing fibers, are made over an entire face of the prepreg base material so that substantially all of the reinforcing fibers are cut into reinforcing fiber segments having a length L in the range of 10 to 100 mm while a thickness H of the prepreg base material and a fiber volume content Vf of the reinforcing fibers in the prepreg base material are maintained in the range of 30 to 300 μm and 45 to 65%, respectively.

When attention is focused on a part of a particular fiber, the term "substantially in one direction" in the phrase "many reinforcing fibers arranged substantially in one direction" for the prepreg base material means that 90% or more of the fibers existing within 5 mm from there are arranged at angles (fiber angle) within ±10° from a certain reference line for that part of the particular fiber, such as vertical line or horizontal line.

The term "substantially all reinforcing fibers" in the phrase "substantially all reinforcing fibers are cut by incisions" for the prepreg base material means that the area occupied by continuous fibers that are left uncut by incisions accounts for 5% or less of the total area of the prepreg base material.

The phrase "arranged reinforcing fibers" and the phrase "aligned reinforcing fibers" used for the prepreg base material have the same meaning.

FIG. 1 shows a partial enlarged plan view of an aspect of the prepreg base material. In FIG. 1, the prepreg base material P1 comprises many reinforcing fibers F1 and a matrix resin (omitted in the figure) adhered to the reinforcing fibers F1. The length direction (arranging direction) of the many reinforcing fibers F1 coincides with the vertical direction VD in FIG. 1. The many reinforcing fibers F1 are aligned substantially in one direction, i.e., the vertical direction VD. The perpendicular direction to the length direction (arranging direction) of the fibers F1 coincides with the horizontal direction HD in FIG. 1.

The prepreg base material P1 includes many incisions C1 crossing the reinforcing fibers F1 existed at intervals over its entire surface. Substantially all of the reinforcing fibers F1 are cut by these incisions C1, which are located at intervals in the length direction (arranging direction). A fiber cut by adjacent incisions in the length direction of the fiber, for instance, the incision C1b and the incision C1d, forms a reinforcing fiber segment. A length L of the reinforcing fiber segment is maintained in the range of 10 to 100 mm.

A thickness H of the prepreg base material P1 (see FIG. 5 or FIG. 6) is maintained in the range of 30 to 300 μm. A fiber volume content Vf of the reinforcing fibers F1 in the prepreg base material P1 is maintained in the range of 45 to 65%.

If the length L of all reinforcing fiber segment is maintained in the range of 100 mm or less, the fiber will be able to flow, in particular even in the length direction of the fibers, during a molding process to produce a fiber reinforced plastic (molding) from a laminated base material comprising such prepreg base material. This serves to achieve a highly flexible shaping ability in producing molding having a complicated shape. If such incisions do not exist, i.e., if there are only continuous fibers, the fibers will not flow in the length direction of the fibers, failing to produce molding having a complicated shape.

If the length L of the reinforcing fiber segment is 10 mm less, the flowability of the fibers will further improve, but in such cases, it will be impossible to produce good mechanical characteristics necessary for moldings, in particular for those to be used as structural members, even if other requirements for the prepreg base material are met.

In view of the relation between the flowability of the fibers and the mechanical characteristics of the moldings, it is preferred that the length L of each of the reinforcing fiber segments is in the range of 20 to 60 mm. Depending on the positions of the incisions, there may exist reinforcing fiber segments having a length of less than 10 mm, but the number of the reinforcing fiber segments having a length of less than 10 mm should be minimized. It is preferred that the area comprising the arranged reinforcing fiber segments having a length of less than 10 mm accounts for 5% or less of the total area of the prepreg base material.

Fibers having a good flowability can be produced even if the thickness H of the prepreg base material exceeds 300 µm, but because of the existence of the incisions, on the other hand, the strength of the moldings tends to decrease as the thickness of the incised prepreg base material increases. If the moldings are to be used as structural members, it is necessary for the thickness H of the prepreg base material to be 300 µm or less. In particular, the strength of the moldings will largely increase if the thickness H of the prepreg base material is 150 µm or less.

Even if the thickness H of the prepreg base material is less than 30 µm, the flowability of the fibers will be maintained and moldings having a high strength can be obtained, but it will be very difficult to achieve stable production of very thin prepreg base materials. To produce prepreg base materials at low cost, it is preferred that the thickness H of the prepreg base material is 30 µm or more. In view of the relation between the mechanical characteristics of the moldings and the production cost of the prepreg base material, it is preferred that the thickness H of the prepreg base material is in the range of 50 to 150 µm.

Fibers having a sufficient flowability can be produced if the fiber volume content Vf is 65% or less. The flowability of the fibers will improve as the fiber volume content Vf decreases, but it will be impossible to achieve good mechanical characteristics necessary for structural members if the fiber volume content Vf is less than 45%. In view of the relation between the flowability of the fibers and the mechanical characteristics of the moldings, it is preferred that the fiber volume content Vf is in the range of 55 to 60%.

The essential requirements for the prepreg base material are as described in the above.

In the aspect of the prepreg base material shown in FIG. 1, on the other hand, the large number of incisions C1 provided in the prepreg base material P1 are in the form of many slits, for instance the slits C1$b$ and C1$d$, that have a certain length, instead of extending continuously in a direction across the reinforcing fibers F1. This aspect of the prepreg base material is hereinafter referred to as a constant-length incision prepreg base material.

The length of a slit can be considered on the basis of the number of the reinforcing fibers cut by it, or a projected length Ws (the distance numbered 12 in FIG. 1) of the slit in the perpendicular direction to the arranging direction (length direction) of the reinforcing fibers, which appears when the incision is projected in the arranging direction (length direction) of the reinforcing fibers in the face of the prepreg base material. Hereinafter, the projected length Ws of a slit is also referred to simply as the length of a slit Ws. In the case of a slit that is in the perpendicular direction to the arranging direction of the fibers, the actual length of the slit is the same as the projected length of the slit Ws.

When a load is applied to a fiber reinforced plastic, it is highly possible that stress will be concentrated at the cut edges, for instance C1$b$E and C1$d$E, of the reinforcing fibers formed by the incisions to act as the starting points of destruction. Therefore, the strength of the molding can be increased by minimizing the number of incisions in the reinforcing fibers. The strength of the molding will largely improve of the length Ws of the slits is 10 mm or less. However, control of incisions will become if the length Ws of the slits is less than 30 µm, making it difficult to maintain the length L of the reinforcing fiber segments in the range of 10 to 100 mm over the entire face of the prepreg base material.

Specifically, the flowability of the fibers during the molding process will decrease largely if there remain fibers uncut by incisions. But if a large number of incisions are made in the length direction of the fibers to prevent this, the length L of the reinforcing fiber segments will be less than 10 mm in some places, which is undesirable. Therefore, it is preferred that the length of the slits Ws is 1 mm or more. This is also advantageous because incisions with a projected length Ws of 1 mm or more can be made with a simple apparatus.

If the length of the slits Ws exceeds 10 mm, on the contrary, the strength of the molding will level off to a nearly constant value regardless of the length. This means that the load to cause destruction will not depend significantly on the length of the cut edges, C1$b$E and C1$d$E, of the reinforcing fibers if the length is larger than a certain value.

The strength of the moldings will largely increase when the length of the slits Ws is 1.5 mm or less. From the aforementioned consideration, it is preferred that the length of the slits Ws is in the range of 1 to 10 mm in view of the fact that a simple apparatus can be used to make incisions. On the other hand, in view of easy control of incisions and the relation with the mechanical characteristics of the moldings, it is preferred that the length of the slits Ws is in the range of 30 µm to 1.5 mm, more preferably 50 µm to 1 mm.

The constant-length incision prepreg base material P1, an aspect of the prepreg base material, is described more in detail below.

In FIG. 1, the prepreg base material P1 contains many aligned incisions C1 having a constant length. The fibers F1 are cut by the upper incision C1$b$ and the lower incision C1$d$ that are adjacent to each other in the length direction of the fibers to form the fiber segments FS1 having a fiber length L or the interval 11, in the range of 10 to 100 mm. This length L of the fibers is referred to as a fiber segment length L.

The prepreg base material P1 shown in FIG. 1 is an aspect in which all fiber segments have the same length L and all slits have the same length (projected length) Ws. In FIG. 1, the discrete incisions in a first slit row CRa coincide with the discrete incisions in a third slit row CRc as they move, while keeping the parallelism, in the length direction of the fibers over a distance equal to the fiber segment length L. Similarly, the discrete incisions in a second slit row CRb coincide with the discrete incisions in a fourth slit row CRd as they move, while keeping the parallelism, in the length direction of the fibers over a distance equal to the fiber segment length L.

Some of the fibers are cut both the first and second slit rows CRa and CRb and the third and fourth slit rows CRc and CRd, resulting in the incision overlap CO1 with a distance 13 that form fiber segments shorter than the fiber segment length L. Thus, the fibers in this overlap with a distance 13 are cut not only by the incisions C1b and C1d but also by the incision C1c made between them. The existence of the incision overlap CO1, which result when incisions are projected in the arranging direction of the fibers, serves for stable production of prepreg base materials having a fiber segment length of 100 mm or less.

The prepreg base material P1 shown in FIG. 1 includes two patterns of incisions, i.e., the incisions C1b having a constant length and sloping from right to left and the incisions C1c having a constant length and sloping from left to right. This aspect of the prepreg base material is hereinafter referred to as an oblique constant-length incision prepreg base materials.

Other six different incision patterns are illustrated in FIGS. 2(a)-(f). In FIG. 2, the aligned reinforcing fibers are not shown, but the reinforcing fibers are orientated in the top-bottom direction (vertical direction) in FIG. 2. Any incision pattern may be used if the aforementioned requirements are met. The prepreg base material shown in FIG. 2(a), (b) or (c) gives an aspect in which the direction of the slits C2a, C2b and C2c is perpendicular to the orientation direction of the fibers, and these aspects of the prepreg base material are hereinafter referred to as a perpendicular constant-length incision prepreg base material. In the prepreg base material shown in FIG. 2(d), (e) or (f) gives an aspect in which the direction of the slits C2d, C2e and C2f is oblique to the orientation direction of the fibers, and these aspects of the prepreg base material are the oblique constant-length incision prepreg base material.

The reinforcing fibers to be used for the prepreg base material include, for instance, organic fibers such as aramid fiber, polyethylene fiber, and poly(paraphenylene benzoxazole) (PBO) fiber; inorganic fibers such as glass fiber, carbon fiber, silicon carbide fiber, alumina fiber, Tyranno fiber, basalt fiber, and ceramics fiber; metal fibers such as stainless steel fiber and steel fiber; other reinforcing fibers such as boron fiber, natural fiber, and modified natural fiber.

Among others, carbon fiber, in particular, is lightweight compared with other reinforcing fibers. Furthermore, it is particularly high in specific strength and specific modulus, and also high in heat resistance and chemical resistance, thus serving effectively as material for automobile panel and other such members that are required to be lightweight. In particular, PAN-based carbon fibers, which are generally high in strength, are preferable.

The matrix resins to be used for the prepreg base material include, for instance, thermosetting resins such as epoxy resin, unsaturated polyester resin, vinyl ester resin, phenol resin, epoxy acrylate resin, urethane acrylate resin, phenoxy resin, alkyd resin, urethane resin, maleimide resin, and cyanate resin; and thermoplastic resins such as polyamide, polyacetal, polyacrylate, polysulfone, ABS, polyester, acrylic, polybutylene terephthalate (PBT), polyethylene terephthalate (PET), polyethylene, polypropylene, polyphenylene sulfide (PPS), polyether ether ketone (PEEK), liquid crystal polymer, polyvinyl chloride, polytetrafluoroethylene, other fluorine-based resins, and silicone.

Of these, the use of a thermosetting resin is particularly preferable. If a thermosetting resin is used as matrix resin, the prepreg base materials will have tackiness at room temperature. If such prepreg base materials are combined into a laminate, adjacent prepreg base materials will be integrated firmly due to the adhesiveness, making it possible to maintain the intended laminate structure in producing moldings. On the other hand, if a thermoplastic resin that does not have tackiness at room temperature is used as the matrix resin in the prepreg base materials, adjacent prepreg base materials will easily slip on each other in the laminate of prepreg base materials. The structure of the laminate is likely to be deformed during a molding process, resulting in fiber reinforced plastics having a large fiber orientation irregularity. In particular, the difference between them will be particularly significant when a mold having uneven surface portions is used for molding.

If a thermosetting resin is used as a matrix resin, furthermore, the prepreg base material will have good drape properties at room temperature. If, for instance, a mold having uneven surface portions is used to produce moldings, it will be easy to perform a preliminary shaping to fit to the unevenness in advance. This preliminary shaping serves to improve the moldability, and facilitate the control of the flow of fibers.

The prepreg base material may be suck on a supporting member in a tape form. The use of a supporting member makes it possible for an incised prepreg base material to maintain its form even if all fibers contained are cut by incisions, preventing the fibers from being loosened during the shaping step. In this case, it is more preferable that the matrix resin is a thermosetting resin having tackiness.

The tape-like supporting member may be of paper such as kraft paper, polymer film such as polyethylene and polypropylene, or metal foil such as aluminum, and its surface may be processed with a silicone- or Teflon (registered trademark)-based mold releasing agent or metal deposition to improve the releasability from a resin.

Among the thermosetting resins, it should more preferably be epoxy resin, unsaturated polyester resin, vinyl ester resin, phenol resin, acrylic resin, or their mixture. It is preferred that these resins have a resin viscosity of $1 \times 10^6$ Pa·s or less at room temperature (25° C.), because a prepreg base material having desired tackiness and drape property can be produced if the viscosity is in this range. In particular, a prepreg base material comprising an epoxy resin as a matrix resin and carbon fibers as reinforcing fibers can serve to produce molding (fiber-reinforced composite material) having excellent mechanical characteristics.

For such matrix resin, it is preferred that the thermosetting resin can cure within 10 minutes at a temperature T in the range of (Tp−60) to (Tp+20) where Tp denotes the exothermic peak temperature of the thermosetting resin as measured by DSC. "Resin can cure" means that the molding precursor comprising a thermosetting resin maintains its shape when taken out after being held at a certain temperature for a certain period of time. Specifically, it is evaluated by putting 1.5 ml of the thermosetting resin in an polytetrafluoroethylene O-ring having an inside diameter of 31.7 mm and a thickness of 3.3 mm placed on a heated press, performing heating and pressing for 10 minutes to ensure cross-linking reaction, and then determining if the resin specimen can be taken out in an undeformed state.

If the temperature T at which the thermosetting resin can cure within 10 minutes is higher than (Tp+20)° C., the resin is likely to undergo excessively rapid reaction to cause voids in the resin, leading to inadequate curing. If it is lower than (Tp−60)° C., a lengthy heating period will be required during the molding process, imposing a constraint on the molding conditions. Thus, the aforementioned range is preferable. The exothermic peak temperature Tp is measured by DSC at a heating rate 10° C./min.

Thermosetting resins having such curing characteristics as described above at least include epoxy resin, which should be used with an amine-based compound as curing agent and a compound comprising two or more urea bonds in a molecule as curing accelerator. Specifically, preferable curing accelerators include 2,4-toluene bis(dimethyl urea) and 4,4-methylene bis(phenyl dimethyl urea).

As a method for forming incisions in an elemental prepreg base material (a preliminary prepreg base material) which comprises continuous reinforcing fibers oriented in one direction as an original material and a matrix resin adhered to the reinforcing fibers to produce a prepreg base material having incisions, at first, a preliminary prepreg base material is produced. The incisions are provided in the produced preliminary prepreg base material by handwork with a cutter or a cutting machine. As another method, for example, in a production step of a prepreg comprising continuous fibers arranged in one direction, the prepreg being producing is continuously pressed by a rotary roller provided with blades at predetermined positions, or a multi-layered preliminary prepreg base material is pressed and incised by a die provided with blades at predetermined positions. The former method is better when making incisions in a preliminary prepreg base material in a simple manner while the latter is better to process a large number of base materials with high production efficiency.

When a rotary roller is to be used, a roller directly machined out followed by providing required blades may be used. Further, a rotary roller comprising a magnetic roller, etc. and a sheet-like die which is prepared by a flat plate provided with blades formed by cutting at predetermined positions and which is wound on the magnetic roller may be used. In this case, the blades can be easily replaced for different patterns of incisions. The use of such rotary rollers serves to make proper incisions in a preliminary prepreg base material even when it is demanded to prepare a prepreg base material having a slit segment length Ws being in short (for instance, 1 mm or less).

After forming incisions in preliminary prepregs, the prepreg base materials may be thermocompression-bonded with a roller, etc. to allow a resin to fill in and fuse to the incised portions to improve the handleability of the prepreg base materials.

Figure 2:
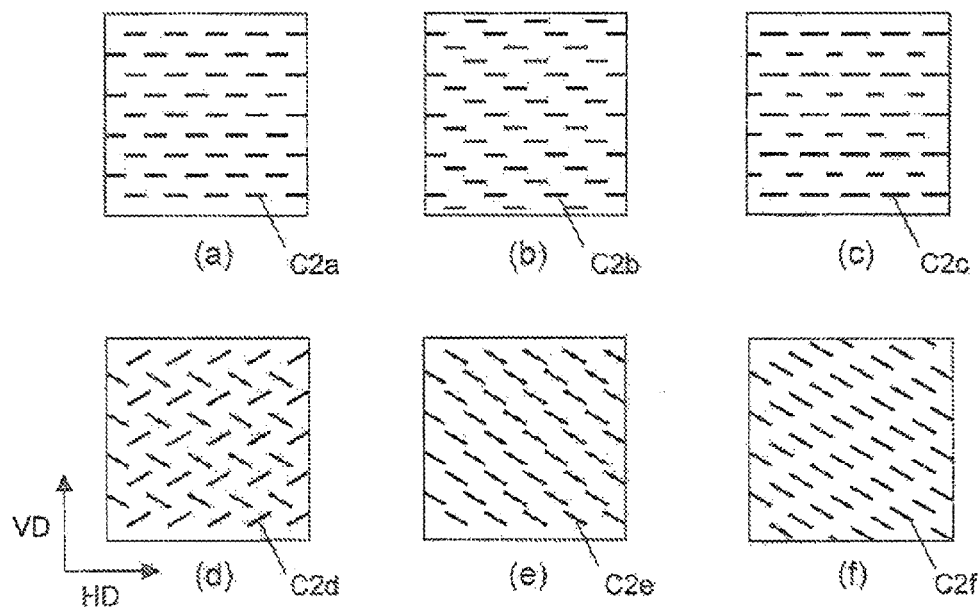
FIG. 2 shows plan views of six typical incision patterns of the prepreg base material.

As for the direction of the incisions in the prepreg base material, it is preferred that as shown in FIGS. 2(d), (e) and (f), the incisions are oblique to the perpendicular direction (horizontal direction HD in FIG. 2) to the length direction of the fibers (vertical direction VD in FIG. 2).

If incisions are to be formed in the perpendicular direction (horizontal direction HD in FIG. 2) to the length direction of the fibers in a preliminary prepreg base material being supplied in the fiber direction in an industrial process, it will be necessary to cut the fibers in an instant. This not only requires a large force but also reduces the durability of the blades. In addition, the fibers are likely to be pushed away in the perpendicular direction (horizontal direction HD in FIG. 2) to the fiber direction, leaving many uncut fibers.

On the other hand, because the incisions are oblique to the perpendicular direction (horizontal direction HD in FIG. 2) to the fiber direction, the number of fibers cut per unit length of the blades is decreased, making it possible to cut the fibers with a smaller force, maintain the durability of the blades at a high level, and decrease the number of uncut fibers. Furthermore, because the incisions are oblique to the perpendicular direction (horizontal direction HD in FIG. 2) to the fiber direction, the slit segment length Ws can be smaller than the incision length measured along the direction of the incisions, and the number of fibers cut by one incision is decreased, probably serving to improve the strength of the moldings. If incisions are to be made in the perpendicular direction (horizontal direction HD in FIG. 2) to the fiber direction, it is preferable to use short blades to decrease the slit segment length Ws, but this is undesirable in view of the durability and processability.

In the prepreg base material, it is preferred that the slit segments are provided from the top and bottom faces of the prepreg base material in the thickness direction of the prepreg base material without penetrating the prepreg base material (layer), that a cut depth Hs of each of the slit segments, measured from the top and bottom faces of the prepreg base material in its thickness direction, is in the range of 0.4 to 0.6 times the thickness H of the prepreg base material, that an interval La between any slit segment A in the top face and another slit segment B in the top face adjacent to the slit segment A in the orientation direction of the reinforcing fibers (length direction of the fibers) is in the range of 10 to 100 mm, that the geometrical center of a slit segment C provided in the bottom face is located at a position where its distance (displacement value) measured from the slit segment A toward the slit segment B in the orientation direction of the reinforcing fibers is 0.4 to 0.6 times La, that a part of the reinforcing fibers existing between the slit segment A and the slit segment B in the top face is cut by both the slit segment A in the top face and the slit segment C in the bottom face or both the slit segment B in the top face and the slit segment C in the bottom face, and that geometrical shapes of slit segments in the top face and/or geometrical shapes of slit segments in the bottom face are the same each other. This aspect of the prepreg base material is hereinafter referred to as a two-face incision prepreg base material.

The depth of the incisions has large influence on the strength of the resulting moldings as described previously, and there are limits to the production of thin prepreg base materials at low cost. We found, however, that if incisions from the top and bottom faces to a depth about half the thickness of the prepreg base material are made in an incision forming step, they can serve to greatly improve the strength of the moldings while maintaining the flowability of the fibers. The term "geometrical center" used herein is defined as the point about which the first moment is zero. For a slit segment S, the geometrical center G has the relation expressed by the following equation (Formula II) with the point X (numbered 14 in FIG. 1):

$$\int_S (G-X)dx = 0 \qquad \text{Formula II.}$$

Each of slit segments having the same geometrical shape each other at least in the top and bottom faces of a prepreg base material means that all of fiber segments formed from fibers cut by a pair of slit segments adjacent in the orientation direction of the fibers have the same length. It is preferred that the slit segments in the top and bottom faces have the same geometrical shape.

Figure 5:
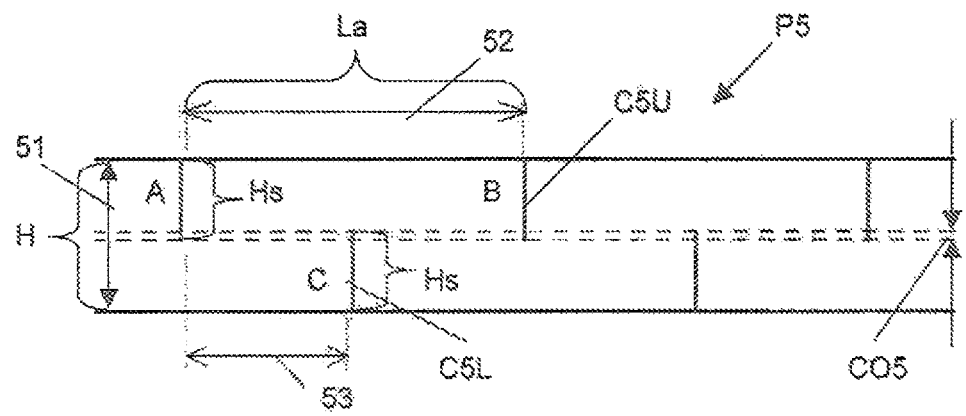
FIG. 5 shows a longitudinal cross-sectional view of an aspect of the two-face incision prepreg base material.

FIG. 5 shows a longitudinal section view of an aspect of the two-face incision prepreg base material. In FIG. 5, the reinforcing fibers are oriented in the left-right direction (horizontal direction) in the two-face incision prepreg base material P5, and the prepreg base material P5 has a thickness H (length numbered 51 in the vertical direction in FIG. 5). The two-face incision prepreg base material P5 comprises a large number of incisions C5U formed in the top face and a large number of incisions C5L formed in the bottom face.

In the top face of the prepreg base material P5, adjacent slit segments A and B are provided with a distance La (length numbered 52 in the horizontal direction in FIG. 5), and both the slit segments A and B have an incision depth Hs, measured from the top face in the thickness direction. The bottom face of the prepreg base material P5, on the other hand, contains a slit segment C, which has an incision depth Hs from the bottom face in the thickness direction. As in the case of the slit segments A and B, a slit segment adjacent to the slit segment C is provided with the distance La. The adjacent slit segments are called as a pair of slit segments.

It is more preferable that all pairs of slit segments have the same distance La. It is also preferable that the incision C in the bottom face is located at a distance (displacement value) of 0.5 La from the slit segment A when measured in the length direction of the fibers.

If the positions of the slit segments are adjusted so that the slit segments are located at regular intervals, the distances between these slit segments (distance numbered 53 measured in the horizontal direction in FIG. 5), i.e., the distance between the slit segment A in the top face and the slit segment C in the bottom face measured in the orientation direction of the fibers and the distance between the slit segment B in the top face and the slit segment C in the bottom face measured in the orientation direction of the fibers, can be maximized, thus minimizing the possibility that the slit segments will be linked with each other to act as defects to cause interlayer peeling in moldings.

Ideally, the incision depth H should be 0.5H to make the defect size uniform, minimizing the size of the defects contained to minimize the load to cause destruction. However, if there exist fibers that are not cut either by the slit segments from the top face or the slit segments from the bottom face, the flowability of the fibers will decrease largely. To prevent such a decrease in flowability, it is preferred that slit segments having an incision depth Hs of about 0.55H, i.e., the sum of 0.5H and 0.05H (the overlap CO5 in FIG. 5), are made from the top and bottom faces. This prevents the decrease in the flowability of the fibers in the moldings during a molding process, serving for stable production of moldings free of quality defects.

As a means of forming incisions in a prepreg base material from its top and bottom faces, an elemental prepreg base material (preliminary prepreg base material) comprising continuous reinforcing fibers oriented in one direction and a matrix resin adhered to the reinforcing fibers is prepared first, followed by pressing a rotary roller provided with blades at predetermined positions against both the top and bottom faces of the preliminary prepreg base material to form incisions in the thickness direction of the prepreg base material that do not penetrate the prepreg base material (layer).

A fiber reinforced plastic that is produced by preparing a laminate comprising at least one two-face incision prepreg base material as a component layer and molding the resulting laminate have features as described below.

Thus, the two-face incision prepreg base material has a specific structure that contains incisions with oriented fibers located immediately above or below them to prevent them from opening. This prevents or delays the progress of destruction starting from incisions where reinforcing fibers are cut, leading to the fiber-reinforced plastic having a high strength.

If the slit segments in the prepreg base material have an inclination angle Θa in the thickness direction of the prepreg base material, with a distance S between the cut line of a slit in the reinforcing fibers in the top face of the prepreg base material and that of the slit in the bottom face, measured in the orientation direction of the reinforcing fibers, the inclination angle Θa determined by the following equation (Formula I) from the distance S and the thickness H of the prepreg base material should preferably be in the range of 1 to 25°:

$$\Theta a = \tan^{-1}\left(\frac{H}{S}\right). \quad \text{Formula I}$$

This aspect of the prepreg base material is hereinafter referred to as a sloped incision prepreg base material.

As described above, the incision depth has large influence on the strength because the fibers, which transfer a large proportion of the load, are cut by the incisions to prevent the transfer of load, leading to concentration of stress.

It has been found that if incisions inclined in the thickness direction of the prepreg base material are made to form a specific geometrical figure in which the cut fibers overlap each other, the existence of the inclined incisions allow the cut fibers to smoothly transfer the load applied to the fibers. In particular, moldings having largely enhanced mechanical characteristics are obtained when the inclination angle Θa of the incisions is 25° or less. On the other hand, it will be very difficult to form sloped incisions having an inclination angle Θa of less than 1°.

It is one way for forming incisions inclined in the thickness direction in a prepreg base to form directly inclined incisions. Another way, for instance, is preparing a preliminary prepreg base material comprising reinforcing fibers arranged in one direction, making incisions penetrating the layer in the thickness direction, heating to soften the preliminary prepreg base material, and, while maintaining the state, pressing nip rollers having different rotating speeds against the top and bottom faces to cause a shear force to incline the sections in the reinforcing fibers in the thickness direction.

Figure 6:
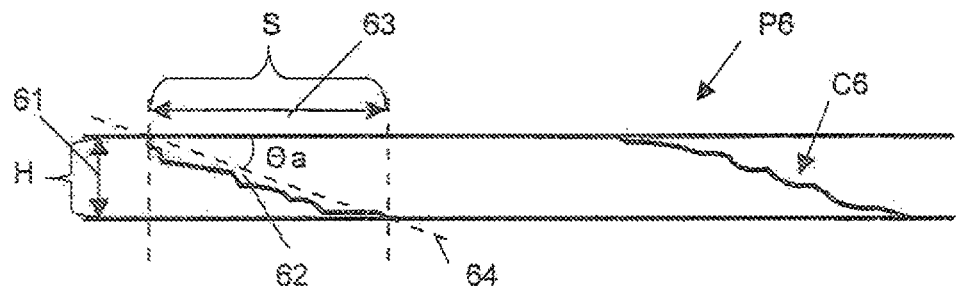
FIG. 6 shows a longitudinal cross-sectional view of an aspect of the sloped-incision prepreg base material.

FIG. 6 shows a longitudinal schematic cross section in an aspect of the sloped incision prepreg base material produced by the latter way. In FIG. 6, the reinforcing fibers are oriented in the left-right direction (horizontal direction) in the sloped incision prepreg base material P6, and the sloped incision prepreg base material P6 has a thickness H (length numbered 61 in the vertical direction in FIG. 6).

As seen from FIG. 6, the cut lines (incision lines) in the reinforcing fibers that show incisions penetrating from the top face to the bottom face, initially in the thickness direction of the prepreg base material (vertical direction), are changed to the cut lines (incision lines) 62 in the reinforcing fibers that are inclined in the thickness direction of the prepreg base material as a result of a shear force being applied by nip rollers having different rotating speeds to the top and bottom faces. Furthermore, the actual cut lines (incision lines) 62 have a zigzag shape. Thus, the cut lines 62 (incisions C6) cannot be said to be straight.

For the sake of convenience, the distance, measured in the fiber orientation direction (the horizontal direction in FIG. 6), between the position of an incision in the top face and the position of the incision in the bottom face in the sloped incision prepreg base material 6P is referred to as the distance S (shear distance S) (the distance numbered 63 measured in the horizontal direction in FIG. 6), and the straight line connecting the position of the incision in the top face and the position of the incision in the bottom face in the sloped incision prepreg base material 6P is referred to as cut line 64. The angle between the cut line 64 and the top face of the prepreg base material P6 is referred to as inclination angle Θa. The shear distance S is determined by averaging the shear distance of all incisions contained in the face of the prepreg base material P6. The inclination angle Θa of the incisions is calculated from the shear distance S and the thickness H of the prepreg base material P6 by the following equation (Formula I):

$$\Theta a = \tan^{-1}\left(\frac{H}{S}\right). \quad \text{Formula I}$$

It is preferred that the shear distance S in the sloped incision prepreg base material is in the range of 50 μm to 5 mm.

A fiber reinforced plastic produced by preparing a laminate comprising the sloped incision prepreg base material at least as one component layer and molding the resulting laminate has the following characteristic feature.

A molding produced contains a reinforcing fiber layer in which the cut ends of reinforcing fibers are aligned in a plane inclined in the thickness direction as a result of the use of the sloped incision prepreg base material. The distribution of these cut ends of reinforcing fibers in the reinforcing fiber layer is similar to that of fiber edges inclined in the thickness direction in FIG. 6. The existence of cut ends of reinforcing fibers distributed in such a manner enhances the efficiency of load transfer between fiber edges in the resulting molding, serves to prevent destruction from starting at incisions (cut ends of reinforcing fibers). In particular, this effect is enhanced when the distance between the fiber edges is small. Accordingly, a very high strength can be achieved in the case of molding having a simple shape that does not require the fibers to flow extremely smoothly for flexible shaping.

A laminated base material comprises a plurality of prepreg base materials each of which comprises many reinforcing fibers arranged substantially in one direction and a matrix resin, and those of which are laminated and integrated each other, wherein at least one prepreg base material in the laminated prepreg base material is the prepreg base material, and arranging directions of the reinforcing fibers in the laminated prepreg base material are at least two different directions.

Figure 3A:
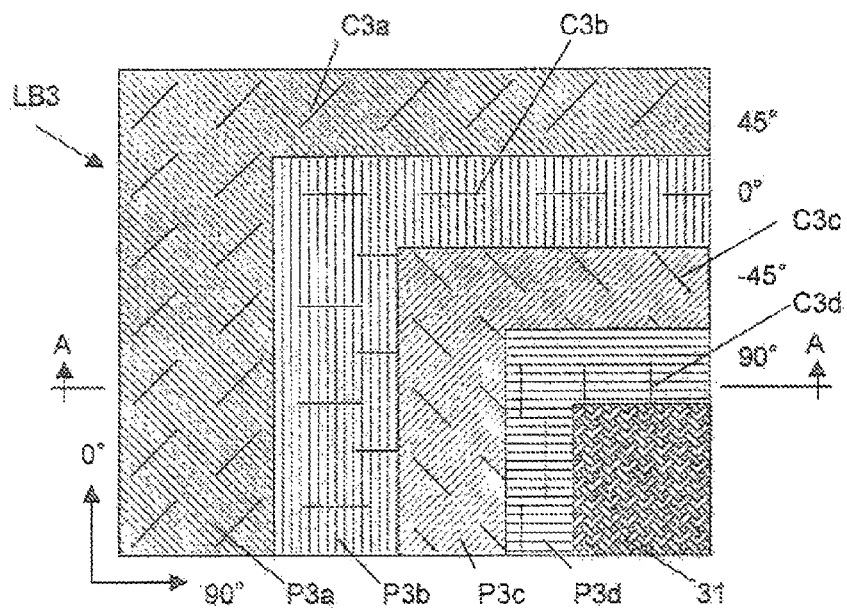
FIG. 3A shows a partial cutaway view of an aspect of the laminated base material.
Figure 3B:
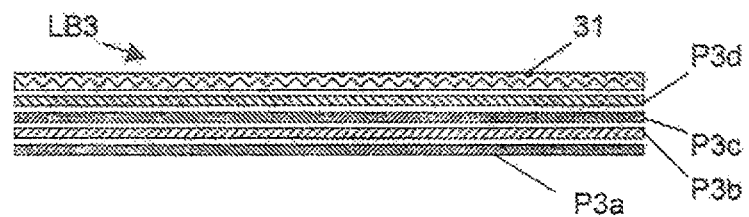
FIG. 3B shows a cross-sectional view of the A-A cross-section specified in FIG. 3A.

FIG. 3A shows a partially extracted view of an aspect of the laminated base material. FIG. 3B shows a view of the A-A cross section specified in FIG. 3A. In FIG. 3A, the laminated base material LB3 is a hybrid laminated product comprising four layers of the prepreg base material, P3a, P3b, P3c and P3d, and one layer of a non-incised prepreg base material 31. The orientation direction of the reinforcing fibers in the four layers of the prepreg base material P3a, P3b, P3c and P3d are in the direction of 45°, 0°, −45° and 90°, respectively. The prepreg base materials P3a, P3b, P3c and P3d have many slit segments C3a, C3b, C3d and C3d, respectively.

The laminated base material may comprise only a lamination of a plurality of the prepreg base material, or a conventional base material widely used for producing molded fiber reinforced plastic laminated with at least one prepreg base material.

If only one layer in the laminated base material is the prepreg base material, the flow of the matrix resin during the molding process will cause the fiber to flow only in the perpendicular direction (90° direction) to the orientation direction of the fibers. Thus, the flow of the resin in the 90° direction is the driving force to move the fibers, and therefore, a preferable flowability of the fibers will take place on in the case of a laminated base material comprising two or more prepreg base material layers, at least one of which is the prepreg base material aligned with its fiber orientation direction being in a different direction of the other.

If for some reason, prepreg base materials have to be adjacent with each other in such a laminated base material with their fiber orientation direction coinciding with each other, it is preferred that the incisions in them do not overlap each other. It is preferable that a material such as a resin film is provided between the prepreg base materials to improve the flowability of the fibers.

If such flow of the fibers is not necessary in some portions in the laminated base material, it is preferable that a base material comprising continuous fibers are laminated. In such a case, this may improve the mechanical characteristics in such portions. Depending on the shape of an intended molding, an incision-free unidirectional prepreg base material may be used in lamination with the prepreg base material. For instance, there will be no problems with the flowability of the fibers in a tubular product having a constant cross-sectional shape, if an incision-free unidirectional prepreg base material is used in the direction free of changes in shape.

Figure 4A:
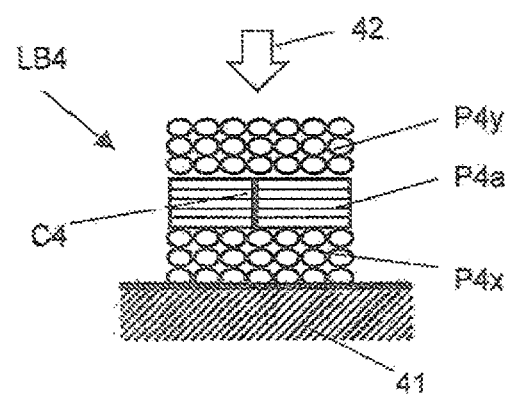
FIG. 4A shows a longitudinal cross-sectional view of an aspect of the laminated base material placed on a mold.
Figure 4B:
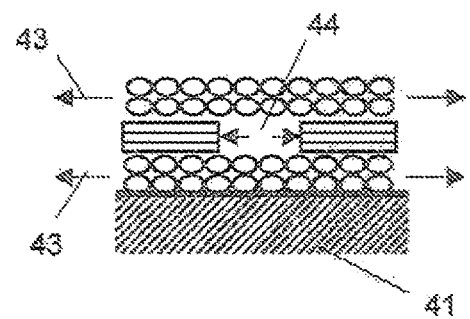
FIG. 4B shows a longitudinal cross-sectional view of the aspect given in FIG. 4A of the laminated base material deformed under a molding pressure applied to the laminated base material.

FIGS. 4A and 4B show a longitudinal section to describe the mechanism of the flow of fibers that will take place when the prepreg base material is used. FIG. 4A shows a laminated base material LB4 comprising a prepreg base material P4x having a fiber arranging direction of 90° placed on the surface of a bottom molding die 41, a prepreg base material P4a having incisions and a fiber arranging direction of 0° placed on the prepreg base material P4x, and furthermore, a prepreg base material P4y having a fiber arranging direction of 90° placed on the prepreg base material P4a.

A pressure 42 is applied from above the laminated base material LB4 by a top molding die (not shown), and a molding is produced. During this molding process, as shown in FIG. 4B, a resin being squeezed by the pressure 42 forms a resin flow 43 in the direction perpendicular to the orientation direction of the fibers in the prepreg base material P4x and the prepreg base material P4y, and the adjacent cut edges of reinforcing fibers at an incision C4 are moved by the flow away from each other to form a gap (opening) 44.

If each layer contains fibers in different orientation directions, flows of fibers among the layers will be caused accordingly in different directions over different distances, but the displacement will be absorbed by the slippage between the layers. Thus, even if the fiber volume content Vf is as high as 45 to 65%, a high fiber flowability can be achieved because the laminated base material has a structure that enables the resin to be distributed unevenly between the layers.

In the case of a SMC, randomly dispersed chopped strands will differ in flowability and will flow in different directions, but fibers will interfere with each other to prevent the flow. Thus, flowability can be maintained only when the fiber volume content Vf is below about 40%.

As a result, the laminated base material can allow the fibers to have a high flowability even if it has a high fiber volume content Vf to produce moldings having good mechanical characteristics. The resin viscosity during the molding process should preferably be $1 \times 10^4$ Pa·s or less to maintain a desired resin flowability, but a resin viscosity of less than 0.01 Pa·s will not always be preferable because efficient force transfer to the fibers by the resin will be prevented.

It is preferred that the laminated base material comprises only the prepreg base materials and that the reinforcing fibers are aligned pseudo-isotropically over the entire laminated base material. The exclusive use of the prepreg base materials allows air trapped during a lamination process to be released through incisions in the thickness direction to prevent formation of voids, serving to produce moldings having good mechanical characteristics.

In particular, isotropic lamination such as $[+45/0/-45/90]_S$ and $[0/\pm 60]_S$ is preferable because it serves to produce moldings having uniform physical properties and prevent warp of the moldings. As described above, furthermore, the flow of the resin in the 90° direction is the driving force to move the fibers, and although the fiber flow conditions will differ depending on the fiber orientations in the adjacent layers, the use of pseudo-isotropic lamination will help achieve a isotropic fiber flowability, leading to little variation in the flowability of the fibers. Thus this laminated base material can be a preferable molding material to produce highly robust moldings.

In the laminated base material, it is preferred that two adjacent layers having substantially the same fiber direction (two +45° layers, two 0° layers, two −45° layers or two 90° layers in a laminated base material of $[+45/0/-45/90]_S$, for instance) contain slit rows, each comprising many slit segments, aligned at regular intervals, and that the slits in the rows in one of the prepreg base material layers are shifted in the length direction of the fibers from the slits in the rows in the other prepreg base material layer.

A fiber reinforced plastic produced by molding the laminated base material will start to destroy when incisions in major layers that bear the applied load, have linked with each other. When a load is applied to a fiber reinforced plastic, the major layer pairs that bear the applied load are those having substantially the same fiber direction, and the strength of the fiber reinforced plastic can be improved by preventing the linking between the incisions in those adjacent layers.

Thus, the strength can be improved by shifting the positions of the incisions in a layer, as seen when they are projected from a direction out of the plane of the laminated base material, compared with those in the adjacent layer with the same orientation direction. It is preferred that the positions of the incisions in adjacent layers with the same orientation are shifted from each other in the length direction of the fibers by 0.5X, where X denotes the distance between the rows of the incisions. This is because the distance between the incisions is maximized in this state. In particular, a fiber reinforced plastic having largely improved strength can be obtained if the positions of the incisions are shifted in the length direction of the fibers in the layers that will substantially bear the load applied to the resulting fiber reinforced plastic, i.e., the layers with fibers oriented in a direction within ±10° of the load direction.

Figure 9:
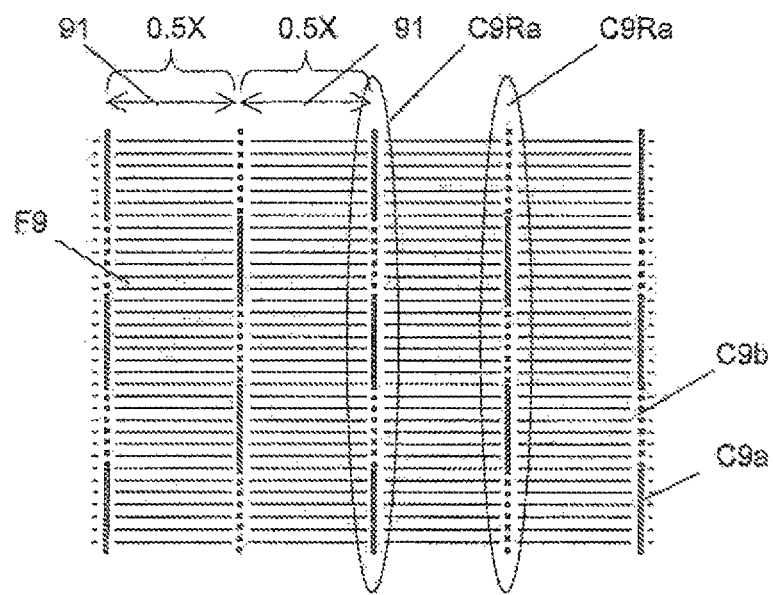
FIG. 9 shows a plan view of an aspect of the prepreg base material to illustrate a typical positional relationship between the incisions in adjacent layers in the laminated prepreg base material.

FIG. 9 shows a plan view of a typical incision pattern in each of prepreg base materials in a state of lamination of the prepreg base materials to be laminated. In a laminate comprising laminated prepreg base materials having different angles of fiber arranging directions, where a prepreg base material α, which is a randomly selected one of those layers having a fiber arranging direction along a direction of acting of load in a fiber reinforced plastic to be molded, is compared with a prepreg base material β, which exists in a position nearest to the prepreg base material α and has the same fiber arranging direction, it is preferred that the incisions C9b in a prepreg base material β is located at a position shifted in the length direction of the fibers F9 by 0.5X (the distance numbered 91 in the horizontal direction in FIG. 9), where X denotes the distance from a C9Ra to another C9Ra, each comprising incisions C9a in a prepreg base material α.

The fibers are assumed to be oriented substantially in the same direction to allow for a small divergence of an angle of the orientation direction at a time of lamination. The term "substantially in the same direction" generally means that the divergence of angle is within ±10°.

A fiber reinforced plastic is produced by curing the laminated base material. A curing method, or a molding method to produce the fiber reinforced plastic, may be press molding, autoclave molding, sheet winding molding, or the like. In particular, press molding is preferable in view of its production efficiency.

When the laminated base material is used, a metal insert for mounting a rotating member or the like may be provided in a portion comprising only the prepreg base materials, followed by curing and integration to reduce the assembly cost. In such cases, if a plurality of concave portions are provided around the metal insert, moving fibers will enter easily into the concave portion to fill the space, and furthermore, caulking will take place as a result of the difference in thermal expansion coefficient between the metal and fibers during the process of cooling from the molding temperature to allow the metal insert to be firmly integrated.

The prepreg base material and the fiber reinforced plastic comprising the former are used preferably for uses including bicycle parts; shaft and head of golf and other sports equipment; automobile members such as door and sheet frame; and mechanical parts such as robot arm, required to have high strength, high rigidity and lightweight. In particular, they are used preferably in sheet panels, sheet frames and other automobile parts required to have high in strength and small in weight while maintaining a highly flexible shaping ability during a process to produce moldings having a complicated member shape.

Some other aspects of the prepreg base material are described below. These other aspects of the prepreg base material are also used in the same way as the aspects of the prepreg base material described above as material for forming the laminated base material or the fiber reinforced plastic described above. These other aspects of the prepreg base material have different actions and effects from those of the aspects of the prepreg base material described above, and such actions and effects will be described below for each of these other aspects of the prepreg base material. It is preferred that these prepreg base materials are used while considering such actions and effects to produce the laminated base material and the fiber reinforced plastic as described above.

In the prepreg base material, it is preferred that an oblique angle $\Theta b$ of each incision in a surface of the prepreg base material from the orientation direction of each reinforcing fiber has an absolute value in the range of 2 to 25°. This aspect of the prepreg base material is hereinafter referred to as a specific-angle oblique incision prepreg base material.

This specific-angle oblique incision prepreg base material has a fiber segment length L of 10 to 100 mm, a prepreg base material thickness H of 30 to 300 μm and a fiber volume content Vf of 45 to 65%.

The specific-angle oblique incision prepreg base material, which is an aspect of the prepreg base material, is characterized in that the oblique angle $\Theta b$ of the direction of each incision (incision direction) from the orientation direction of the reinforcing fibers has an absolute value in the range of 2 to 25°.

If the absolute value of the oblique angle $\Theta b$ exceeds 25°, it will be possible to achieve a flowability of the fibers and produce molding having high mechanical characteristics compared with an SMC, etc. However, the mechanical characteristics of the molding can be improved largely by maintaining the absolute value of the oblique angle $\Theta b$ at 25° or less.

If the absolute value of the oblique angle $\Theta b$ is less than 2°, on the other hand, it will be difficult to make incisions stably in an elemental prepreg base material (preliminary prepreg base material), although it is obtainable a flowability of the fibers and a good mechanical characteristic. That is, the fibers tend to move away from a cutting blade to make it difficult to provide incisions stably as the direction of the incisions approaches the orientation direction of the fibers.

To allow the fiber segment length L to be 100 mm or less, furthermore, the minimum distance between the adjacent incisions has to be less than 0.9 mm if the absolute value of the oblique angle $\Theta b$ is less than 2°, making it difficult to produce the specific-angle oblique incision prepreg base material stably. If the distance between the adjacent incisions is small like this, furthermore, it will be difficult to handle the operation for laminating specific-angle oblique incision prepreg base materials into a laminate. In view of the relation between the easiness of incision control and the mechanical characteristics, it is preferred that the absolute value of the oblique angle $\Theta b$ is in the range of 5 to 15°.

Some preferable incision patterns for the specific-angle oblique incision prepreg base material are described below by referring to FIGS. 11 to 14.

Figure 11:
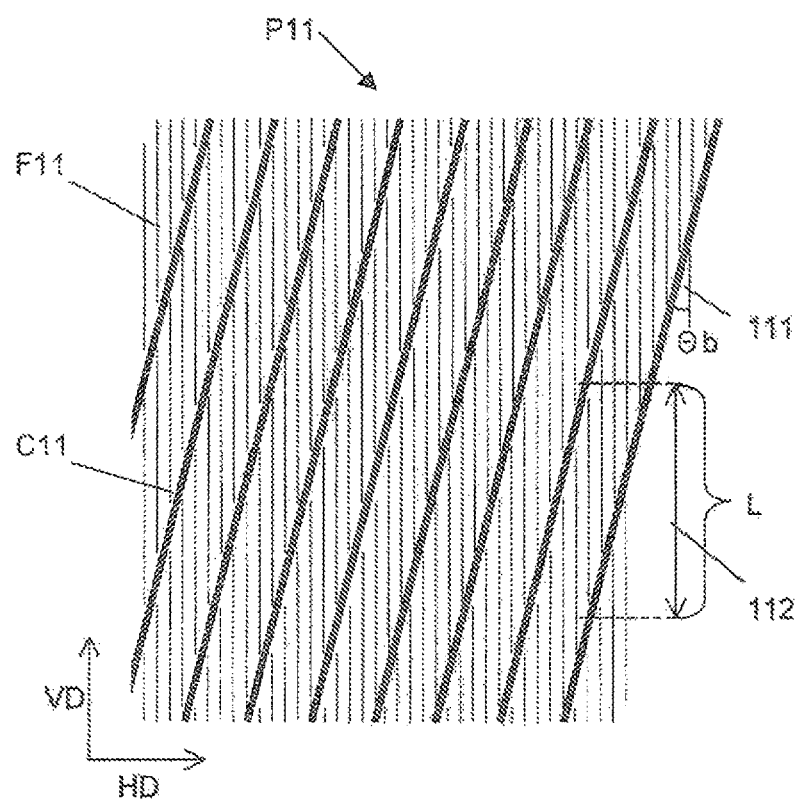
FIG. 11 shows a plan view of another aspect of the prepreg base material.

FIG. 11 shows a plan view of an aspect of the specific-angle oblique incision prepreg base material. In FIG. 11, the specific-angle oblique incision prepreg base material P11 comprises a large number of reinforcing fibers F11 oriented in one direction and a matrix resin (not shown) adhered to the reinforcing fibers F11. The orientation of the fibers F11 is in the vertical direction VD in FIG. 11. In the prepreg base material P11, a large number of incisions C11 are provided at intervals in the orientation direction of the fibers F11. Each of the large number of incisions C11 is in the form of a continuous incision. Each incision C11 is at an oblique angle Θb (the angle numbered 111 in FIG. 11) to the orientation direction of the fibers. This aspect of the prepreg base material is referred to as a specific-angle oblique continuous incision prepreg base material.

Figure 12:
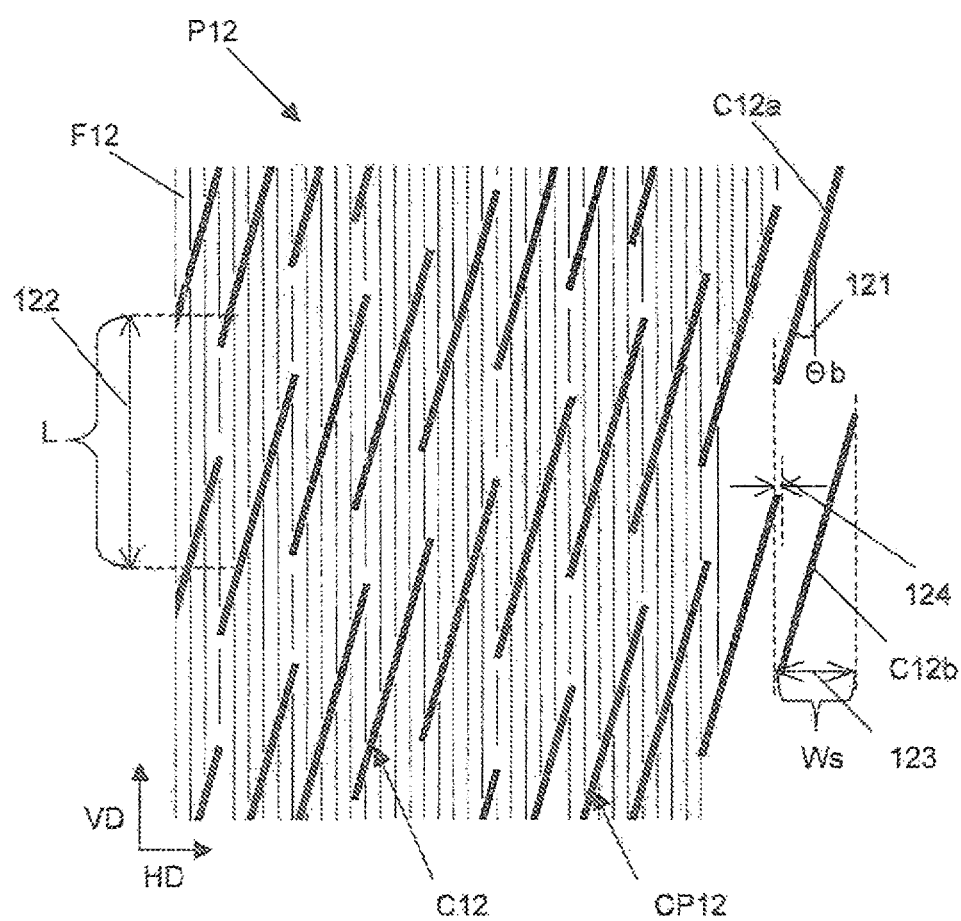
FIG. 12 shows a plan view of still another aspect of the prepreg base material.

FIG. 12 also shows a plan view of another aspect of the specific-angle oblique incision prepreg base material. In FIG. 12, the specific-angle oblique incision prepreg base material P12 comprises a large number of reinforcing fibers F12 oriented in one direction and a matrix resin (not shown) adhered to the reinforcing fibers F12. The orientation of the fibers F12 is in the vertical direction VD in FIG. 12. In the prepreg base material P12, a large number of incisions C12 are provided at intervals in the orientation direction of the fibers F12. Each of the large number of incisions C12 is in the form of an incision having a certain length. Thus, the large number of incisions C12 comprises a large number of slit segments C12a and C12b. This aspect of the prepreg base material is referred to as a specific-angle oblique constant-length incision prepreg base material.

In FIG. 11 and FIG. 12, the fibers F11 and F12 are substantially cut into fiber segments by adjacent incisions (pairs of incisions) in the orientation direction (length direction) of the fibers. The term "substantially cut" means that the 95% or more of the reinforcing fibers F11 or F12 contained in the prepreg base material P11 or P12 are cut into more than one segment. The incisions that are adjacent in the orientation direction (length direction) of the fibers are located at intervals 112 or 122, and this distance 112 or 122 is substantially equal to the fiber segment length L, although there may be small differences in some cases. The fiber segment length L is in the range of 10 to 100 mm. The prepreg base material thickness H of the prepreg base materials P11 and P12 is in the range of 30 to 300 μm.

The absolute value of the oblique angle Θb of the incision C11 in FIG. 11 and that of the incision C12 in FIG. 12 (numbered 111 and 121 in FIGS. 11 and 12, respectively) are in the range of 2 to 25° over the entire face of the prepreg base materials.

Figure 13:
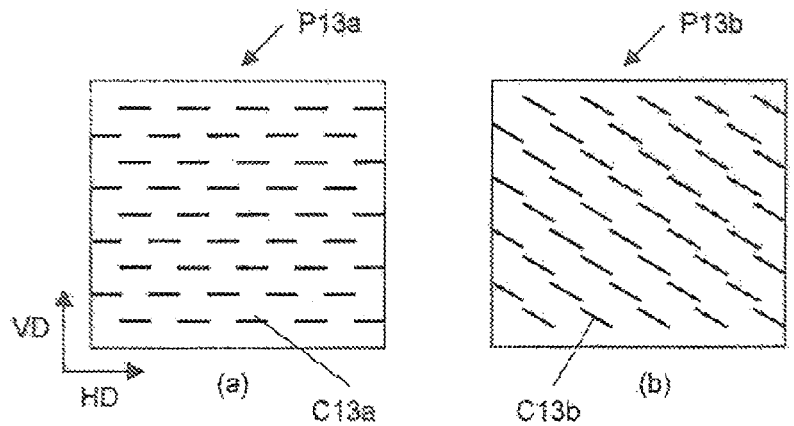
FIG. 13 shows plan views of two incision patterns to compare incision patterns in the prepreg base material.

FIG. 13 shows plan views of two types of the constant-length incision prepreg base material, which are different from the specific-angle oblique constant-length incision prepreg base material. In FIG. 13, the orientation of the fibers is in the vertical direction VD. In FIG. 13(a), the incision C13a in the prepreg base material P13a has an absolute value of the oblique angle Θb of 90°. In FIG. 13(b), the incision C13b in the prepreg base material P13b has an absolute value of the oblique angle Θb of more than 25°. These prepreg base materials P13a and P13b will not serve to produce such high-strength moldings as produced from the specific-angle oblique constant-length incision prepreg base material.

Figure 14:
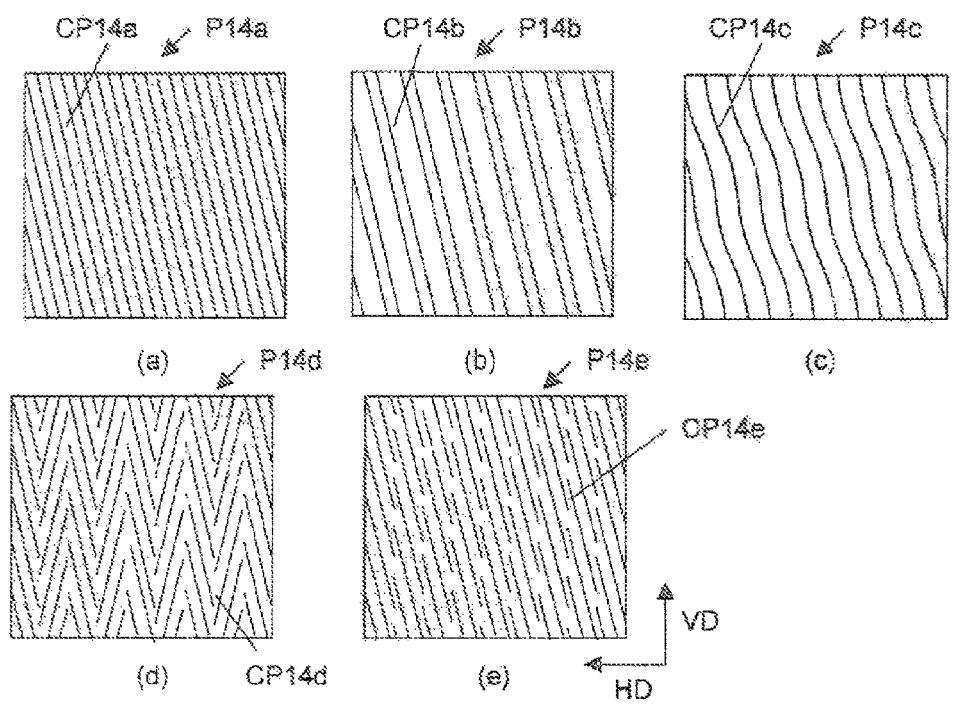
FIG. 14 shows plan views of five typical incision patterns in the prepreg base material.

FIG. 14 shows a plan view of the specific-angle oblique incision prepreg base material. FIG. 14 shows respective five prepreg base materials P14a, P14b, P14c, P14d and P14e that have different incision patterns. The reinforcing fibers in the prepreg base materials shown in FIG. 14 are oriented in the vertical direction VD. The prepreg base material P14a shown in FIG. 14(a) has an incision pattern CP14a in which oblique, continuous incisions are aligned at regular intervals. As for their shape, the incisions are in the form of straight lines. The prepreg base material P14b shown in FIG. 14(b) has a pattern CP14b in which oblique, continuous incisions are aligned at two different intervals. As for their shape, the incisions are in the form of straight lines. The prepreg base material P14c shown in FIG. 14(c) has an incision pattern CP14c in which continuous incisions are aligned at regular intervals. As for their shape, the incisions are in the form of curves (meandering lines). The prepreg base material P14d shown in FIG. 14(d) has an incision pattern CP14d in which oblique, discontinuous incisions are aligned in two different directions. As for their shape, the incisions are in the form of straight lines. The prepreg base material P14e shown in FIG. 14(e) has an incision pattern CP14e in which oblique, discontinuous incisions are aligned at regular intervals. As for their shape, the incisions are in the form of straight lines.

The incisions may have a curved shape as in FIG. 14(c), but they should preferably be in the form of straight lines as in FIGS. 14(a), (b), (d) and (e) because the flowability of the fibers can be controlled easily. The length L of the fiber segments resulting from the incisions may not be constant as in FIG. 14(b), it is preferred that the fiber segment length L is constant over the entire face of the prepreg base material because the flowability of the fibers can be controlled easily and the variation in the strength of moldings can be reduced.

The term "straight line" essentially means a part of a straight line as defined in geometry, but it may comprise a part that is not as defined as straight line in geometry as long as they serve for easy control of the flowability of the fibers. Thus, the fiber segment length L may not constant in some parts of the face of the prepreg base material.

The prepreg base materials shown in FIG. 11 and FIGS. 14(a), (b) and (c) are variations of the specific-angle oblique continuous incision prepreg base material (embodiment [1]). Thus, continuous incisions are provided in these prepreg base materials. In the case of the incision pattern in the embodiment [1], the incisions are not discontinuous and free of disturbed flows of the fibers around cut edges and all fiber segments in the incised portions have a constant length L, leading to a stable flowability of the fibers. Since the incisions are continuous, the periphery of the prepreg base material may contain portions where incisions are discontinuous or it may be fixed with a support such as an incision-free sheet-like release paper and a film so that division of the prepreg base material by adjacent incisions is eliminated to improve the handleability of the specific-angle oblique continuous incision prepreg base material.

The prepreg base materials shown in FIG. 12 and FIGS. 14(d) and (e) are variations of the specific-angle oblique constant-length incision prepreg base material (embodiment [2]). As seen from FIG. 12, discontinuous incisions C12 having a slit segment length Ws (the length numbered 123 in FIG. 12) of 30 μm to 100 mm are provided over the entire face of the prepreg base material P12, and it is preferred that the incision C12a has the same geometrical shape with the incisions C12b that is adjacent to the incision C12a in the length direction of the fibers.

If the slit segment length Ws is less than 30 μm, it will be difficult to control the incisions and also difficult to maintain the fiber segment length L in the range of 10 to 100 mm over the entire face of the prepreg base material. Thus, the flowability of the fibers will deteriorates heavily if uncut fibers exist. On the other hand, an excessive number of incisions will lead to portions having a fiber segment length L of less than 10 mm, which is undesirable.

On the contrary, the strength of the molding will be maintained in a small range if the slit segment length Ws is larger than 10 mm. Thus, the load to cause destruction will become nearly constant as the number of edges of the fibers exceeds a certain value.

The prepreg base material P12 shown in FIG. 12 has a constant fiber segment length L and a constant slit segment length Ws. In this case, any incision C12 (for instance, the incision C12a) will overlap another incision C12 (for instance, C12b) as it is translated along the orientation direction of the fibers.

Stable production of the prepreg base material P12 having the fiber segment length L of 100 mm or less can be ensured by the existence of the overlap 124, which allows the fibers to be cut into segments with a length shorter than the length L of the fiber segments cut by incisions adjacent in the orientation direction of the fibers.

The incision pattern of the embodiment [2] serves to achieve a high handleability of the resulting prepreg base material in laminating the prepreg base materials because the incisions are discontinuous. Other incision patterns CP14d and CP14e that are different from the incision pattern CP12 in FIG. 12 are shown in FIGS. 14(d) and 14(e) to suggest that any incision pattern may be used as long as the aforementioned requirements are met.

As for the embodiment [2], in view of the mechanical characteristics, it is preferred that the slit segment length Ws is in the range of 30 μm to 1.5 mm. If the absolute value of the oblique angle Θb is maintained in the range of 2 to 25°, the slit segment length Ws (the projected length Ws) can be small as compared with the actual incision length, and it is possible to form very short incisions having a slit segment length Ws of 1.5 mm or less stably in an industrial process.

As the slit segment length Ws is reduced, the number of fibers cut by an incision decreases, which will be likely to serve for production of molding having improved strength. In particular, a slit segment length Ws of 1.5 mm or less is expected to largely improve the strength of the resulting molding. In view of the processability, it is preferred that the slit segment length Ws is in the range of 1 mm to 100 mm to enable the use of a simple tool to form incisions.

The flow of the matrix resin and fibers during the molding process that uses the laminated base material to produce fiber reinforced plastic is described above by referring to FIGS. 4A and 4B, but described below is the flow of the fibers in a case where the aforementioned specific-angle oblique continuous incision prepreg base material (embodiment [1]) is used as an aspect of the prepreg base material and a case where the specific-angle oblique constant-length incision prepreg base material (embodiment [2]) is used as an aspect of the prepreg base material.

Figure 15A:
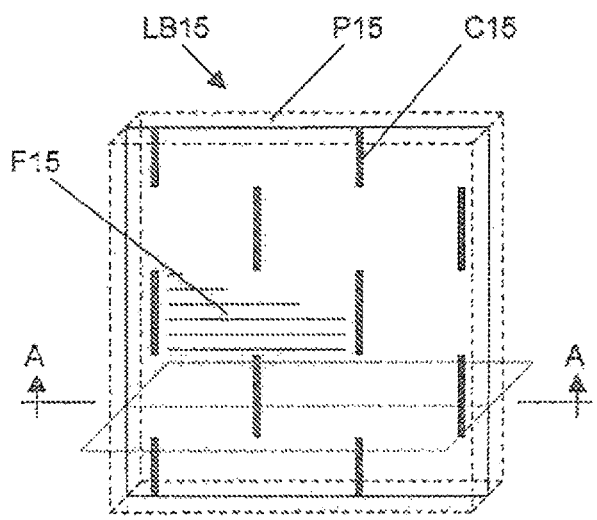
FIG. 15A shows an oblique perspective view of a typical laminated base material comprising incised prepreg base materials.
Figure 15B:
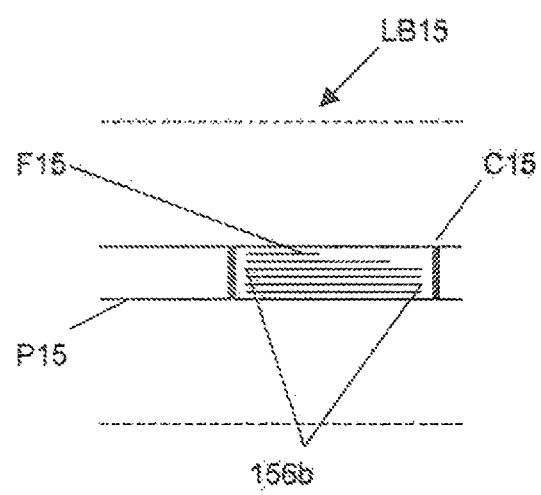
FIG. 15B shows a view of the A-A cross section specified in FIG. 15A.

Before the description, FIG. 15A is used first to discuss a laminated product LB15 produced by laminating the prepreg base materials P15 in which the absolute value of the angle Θb between the incisions shown in FIG. 13(a) and the orientation direction of the fibers is 90° to illustrate the comparison with the prepreg base material. FIG. 15A shows an oblique perspective view of the laminated product LB15. The fibers F15 in the prepreg base material P15 are oriented in the horizontal direction in FIG. 15A. The prepreg base material P15 has many slit segments C15 aligned at intervals in the orientation direction of the fibers. FIG. 15B, which gives the A-A cross section specified in FIG. 15A, shows a part of the prepreg base material P15 by using solid lines.

As seen from FIG. 15A, the incisions C15 aligned vertical to the orientation direction of the fibers F15 are provided over the entire face of the prepreg base material P15. The incisions C15 penetrate the prepreg base material P15 in its thickness direction from the top face to the bottom face. If the fiber segment length L is in the range of 100 mm or less, a required flowability of the fibers is maintained and a fiber reinforced plastic having an extended surface area (but with a decreased thickness) than the laminated product LB15 can be produced easily by press molding, etc.

Figure 15C:
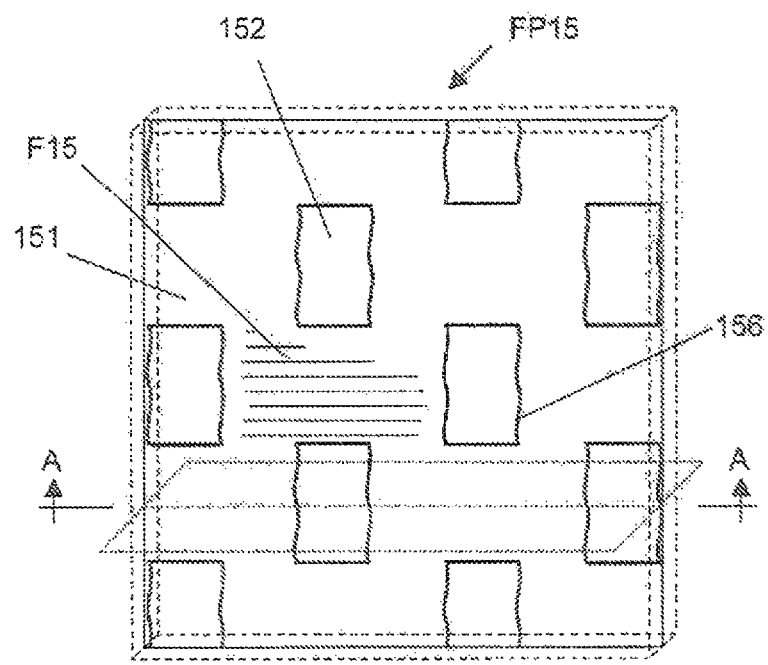
FIG. 15C shows an oblique perspective view to illustrate the laminated base material given in FIG. 15A deformed under a molding pressure applied to the laminated base material.

FIG. 15C shows an oblique perspective view of a fiber reinforced plastic FP15 having the extended surface area. As seen from FIG. 15C, when the fiber reinforced plastic FP15 having the extended area is molded, the layer (short fiber layer) 151 comprising many fiber segments originating in the prepreg base material P15 extends in the vertical direction to the fibers, resulting in the formation of fiber-free regions (incised openings) 152. This is because the reinforcing fibers will not be stretched in most cases under a small pressure such as used for the molding process.

In FIG. 15C, the incised openings 152 have a size that correspond to the extension of the short fiber layer 151. When a fiber reinforced plastic FP15 having an area of 300×300 mm is produced from a laminated base material LB15 having an area of 250×250 mm, for instance, the total area of the incised openings 152 will be 50×300 mm as compared with the 300×300 mm surface area of the fiber reinforced plastic FP15, indicating that the incised openings 152 account for ⅙ (about 16.7%).

Figure 15D:
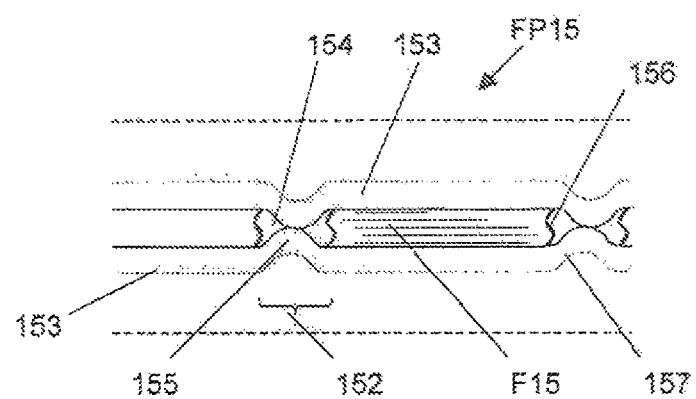
FIG. 15D shows a view of the A-A cross section specified in FIG. 15C.

FIG. 15D shows the A-A cross section specified in FIG. 15C and illustrates a resulting incised opening 152 and its vicinity with solid lines. In FIG. 15D, the adjacent layer 153 has entered the opening 152 to form a nearly triangular resin-rich portion 154 and the region 155 that has accepted the adjacent layer 153. Accordingly, when a laminated product LB15 is produced by extending the prepreg base material P15 during the molding process, the layer's undulation 157 and the resin-rich portion 154 are formed at the fiber's cut edge 156, leading to deterioration in the mechanical characteristics and decline in the surface quality of the resulting molding.

Furthermore, rigidity will differ between fiber-filled and resin-free portions, and this will lead to the formation of the fiber reinforced plastic FP15 having in-plane anisotropy, making it difficult to design a product free of warp and other problems. As for the strength, a major part of the applied load will be transferred by the fibers oriented in a direction at about ±10° or less from the load direction. The load has to be redistributed to the adjacent layers 153 at the fiber's cut edge 156. Stress concentration and peeling will take place easily if the fiber's cut edge 156b is vertical to the load direction as shown in FIG. 15D. Therefore, significant improvement in the strength of the molding cannot be expected.

Figure 16A:
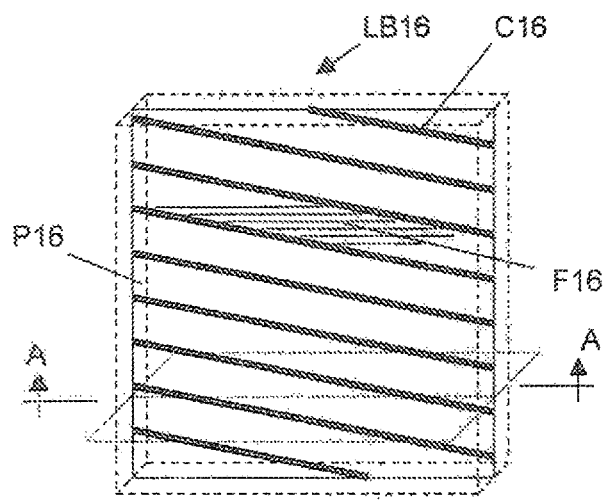
FIG. 16A shows an oblique perspective view of an aspect of the laminated base material.
Figure 16B:
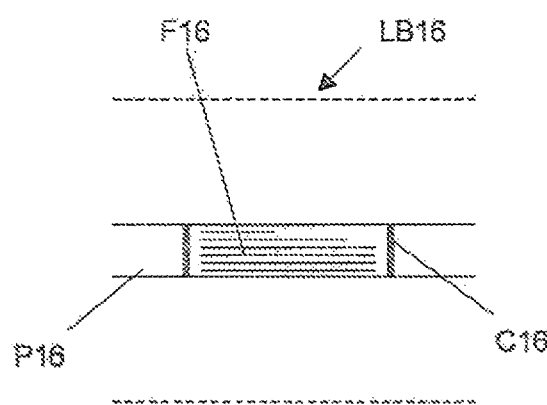
FIG. 16B shows a view of the A-A cross section specified in FIG. 16A.

Next, FIG. 16A is used to illustrate the laminated product LB16 that is produced from the specific-angle oblique continuous incision prepreg base material (embodiment [1]). FIG. 16A shows an oblique perspective view of the laminated product LB16. The fibers F16 in the prepreg base material P16 are orientated in the horizontal direction in FIG. 16A. The prepreg base material P16 has many continuous incisions C16 that are aligned at intervals in the orientation direction of the fibers and oblique to the orientation direction of the fibers. The absolute value of the oblique angle Θb of the incisions C16 is in the range of 2° to 25°. FIG. 16B shows the A-A cross section specified in FIG. 16A and illustrates a part of the prepreg base material P16 with solid lines.

As seen from FIG. 16A, continuous incisions C16 having an absolute value of the oblique angle Θb of 25° or less to the fibers F16 are provided over the entire face of the prepreg base material P16, and the incisions C16 penetrate the layer in its thickness direction. If the fiber segment length L is in the range of 100 mm or less, a required flowability of the fibers is maintained and a fiber reinforced plastic having an extended surface area, larger than that in the laminated product LB16, (but with a decreased thickness) can be produced easily by press molding, etc.

Figure 16C:
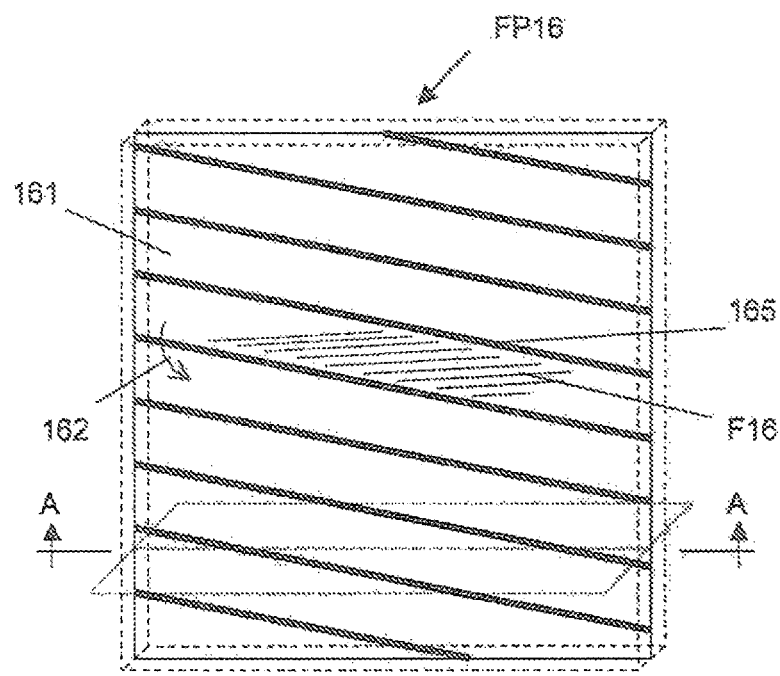
FIG. 16C shows an oblique perspective view to illustrate the laminated base material given in FIG. 16A deformed under a molding pressure applied to the laminated base material.

FIG. 16C shows an oblique perspective view of the fiber reinforced plastic FP16 having the extended surface area. As seen from FIG. 16C, when the fiber reinforced plastic FP16 having the extended area is molded, the layer (short fiber layer) 161 comprising many fiber segments originating in the prepreg base material P16 extends in the vertical direction to the fibers while the fibers 16 themselves rotate (as indicated by the arrow 162 in FIG. 16C) to compensate for the increase in surface area of the extended portion. Fiber-free portions (incised openings) 152 such as shown in FIG. 15C will not form substantially. If some incisions seem to have openings, they will account for only 0.1 to 10% of the surface area.

Figure 16D:
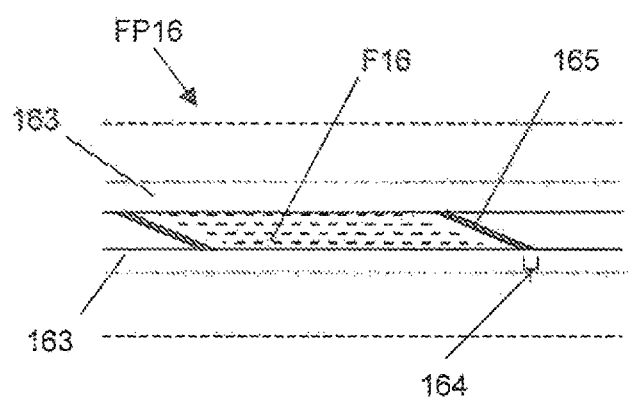
FIG. 16D shows a view of the A-A cross section specified in FIG. 16C.

As seen from FIG. 16D that shows the A-A cross section specified in FIG. 16C, therefore, there will be no such portions as the openings 152 in FIG. 15C in which the adjacent layer 163 can enter, making it possible to produce a fiber reinforced plastic FP16 having high-strength and high-quality that is free of layer undulations or resin-rich portions.

In the resulting molding, the fibers F16 exist over the entire face of the fiber layer and there are no in-plane variations in rigidity, making it possible to design product easily as in the case of conventional continuous fiber reinforced plastic. This distinct advantage of rotation and stretching of fibers to enable the production of fiber reinforced plastic free of layer undulations can be obtained only when the absolute value of the oblique angle Θb between the incisions and the reinforcing fibers is 25° or less and in addition the incisions are continuous ones.

As for the strength of the molding, furthermore, if attention is focused on the fibers, which are inclined by about ±10° or less to the load direction as described above, it is seen that the fiber's cut edges 165 tilt from the load direction as shown FIG. 16D. The fiber's cut edges 165 are inclined from the layer's thickness direction, enabling smooth transfer of loads and preventing peeling from starting at the fiber's cut edges 165. Therefore, a molding produced from the laminated product LB16 shown in FIG. 16A has largely increased strength as compared with the laminated product LB15 shown in FIG. 15A.

This tilt of the fiber's cut edges 165 from the layer's thickness direction results from a small variation in the rotation 162 of the fibers F16 from the top face to the bottom face that is caused by the friction in the top and bottom faces as the aforementioned fibers rotate. It is thought that this causes a variation in the density of the fibers F16 in the layer's thickness direction to tilt the fiber's cut edges 165 from the layer's thickness direction. This distinct advantage of large strength improvement caused by the fiber's cut edges inclined from the layer's thickness direction in the layer of the fiber reinforced plastic FP16 is obtained only when the absolute value of the oblique angle Θb between the incisions C16 and the fibers F16 is 25° or less.

Figure 17A:
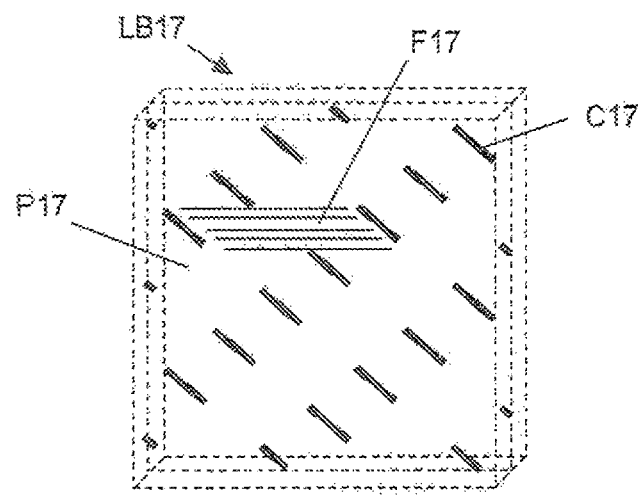
FIG. 17A shows an oblique perspective view of another aspect of the laminated base material.

Next, FIG. 17A is used to illustrate a laminated product LB17 that is produced from the specific-angle oblique constant-length incision prepreg base material (embodiment [2]). FIG. 17A shows an oblique perspective view of the laminated product LB17. The fibers F17 in the prepreg base material P17 are orientated in the horizontal direction in FIG. 17A. The prepreg base material P17 has many constant-length slit segments C17 that are aligned at intervals in the orientation direction of the fibers and oblique to the orientation direction of the fibers. The absolute value of the oblique angle Θb of the slit segments C17 is in the range of 2° to 25°.

As seen from FIG. 17A, the discontinuous slit segments C17 having an absolute value of the oblique angle Θb of 25° or less to the fibers F17 are provided over the entire face of the prepreg base material P17, and the slit segments C17 penetrate the layer in its thickness direction. The slit segment length (projected length) Ws can be decreased to 1.5 mm or less by reducing the actual length of the slits and the oblique angle Θb of the incisions. If such slit segments C17 exist and the fiber segment length L is 100 mm or less over the entire face of the prepreg base material P17, a required flowability of the fibers is maintained and a fiber reinforced plastic having an extended surface area, larger than that in the laminated product LB17, can be produced easily by press molding, etc.

Figure 17B:
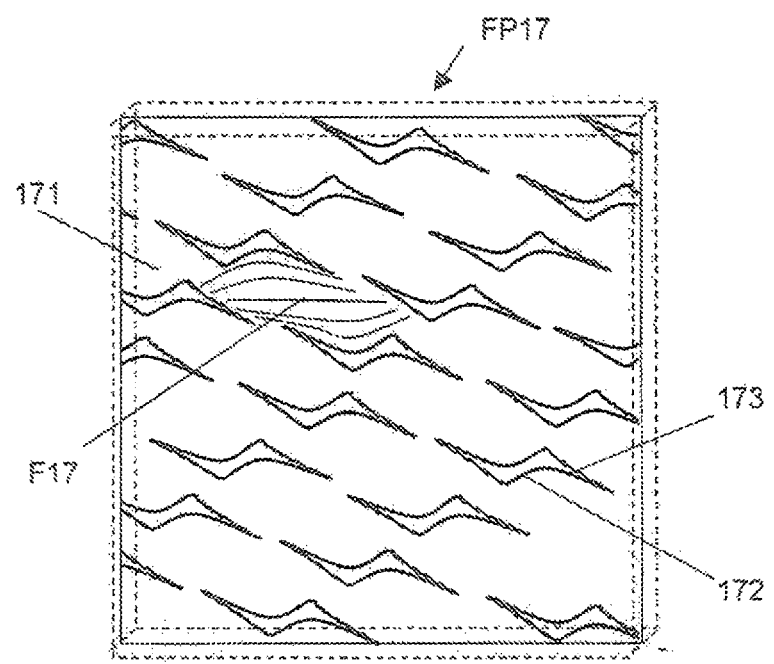
FIG. 17B shows an oblique perspective view to illustrate the laminated base material given in FIG. 17A deformed under a molding pressure applied to the laminated base material.

FIG. 17B shows an oblique perspective view of the fiber reinforced plastic FP17 having an extended surface area.

As seen from FIG. 17B, when the fiber reinforced plastic FP17 having the extended area is molded, the layer (short fiber layer) 171 comprising many fiber segments originating in the prepreg base material P17 extends in the vertical direction to the fibers but not elongated in the fiber direction, resulting in the formation of fiber-free regions (incised openings) 172. However, the adjacent short fiber bundles flow in the vertical direction to the fibers to fill the incised opening 172, leading to a decrease in the area of the incised opening 172.

This tendency increases particularly when the slit segment length (projected length) Ws is 1.5 mm or less. Substantially, incised openings 172 will not form, and if some incisions seem to have openings, they will account for only 0.1 to 10% of the surface area. Therefore, there will be no portions in which the adjacent layer can enter, making it possible to produce a fiber reinforced plastic FP17 having high-strength and high-quality that is free of layer undulations or resin-rich portions.

In the resulting molding, the fibers F17 exist over the entire face of the fiber layer and there are no in-plane variations in rigidity, making it possible to design product easily as in the case of conventional continuous fiber reinforced plastic. This distinct advantage of the flow of fibers in the vertical direction to the fibers to fill the incised openings and enable the production of fiber reinforced plastic free of layer undulations can be obtained only when the absolute value of the oblique angle Θb between the incisions and the reinforcing fibers is 25° or less and in addition the slit segment length (projected length) Ws is 1.5 mm or less. The slit segment length (projected length) Ws should more preferably be 1 mm or less to provide higher-strength, higher-quality molding.

It is still more preferable that the area of the incised openings in the outermost layer of the fiber-reinforced plastic is substantially zero. The expression "the area of the incised openings is substantially zero" means that the elimination of openings is desirable but significant problems will not take place if the area of the incised openings in the outermost layer accounts for 1% or less of the surface area of the fiber reinforced plastic.

If the absolute value of the oblique angle Θb from the fiber direction exceeds 25°, resin-rich portions and fiber-free regions in the layer, i.e., regions where reinforcing fibers of the adjacent layer are exposed, are formed in the outermost layer, and therefore, such molding cannot be used effectively as external members. On the other hand, the fiber-reinforced plastic can be used as external members because such resin-rich portions or fiber-free regions will not be formed easily.

Methods got forming incisions in an elemental prepreg base material (preliminary prepreg base material) to produce the prepreg base material are described above. They are described more specifically below by referring to drawings.

Figure 18:
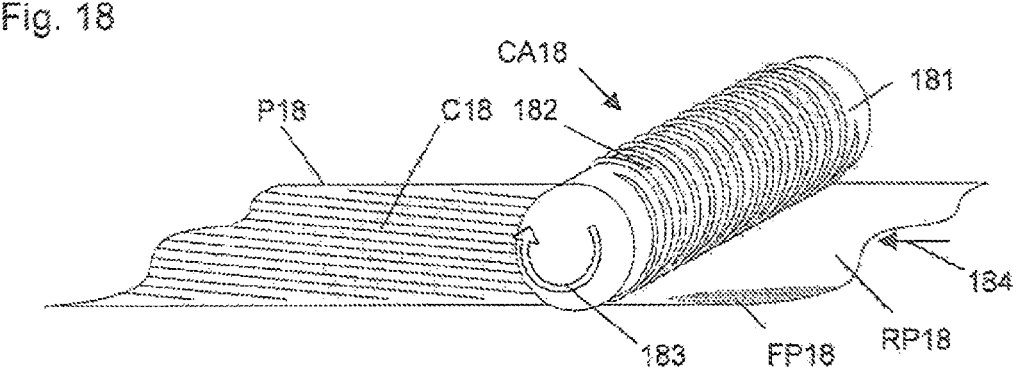
FIG. 18 shows a schematic oblique perspective view of a typical incision apparatus to incise the prepreg base material.

FIG. 18 shows an oblique perspective view of a typical incision apparatus comprising a rotary blade roller that is used preferably to incise the prepreg base material. In FIG. 18, an incision apparatus CA18 includes a rotary blade roller 181. The rotary blade roller 181 has a cylindrical shape, and a helical blade 182 is provided on its external surface. The rotary blade roller 181 is fixed on a rotary drive shaft (not shown) supported rotatably on an equipment base (not shown) and rotates in the direction indicated with the arrow 183. A prepreg base material conveying means (not shown) is provided below the rotary blade roller 181 to support the prepreg base material and convey it in the direction indicated with the arrow 184. The elemental prepreg base material (preliminary prepreg base material) RP18 to be incised is supplied under the rotary blade roller 181 by the prepreg base material conveying means and the incisions C18 are formed in the elemental prepreg base material (preliminary prepreg base material) RP18 by the helical blade 182 on the rotary blade roller 181 that is rotating. Thus a prepreg base material P18 is produced.

The helical blade 182 may be either a continuous blade or a discontinuous blade. A continuous blade is used to produce a continuously incised prepreg base material as shown in FIG. 11. A discontinuous blade is used to produce a discontinuously incised prepreg base material as shown in FIG. 12.

Two other incision apparatuses are described below by referring to FIG. 19A and FIG. 19B. These are designed to prepare an elemental prepreg base material (preliminary prepreg base material) comprising obliquely oriented fibers and then make incisions in the length direction or in the width direction of the elemental prepreg base material.

Figure 19A:
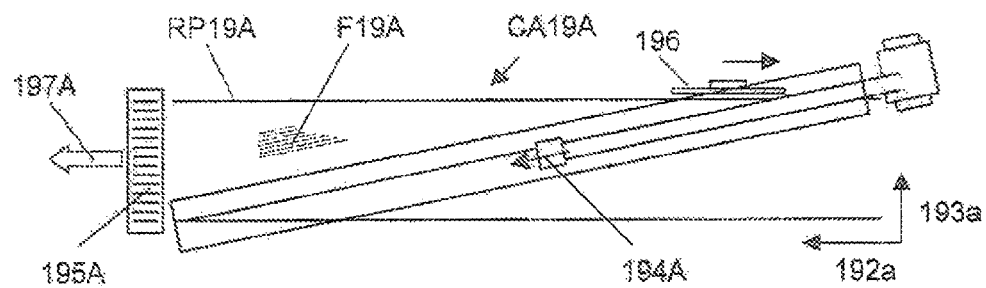
FIG. 19A shows a schematic plan view of an arrangement of a preliminary prepreg base material to produce the prepreg base material and another incision apparatus to incise the arranged preliminary prepreg base material.

FIG. 19A shows a schematic plan view of an incision apparatus CA19A. In FIG. 19A, the incision apparatus CA19A comprises a movable head 194A that moves in the direction inclined by 2 to 25° from the length direction 192a of an elemental prepreg base material RP19A to be produced, a force-cutting blade 195A fixed at an edge in the length direction 192a of the apparatus, and an edge-processing rotary blade 196 to trim an edge of the elemental prepreg base material RP19A provided at an edge in the width direction 193a of the apparatus.

The movable head 194A places an elemental prepreg base material that has a certain length or is continuous or a bundle of reinforcing fibers impregnated with matrix resin on a prepreg base material support table (not shown) of the apparatus CA19A. This prepares the elemental prepreg base material RP19A. In the elemental prepreg base material RP19A, the orientation direction of reinforcing fibers F19A is inclined by 2 to 25° from the length direction 192a of the elemental prepreg base material RP19A.

Subsequently, incisions are formed by the force-cutting blade 195A in the elemental prepreg base material RP19A prepared above. The elemental prepreg base material RP19A is moved in the direction indicated by the arrow 197A, and then a large number of incisions are formed in the elemental prepreg base material RP19A at intervals in its length direction 192a. This produces a prepreg base material. The side edge of the elemental prepreg base material RP19A is trimmed, as needed, by the edge-processing rotary blade 196. A rotary roller having a cutter blade may be used instead of the force-cutting blade 195A.

Figure 19B:
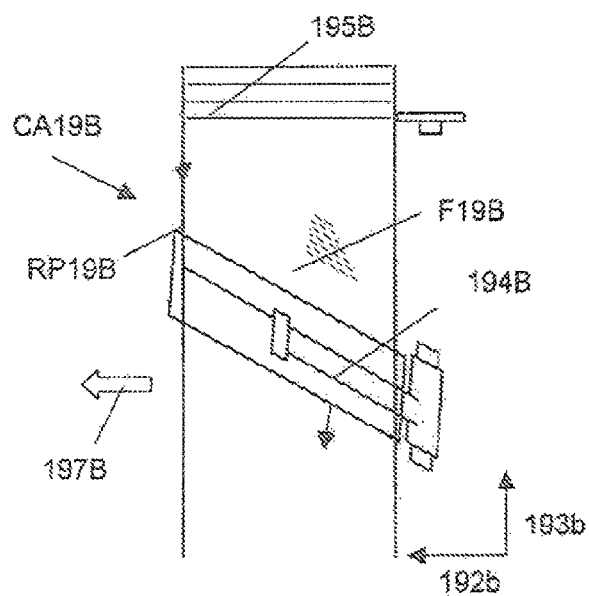
FIG. 19B shows a schematic plan view of an arrangement of a preliminary prepreg base materials to produce the prepreg base material and another incision apparatus to incise the arranged preliminary prepreg base materials.

FIG. 19B shows a schematic plan view of an incision apparatus CA19B. In FIG. 19B, the incision apparatus CA19B comprises a movable head 194B that moves in the direction inclined by 2 to 25° from the width direction 192b of an elemental prepreg base material RP19B to be produced, and a rotary blade 195B provided at an edge in the width direction 193b of the apparatus CA19B.

The movable head 194B places an elemental prepreg base material that has a certain length or is continuous or a bundle of reinforcing fibers impregnated with matrix resin on a base material support table (not shown) of the apparatus CA19B. This prepares the elemental prepreg base material RP19B. In the elemental prepreg base material RP19B, the orientation direction of reinforcing fibers F19B is inclined by 2 to 25° from the width direction 193b of the elemental prepreg base material RP19B.

Subsequently, incisions are formed by the rotary blade 195B, which moves in the width direction 193b of the elemental prepreg base material RP19B, in the elemental prepreg base material RP19B prepared above. The elemental prepreg base material RP19B is moved in the direction indicated by the arrow 197B, and then a large number of incisions are formed in the elemental prepreg base material RP19B at intervals in its length direction 192b. This produces a prepreg base material.

For the prepreg base material produced, the incisions may be filled or fused with a resin by performing thermocompression bonding with a roller, etc. to improve the handleability of the prepreg base material.

For a laminated base material, it is preferred that two of the prepreg base material are laminated, with the incisions in the bottom layer crossing any incision in the top layer at an angle (absolute value) of 4 to 90°.

Figure 20:
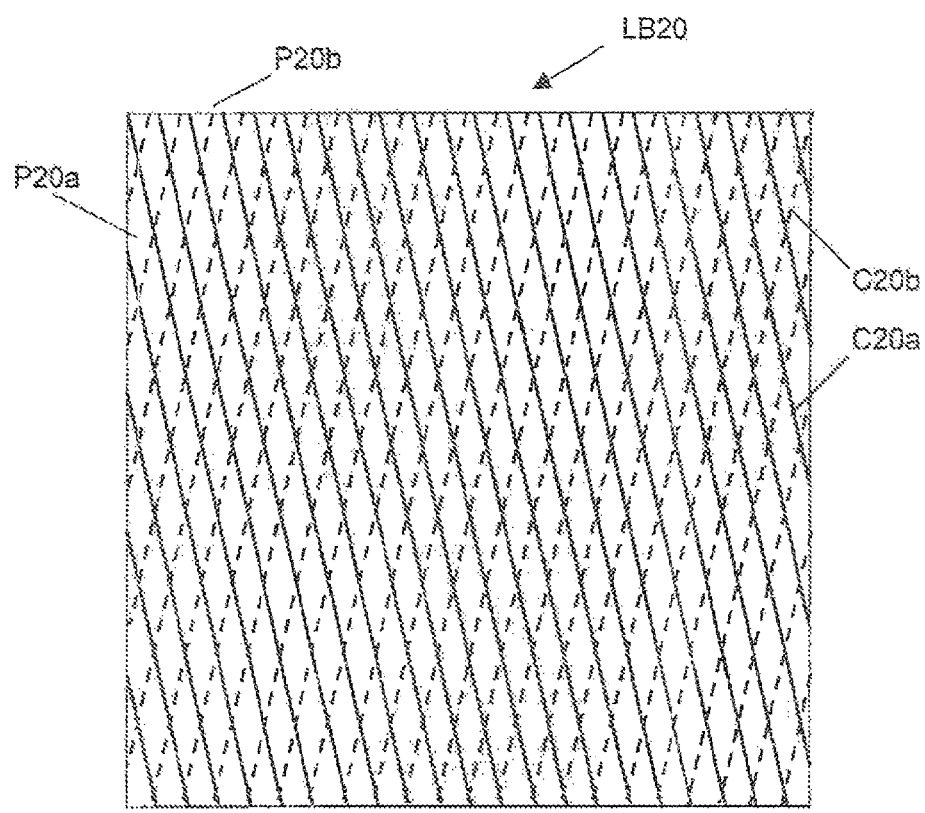
FIG. 20 shows a plan view of another aspect of the laminated base material.

FIG. 20 shows a plan view of a laminated base material in this aspect. In FIG. 20, a laminated base material LB20 is formed with two prepreg base materials P20a and P20b laminated each other. The incisions C20b (shown by dotted lines) in the bottom layer cross any incision C20a (shown by solid lines) in the top layer at an angle (absolute value) of 4 to 90°.

In the specific-angle oblique incision prepreg base material, it is required that the absolute value of the oblique angle Θb between the fibers and the incisions is 25° or less and the fiber segment length L is 100 mm or less, therefore the number of incision per unit area becomes large geometrically. Thus, the fibers are discontinuous at many points in the prepreg base material, leading to poor handleability.

In particular, heavy deterioration in handleability takes place when the incisions are continuous. If two prepreg base materials in which incisions are in different oblique angles Θb are laminated first, therefore, the resulting multi-layered laminate prepreg base material has a highly improved handleability. A laminate of three or more layers may also be helpful, but the thickness will be large and drape properties will deteriorate. It is preferable, therefore, that a laminated base material having two layers is used as a unit.

For a combination of the top and bottom layers in a prepreg base material comprising integrated two layers, there are no specific limitations on the combinations of fiber arranging directions in the prepreg base material, if a crossing angle (absolute value) between the incisions in the top and bottom layers is in the range of 4 to 90°. Thus, the combination of fiber arranging directions may be, for instance, 45° and −45°, 0° and 90°, or 0° and 0°.

The specific-angle oblique incision prepreg base material defined as an aspect of the prepreg base material may be in the form of a two-face incision prepreg base material as described above in FIG. 5. This aspect of the prepreg base material is referred to as a specific-angle oblique two-face incision prepreg base material.

Figure 21:
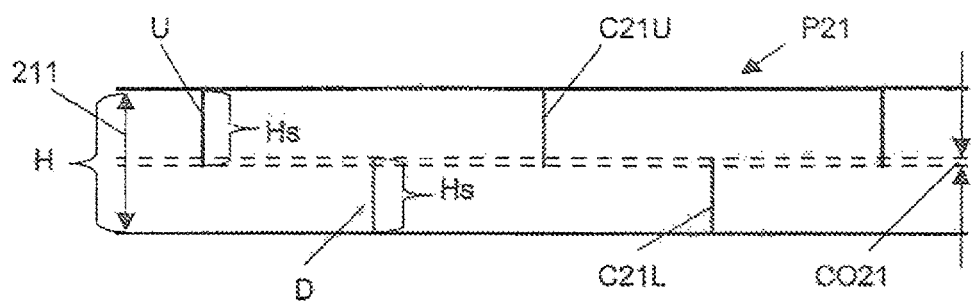
FIG. 21 shows a longitudinal cross-sectional view of an aspect of the two-face incision prepreg base material produced by forming incisions from the top face and the bottom face of an oblique-incision prepreg base material.

FIG. 21 shows a longitudinal section of a typical specific-angle oblique two-face incision prepreg base material. In FIG. 21, the fibers in a specific-angle oblique two-face incision prepreg base material P21 are oriented in the horizontal direction. The prepreg base material P21 has incisions C21U cut from the top face and incisions C21L cut from the bottom face, and both incisions C21L and C21L do not penetrate the thickness (vertical direction in FIG. 21) of the prepreg base material P21. The cutting depth Hs of each of the incisions C21U and C21L is in the range of 0.4 to 0.6 times the thickness H (length numbered 211 in FIG. 21) and, when projected in the length direction of the fibers, the incisions from the top face and those from the bottom face have an overlap CO21. The length of this overlap CO21 in the thickness direction of the prepreg base material is in the range of 0.01H to 0.1H.

If, furthermore, the oblique angle Θb of an incision C21U from the top face is denoted as oblique angle Θc and the oblique angle Θb of an incision C21L from the bottom face that crosses the incision C21U is denoted as oblique angle Θd, then it is preferred that the value of Θd is equal to the value of −Θc. The strength of a molding tends to decrease as the depth Hs of the incisions increases but there is a limit to the thickness that enables low-cost production of the prepreg base material.

Compared with this, it has been found that the strength of a molding can be largely improved while maintaining a required flowability of the fibers if at the incising step, incisions are formed from the top and bottom faces to a depth about half the thickness of the prepreg base material.

Instead, thin prepreg base material layers may be prepared first, followed by adhering them. Considering the additional cost for the adhering step, however, it is preferable to make incisions from both faces.

It is preferred that the value of Θd is equal to the value of −Θc as described above, the advantage of largely improving the strength while maintaining a required flowability can be obtained if the value of Θd satisfies the relation: Θd=from (−Θc−5°) to (−Θc+5°).

FIG. 21 shows a case where the depth U of the incisions made from the top face and the depth D of the incisions made from the bottom face have the same cutting depth Hs, but the depths of these incisions may differ on the condition that their depths are in the range of 0.4H to 0.6H.

It is preferred that that the oblique angle Θc between the incisions from the top face and the fiber direction and the oblique angle Θd between the incisions from the bottom face and the fiber direction meet the following equation: Θc=−Θd. The degree of improvement in the strength of a molding depends on the oblique angle of the incisions and therefore, a prepreg base material having stable performance can be produced by adjusting the oblique angle Θc and the oblique angle Θd to have the same absolute value. Since the rotation direction of the fibers during a molding process depends on whether the oblique angle of the incisions is positive or negative, furthermore, the fibers may be adjusted to have the opposite rotation directions to allow the fiber direction at a laminate preparation step to equal the average of the aforementioned fiber orientations, leading to a highly robust prepreg base material.

Ideally, when the cutting depth Hs equals 0.5H, the size of defects becomes uniform, i.e., the defect size becomes lowest, minimizing the destruction initiation load. However, the flowability will decrease extremely if there remain fibers that are not cut by either the incision from the top face or those from the bottom face, and therefore, it is preferred that incisions having a depth of about 0.5H+0.05H are made from the top and bottom faces. This eliminates quality defects that cause deterioration in the flowability of the fibers, and serves to maintain the production stability.

As a means for making incisions from both faces, for example, there is a method comprising preparing an elemental prepreg base material (preliminary prepreg base material) comprising reinforcing fibers oriented in one direction, following pressing a force-cutting tool against either the top or bottom face to make incisions that do not penetrate the layer in the thickness direction and then pressing it against the other face in the same way. As a method to achieve a high production stability, in particular, a rotary blade roller having a helical blade provided on the roller surface is pressed against one face to make incisions that do not penetrate the layer in the thickness direction, followed by pressing the roller with helical blade against the other face.

The specific-angle oblique incision prepreg base material defined as an aspect of the prepreg base material may be in the form of a sloped incision prepreg base material having incisions inclined in the thickness direction of the prepreg base material as described in FIG. 6. This aspect of the prepreg base material is hereinafter referred to as a specific-angle oblique sloped incision prepreg base material.

Figure 22:
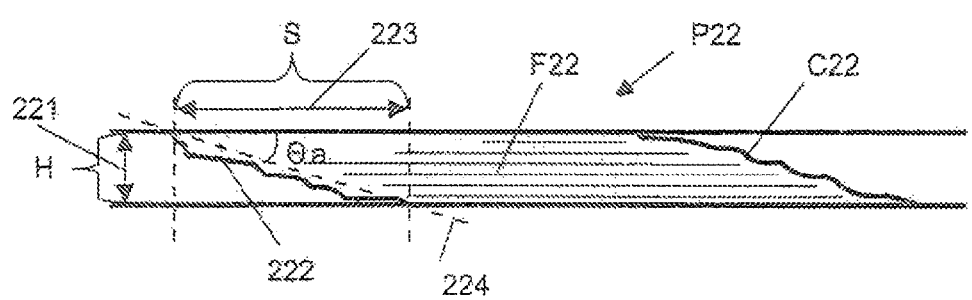
FIG. 22 shows a longitudinal cross-sectional view of a sloped-incision prepreg base material produced by forming incisions sloped in the thickness direction of the prepreg base material in an oblique-incision prepreg base material.

FIG. 22 shows a longitudinal section of a typical specific-angle oblique sloped incision prepreg base material. In FIG. 22, the fibers in the specific-angle oblique sloped incision prepreg base material P22 are oriented in the horizontal direction. The prepreg base material P22 has incisions C22 sloped in the thickness direction of the prepreg base material P22 aligned at intervals in the orientation direction of the fibers.

For any incision C22, the shear distance S is defined as the distance 223 measured in the orientation direction of the fibers between the cut line in the reinforcing fibers in the top face and that in the bottom face of the prepreg base material P22. Then, the angle Θa expressed by the following equation (Formula I) in terms of S and the thickness H of the prepreg base material P22 (length numbered 221 in FIG. 22) is preferably in the range of 1 to 25°:

$$\Theta a = \tan^{-1}\left(\frac{H}{S}\right).$$ Formula I

As described above, when a fiber reinforced plastic is produced by molding a laminated product of prepreg base materials in which the absolute value of the in-plane oblique angle Θb between the incisions and the fiber direction is 25° or less, the fiber's cut edge in the fiber reinforced plastic is oblique to the layer's thickness direction, serving to provide a molding having largely improved strength. It has been found that the aforementioned effect can be further enhanced and a fiber reinforced plastic that has an improve strength resulting from a smaller angle of the fiber's cut edge can be produced by using a prepreg base material that has incisions inclined in the thickness direction of the prepreg base material. In particular, a molding having largely improved mechanical characteristics can be obtained when the inclination angle Θa of the incisions is 25° or less. On the other hand, it is very difficult to make inclined incisions having an inclination angle Θa of less than 1°.

As a means for providing a prepreg base material with incisions inclined in the thickness direction in the prepreg base material, there is a method of forming directly inclined incisions. Another means, for instance, is preparing an elemental prepreg base material (preliminary prepreg base material) comprising reinforcing fibers oriented in one direction, making incisions penetrating the layer in the thickness direction, heating to soften the preliminary prepreg base material, and, while maintaining the state, pressing nip rollers with different rotating speeds against the top and bottom faces to cause a shear force to incline the sections in the reinforcing fibers in the thickness direction.

For the latter case, FIG. 22 shows a vertical cross section in a prepreg base material to illustrate a side face of the reinforcing fibers. The fiber cut lines 222 of the incisions have a zigzag shape instead of a straight line. In this case as well, however, the distance 223, measured in the orientation direction of the fibers, between the position of an incision in the top face and the position of the incision in the bottom face is referred to as the distance S for convenience. To calculate the inclination angle Θa of the incisions, the average of the shear distance 223 of the incisions C22 over the entire face of the prepreg base material is used as the shear distance S in Formula I.

For a prepreg base material, the prepreg base material, it is preferred that at least one of the surfaces is provided with a resin-based film sheet or non-woven fabric sheet as an additional resin layer, wherein the tensile elongation of the resin is higher than the tensile elongation of a matrix resin of the prepreg base material while the thickness of the additional resin layer is larger than a diameter of each of single fibers that form the reinforcing fibers in the prepreg base material and smaller than 0.5 times the thickness of the prepreg base material. This aspect of the prepreg base material is referred to as a resin-layer-added prepreg base material.

If interlayer peeling is caused by cracks a layer of a fiber reinforced plastic produced by molding a laminated base material, it is likely to result finally in the destruction of the molding. To prevent this, it is preferred that an additional resin layer of a resin having a higher elongation degree than a matrix resin is provided between the layers. If such an additional resin layer exists, it serves very effectively to prevent interlayer peeling, leading to improved strength of the molding.

Figure 23:
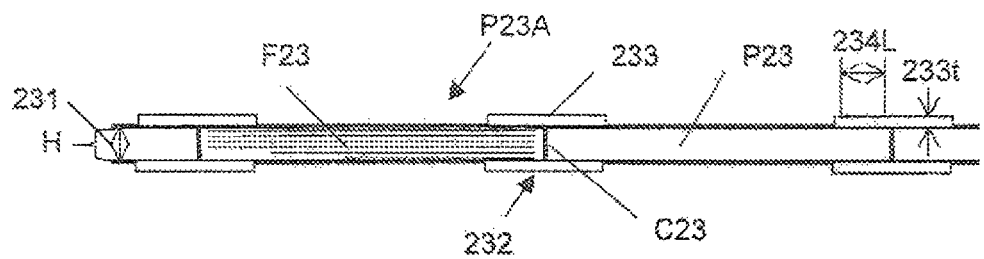
FIG. 23 shows a longitudinal cross-sectional view of a typical prepreg base material having an additional resin layer.

FIG. 23 shows a longitudinal section of a resin-layer-added prepreg base material. To produce a resin-layer-added prepreg base material P23A shown in FIG. 23, a prepreg base material P23 free of additional resin layers is prepared first, and an additional resin layer 233 is adhered to cover a portion that extends horizontally centering on the position 232 where an incision C23 is located. The additional resin layer 233 is provided at least one of the faces of the prepreg base material P23. In FIG. 23, the additional resin layer 233 is provided on both the top and bottom faces of the prepreg base material P23. Reinforcing fibers F23 in the prepreg base material P23 are oriented in the horizontal direction in FIG. 23.

The additional resin layer 233 is in the form of a film or non-woven fabric made of resin. The tensile elongation of the resin of the additional resin layer 233 is larger than that of a matrix resin of the prepreg base material P23. The thickness 233t of the additional resin layer 233 is larger than the diameter of each fiber (single fiber) of the reinforcing fibers F23 in the prepreg base material P23 and 0.5 or less times the thickness H of the prepreg base material P23 (the length numbered 231 in FIG. 23).

For the resin-layer-added prepreg base material P23A, it is preferred that the length 234L of the additional resin layer 233 extending to the right or to the left from the position 232 where the incision C23 is located is in the range of 1 to 100 times the thickness H of the prepreg base material P23 when measured in the orientation direction of the fibers F23 in the prepreg base material P23. The additional resin layer 233 is preferably in a laminar form and provided over the surface of the prepreg base material P23 without entering the layer formed of the reinforcing fibers F23.

The expression "the additional resin layer is in a laminar form without entering the layer formed of the reinforcing fibers" means that the additional resin is not in a state that has an anchor effect into the layer formed of the reinforcing fibers. However, a small part of the additional resin (for instance, 20 vol % or less of the total amount of the additional resin) may have entered in the layer formed of the reinforcing fibers as a result of melting, etc. Thus, the additional resin may exist around part of the reinforcing fibers instead of the matrix resin if it accounts only for 20 vol % or less of the total amount of the additional resin.

As described above, the tensile elongation of the additional resin is larger than the tensile elongation of the matrix resin, and this serves to prevent interlayer peeling. As the amount of the additional resin increases excessively, however, the fiber volume content Vf of the fiber reinforced plastic decreases to reduce the elastic modulus. Thus, it is preferred that the amount of the additional resin adhered to the prepreg base material P23 is less than 10% of the amount of the matrix resin in the prepreg base material P23.

A high efficiency of improving strength of a molding is achieved by disposing the additional resin exclusively at the fiber's cut edges where stress concentration is likely to take place. As for the way of disposing the additional resin, it is preferred that the resin is in the form of a layer laid over a surface of the prepreg base material P23 without entering a layer formed of the reinforcing fibers. The term "the layer formed of the reinforcing fibers" means the same as the prepreg base material P23.

If the additional resin is adhered too thickly to heap up on a surface of the prepreg base material P23, a resulting laminated product will become bulky, which is not desirable. A film sheet or non-woven fabric sheet made of the additional resin may be used as the additional resin layer 233.

There are no specific limits to the tensile elongation of the additional resin if it is larger than the tensile elongation of the matrix resin, but it should preferably be 2 to 10 times the tensile elongation of the matrix resin. The value of the tensile elongation of the additional resin is preferably in the range of 2 to 50%. It is more preferably in the range of 8 to 20%. Maintaining the tensile elongation of the matrix resin larger than the tensile elongation of the additional resin works to prevent interlayer peeling and ensures a production of molding having improved strength.

It is preferred that the tensile strength of the additional resin is larger than the tensile strength of the matrix resin. This is because, cracks, i.e. fractures of resin, will be less likely to take place when the tensile strength of the additional resin is higher than that of the matrix resin. The tensile strength of the additional resin should more preferably be 1.5 or more times the tensile strength of the matrix resin. It is also preferable that the fracture toughness of the additional resin is higher than that of the matrix resin.

The tensile elongation and tensile strength of the resin are measured according to provisions specified in JIS-K-7113 (1995) or ASTM-D638 (1997). The fracture toughness of resin, for instance, is measured according to provisions specified in ASTM-E399 (1983) (specifications for compact test). Measurements of the fracture toughness of resin can vary largely depending on the measuring method used, and therefore, the value of fracture toughness should be as large as possible as compared with that of the matrix resin measured with the same test method. For instance, the fracture toughness of the additional resin may be 500 J/m$^2$ when the fracture toughness of the matrix resin is 100 J/m$^2$. The fracture toughness of the additional resin should more preferably be 3 or more times the fracture toughness of the matrix resin.

Any of the resins listed above as material for the matrix resin may be used as the additional resin if its tensile elongation is higher than that of the matrix resin, but thermoplastic ones are particularly preferable. It is known that thermoplastic resins are generally higher in tensile elongation and fracture toughness than thermosetting resins, and more useful in producing a molding having improved strength. Highly preferable ones include polyamide, polyester, polyolefin, and polyphenylene sulfone in terms of the balance between resin characteristics and required cost and the design freedom involving resin viscosity.

It is preferred that the additional resin has the highest possible compatibility with the matrix resin and has a melting point nearly equal to or lower than the molding temperature. Among others, polyamide-based resins processed by copolymerization to reduce the melting point down to about 100 to 200° are particularly preferable because they are highly compatible with thermosetting resins and also high in tensile elongation, tensile strength, and fracture toughness. The most lightweight, high-strength, high-rigidity fiber reinforced plastic can be produced when carbon fibers, an epoxy resin, and a polyamide resin are used as reinforcing fibers, a matrix resin, and an additional resin, respectively.

This disclosure is described more in detail below by referring to examples, but these examples are not intended to place any limitations on the disclosure.

<Flat Plate Molding Process>

A predetermined elemental prepreg base material comprising reinforcing fibers and a matrix resin was placed on a mold having a surface area of 300×300 mm, followed by molding processing in a heating-pressing machine at a pressure of 6 MPa and a temperature of 150° C. for a predetermined time, to produce a flat plate molding having a size of 300×300 mm.

<Mechanical Characteristics Evaluation Method>

A tensile strength test piece having a length of 250±1 mm and a width of 25±0.2 mm was cut out from the flat plate molding produced. The tensile strength of the test piece was measured according to the test method specified in JIS-K-7073 (1998) with a gage length of 150 mm and a crosshead travel rate of 2.0 mm/min. For this test, Instron (registered trademark) Model 4208 universal testing machine was used as a testing machine. The number, n, of the test pieces used for the measurement was 5, and the average of the measurements made was used as the value of tensile strength. In addition, the standard deviation for the measurements was calculated, and the coefficient of variation (CV value (%)), which serves as indicator of dispersion, was determined by dividing the standard deviation by the value of tensile strength obtained above.

<Moldability Evaluation>

The warp of the flat plate as well as the flowability based on the extending of the elemental prepreg base material during molding was evaluated from the properties of the flat plate molding obtained.

In the flowability evaluation of the base material, the flowability was evaluated as "high" (shown by symbol "o" in Tables) if the mold cavity was filled with the fiber reinforced-plastic produced and the base material of the outermost layer had been extended to the vicinity of the mold edge. The flowability was evaluated as "moderate" (shown by symbol "Δ" in Tables) if the mold cavity was filled with the fiber reinforced-plastic produced, but the base material of the outermost layer had been little extended. The flowability was evaluated as "low" (shown by symbol "x" in Tables) if the mold cavity was not completely filled with the fiber-reinforced plastic produced.

As for the evaluation for the warp of the flat plate, the flat plate is simply placed on a flat surface of a test table and the plate is evaluated as "free" of warp (shown by symbol "○" in Tables) if its entire surface comes in contact with the surface of the test table. The plate is evaluated as having "slight" warp (shown by symbol "Δ" in Tables) if the flat plate does not entirely come in contact with the flat surface of the test table when simply placed on the test table, but entirely comes in contact with the flat surface of the test table when pressed with a finger from above the top face of the flat plate. The plate is evaluated as having "significant" warp (shown by symbol "x" in Tables) if the flat plate does not entirely come in contact with the surface of the test table even when pressed with a finger from above the top face of the flat plate. The results of the evaluations are shown in Tables 1 to 23 using the aforementioned symbols.

<Comparison in Terms of Shape of Prepreg Base Material—See Table 1>

Example 1

An epoxy resin mixture (30 parts by weight of Epikote (registered trademark) 828 produced by Japan Epoxy Resins Co., Ltd., 35 parts by weight of Epikote (registered trademark) 1001, and 35 parts by weight of Epikote (registered trademark) 154) was heat-kneaded with 5 parts by weight of polyvinyl formal (Vinylec (registered trademark) K produced by Chisso Corporation), a thermoplastic resin, in a kneader to ensure uniform dissolution of the polyvinyl formal, followed by kneading of 3.5 parts by weight of dicyandiamide (DICY7 produced by Japan Epoxy Resins Co., Ltd.) and 4 parts by weight of 3-(3,4-dichlorophenyl)-1,1-dimethylurea (DCMU99 produced by Hodogaya Chemical Co., Ltd.), as a curing agent and a curing accelerator, respectively, in a kneader to prepare an uncured epoxy resin composition. This epoxy resin composition was applied over a sheet of silicone-coated release paper with a thickness of 100 µm using a reverse roll coater to produce a resin film.

Then, the resin film was attached to both sides of a sheet formed of a large number of carbon fibers oriented in one direction (tensile strength 4,900 MPa, tensile modulus 235 GPa), followed by heat and pressing to impregnate the sheet of the large number of carbon fibers with the resin to produce an elemental prepreg base material having a carbon fiber per unit area of 125 g/m$^2$, fiber volume fraction Vf of 55% and thickness of 0.125 mm.

Figure 10:
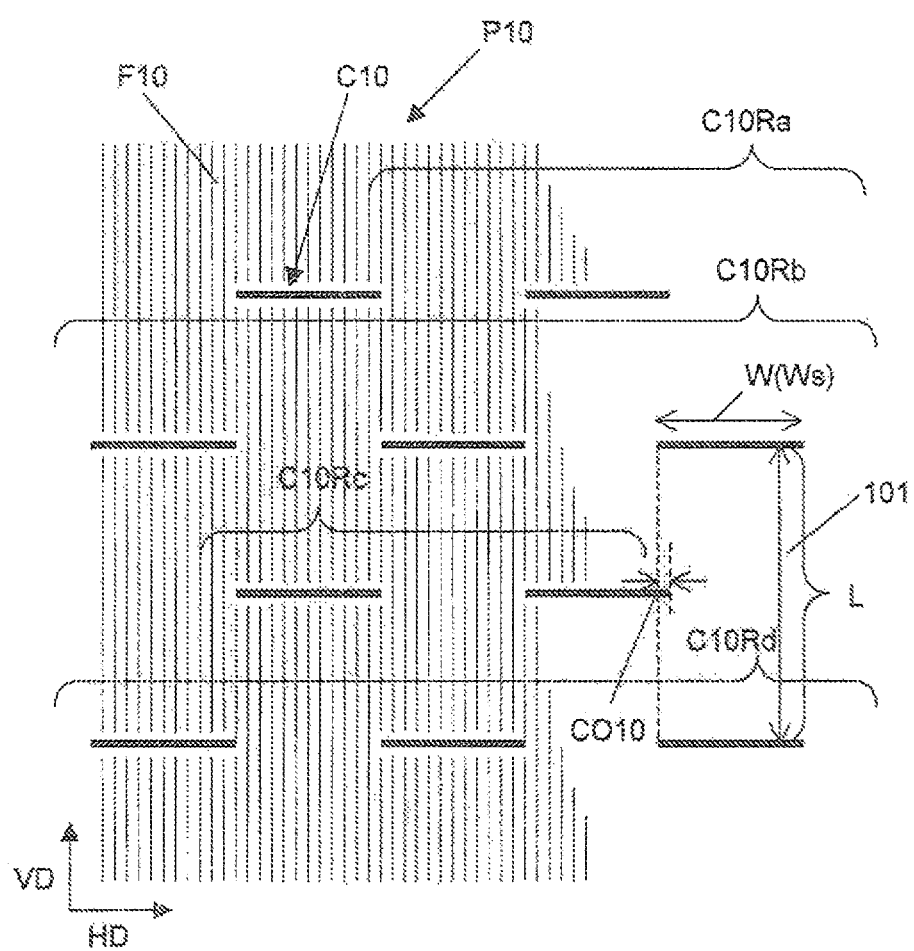
FIG. 10 shows a plan view of another aspect of the prepreg base material.

FIG. 10 shows a plan view of a prepreg base material produced by incising this elemental prepreg base material with a method described below. In FIG. 10, the large number of carbon fibers F10 in the prepreg base material P10 is orientated in the vertical direction VD. The large number of incisions C10 has a constant length and is aligned at intervals in the perpendicular direction to the orientation direction of the fibers to form incision rows C10Ra, C10Rb, C10Rc and C10Rd.

In each incision row, the incisions are aligned at regular intervals. The incision rows are aligned at regular intervals in the orientation direction of the fibers. The positions of the incisions in the adjacent incisions are shifted in the horizontal direction HD. When seen in the vertical direction VD, the cut edges in the adjacent incision rows are shifted by an overlap of CO10. Each incision is in the perpendicular direction to the orientation direction of the fibers, i.e., it is in the horizontal direction HD. These incisions were made in the elemental prepreg base material by using a commercially available automatic cutting machine.

In the prepreg base material P10, the actual length W of the incision C10 measured along the direction of the incision is 5.1 mm. The incision C10 is in the horizontal direction HD as described above, and therefore, the slit length (projected length) Ws coincides with the actual length W of 5.1 mm measured along the direction of the incision. The fiber segment length L (the length numbered 101 in FIG. 10) is 30 mm. The length CO10 of the incision overlap is 1 mm.

Since the epoxy resin used had a viscosity of $2 \times 10^4$ Pa·s at 25° C., the prepreg base material P10 had tackiness.

Eight test pieces (0° prepreg base material) having an area of 250×250 mm in which carbon fibers are oriented in the 0° direction, i.e., in the vertical direction VD, and another eight test pieces (45° prepreg base material) having an area of 250×250 mm in which carbon fibers are oriented in the direction inclined by 45° to the right from the vertical direction VD were cut out from the prepreg base material P10.

A laminated base material of [−45/0/+45/90]$_{2S}$ comprising the 16 prepreg base material test pieces cut out above was produced by combining the prepreg base material test pieces cut out above so that the lines of incisions in a layer are shifted by 0.5 times the fiber segment length L, or 15 mm, from those in the adjacent layer that has the same carbon fiber orientation direction as the former to ensure pseudo-isotropy.

Then, the resulting laminated base material was placed in a roughly central region of a flat plate mold having a cavity with an area of 300×300 mm, and the matrix resin was cured under a heating-pressing machine for a molding time of 30 min at a temperature of 150° C. at a pressure of 6 MPa to produce a flat plate of fiber-reinforced plastic having an area of 300×300 mm. If the charge rate is defined as the proportion of the area of the laminated base material relative to the area of the mold when seen from above, then the charge rate here is 70%.

The resulting fiber reinforced-plastic was free of fiber undulations and the fibers had flowed uniformly to the edge. Furthermore, it was free of warp and had good appearance quality and smoothness. The tensile modulus was 43 GPa, roughly as expected theoretically, and the tensile strength was as high as 430 MPa. The coefficient of variation (CV value) in tensile strength was as extremely low as 4%.

<Comparison in Terms of Reinforcing Fiber and Matrix Resin—See Table 2>

Example 2

The same procedure as in Example 1 was carried out except that 5 parts by weight of 2,4-toluene bis(dimethyl urea) (Omicure (registered trademark) 24 produced by PTI Japan Co., Ltd.) was used as curing accelerator to produce an incised prepreg base material and a laminated base material comprising it. The resulting laminated base material was molded by the same way as in Example 1 except that the heating-pressing machine was operated for a pressing time of 3 min to produce a fiber-reinforced plastic. Though the pressing time was 1/10 of that in Example 1, it was found that the fiber-reinforced plastic had nearly the same glass transition temperature and that the epoxy resin composition used had fast curing capability.

The resulting fiber-reinforced plastic was free of fiber undulations and the fibers had flowed uniformly to the edge. Furthermore, it was free of warp and had good appearance quality and smoothness. The tensile modulus was 44 GPa and the tensile strength was as high as 430 MPa. The coefficient of variation (CV value) in tensile strength was as low as 5%. These values are by no means inferior to those obtained in Example 1.

Example 3

The same procedure as in Example 2 was carried out except that 7 parts by weight of 4,4-methylene bis(phenyl dimethyl urea) (Omicure (registered trademark) 52 produced by PTI Japan Co., Ltd.) was used as curing accelerator to produce a fiber-reinforced plastic. Though the pressing time was 1/10 of that in Example 1, it was found that the fiber-reinforced plastic had nearly the same glass transition temperature and that the epoxy resin composition used had fast curing capability.

The resulting fiber-reinforced plastic was free of fiber undulations and the fibers had flowed uniformly to the edge. Furthermore, it was free of warp and had good appearance quality and smoothness. The tensile modulus was 44 GPa and the tensile strength was as high as 430 MPa. The coefficient of variation (CV value) in tensile strength was as low as 5%. These values are by no means inferior to those obtained in Example 1.

Example 4

Pellets of copolymerized polyamide resin (Amilan (registered trademark) CM4000 produced by Toray Industries, Inc., a polyamide 6/66/610 copolymer product having a melting point of 155° C.) were heated and pressed at 200° C. into a film having a thickness of 34 μm. Except that release paper was not used, the same procedure as in Example 1 was carried out to produce an incised prepreg base material. The polyamide resin was solid in an atmosphere of 25° C., and it was impossible to measure its viscosity. The base material produced was free of tackiness.

After being cut into test pieces with the same size as in Example 1, the 16 layers, which were free of tackiness, were simply piled up in a pseudo-isotropic manner ([−45/0/+45/90]$_{2S}$), and placed in a roughly central region of a flat plate mold having a cavity having an area of 300×300 mm. The base material was pressed under a heating-pressing machine for a molding time of 1 min at a temperature of 200° C. at a pressure of 6 MPa to allow the base material to flow. Without opening the mold, the base material was cooled and removed to produce a fiber-reinforced plastic in the form of a flat plate having an area of 300×300 mm.

Though suffering slight fiber undulations, the fibers in the resulting fiber-reinforced plastic had flowed to the edge. A slightly non-uniform fiber distribution existed, causing slight warp, but as a whole, the product had almost good appearance quality and smoothness.

Example 5

A mixture of 55 wt % randomly copolymerized PP resin (J229E produced by Prime Polymer Co., Ltd., having a melting point of 155° C.) and 45 wt % acid-modified PP-based resin (Yumex 1010 produced by Sanyo Chemical Industries Ltd., having an acid value of about 52, melting point of 142° C. and weight average molecular weight of 30,000) were melt-kneaded in a twin screw extruder (TEX-30α2 manufactured by The Japan Steel Works, Ltd.) at 200° C. to prepare pellets, which were then processed under a press heated at 200° C. into a film having a thickness of 34 μm. Subsequently, the same procedure as in Example 4 was carried out to produce a fiber-reinforced plastic.

Though suffering slight fiber undulations, the fibers in the resulting fiber-reinforced plastic had flowed to the edge. A slightly non-uniform fiber distribution existed, causing slight warp, but as a whole, the product had almost good appearance quality and smoothness.

Example 6

The same procedure as in Example 1 was carried out to prepare a resin film. Then, the resin film prepared was applied to both sides of a sheet of glass fibers oriented in one direction (tensile strength 1,500 MPa, tensile modulus 74 GPa), followed by heating and pressing to impregnate the glass fiber sheet with the resin, resulting in an elemental prepreg base material having a glass fiber weight per unit area of 175 g/m$^2$, fiber volume fraction Vf of 55% and thickness of 0.125 mm. Subsequently, the same procedure as in Example 1 was carried out to produce a fiber-reinforced plastic.

The resulting fiber-reinforced plastic was free of fiber undulations and the fibers had flowed uniformly to the edge. Furthermore, it was free of warp and had good appearance quality and smoothness. The tensile modulus was 27 GPa and the tensile strength was 340 MPa. Compared with the measurements in Example 1, the tensile modulus was nearly as expected theoretically though lower by a difference reflecting the performance of the reinforcing fibers used. The coefficient of variation (CV value) in tensile strength was as low as 2%.

<Comparison in Terms of Charge Rate—See Table 3>

Example 7

Example 8

Example 9

The same procedure as in Example 1 was carried out except that the size of a cut out prepreg base material was different from that in Example 1, and a fiber-reinforced plastic was produced. The size of test prepreg base material pieces cut out was 212×212 mm in Example 7, 268×268 mm in Example 8 and 300×300 mm in Example 9. The prescribed charge rate was 50% in Example 7, 80% in Example 8 and 100% in Example 9.

All resulting fiber-reinforced plastics were free of fiber undulations, and the fibers had flowed sufficiently to the edge. In Example 9, however, the charge rate was 100%, indicating that substantially no flow of fibers took place. In Example 7, the fiber had flowed over a long distance, and the resulting fiber-reinforced plastic suffered slightly non-uniform fiber distribution, causing slight warp. But as a whole, the products had almost good appearance quality and smoothness.

All fiber-reinforced plastics produced in Examples 8 and 9 were free of warp and had good appearance quality and smoothness. The tensile modulus and tensile strength were as high as 43 to 44 GPa and 360 to 510 MPa, respectively. The coefficient of variation (CV value) in tensile strength was as low as 3 to 6%.

In Example 7 where the charge rate was low, in particular, the elemental prepreg base material became thin as it was extended, and therefore, each layer in the resulting fiber-reinforced plastic was very thin. The tensile strength had a very high value of 510 MPa probably because of resistance to interlayer peeling from fiber's cut edges.

<Comparison in Terms of Fiber Segment Length—See Table 4>

Example 10

Example 11

Example 12

Example 13

The same procedure as in Example 1 was carried out except that the intervals of incisions, i.e., the fiber segment length L, in the incision pattern used in Example 1 was changed, and a fiber-reinforced plastic was produced. The fiber segment length L was 15 mm in Example 10, 45 mm in Example 11, 60 mm in Example 12 and 90 mm in Example 13.

Resulting from those, a state that between adjacent layers having the same fiber orientation direction in laminated base material, the rows of incisions in the prepreg base material in one layer were shifted in the fiber direction by 0.5 times the fiber segment length L to the rows of incisions in the prepreg base material in the other layer was formed. This shift in the length direction of the fibers was 7.5 mm in Example 10, 22.5 mm in Example 11, 30 mm in Example 12 and 45 mm in Example 13.

Except for those in Example 13, the resulting fiber-reinforced plastics were free of fiber undulations, and the fibers had flowed sufficiently to the edge. In Example 13, the resulting fiber-reinforced plastic suffered slight fiber undulations. In addition, the fibers had not flowed sufficiently to the edge in some surface portions that underwent friction with the mold. All fiber-reinforced plastics products were free of warp and had good appearance quality and smoothness. The tensile modulus and the tensile strength were as high as 43 to 44 GPa and 390 to 520 MPa, respectively. The coefficient of variation (CV value) in tensile strength was as low as 4 to 8%.

<Comparison in Terms of Actual Length Slit Segment—See Table 5>

Example 14

Example 15

Example 16

Example 17

The same procedure as in Example 1 was carried out except that the actual length W of the incisions along the incision direction in the incision pattern in Example 1 was changed, and a fiber-reinforced plastic was produced.

The incision length W was 15.1 mm in Example 14, 10.1 mm in Example 15, 2.6 mm in Example 16 and 1.35 mm in Example 17. Resulting from those, a state that adjacent incision rows were shifted in the perpendicular direction to the orientation direction of the fibers was formed. The shift was 15 mm in Example 14, 10 mm in Example 15, 2.5 mm in Example 16 and 1.25 mm in Example 17.

All resulting fiber-reinforced plastics were free of fiber undulations, and the fibers had flowed sufficiently to the edge. In addition, they were free of warp and had good appearance quality and smoothness. The tensile modulus and tensile strength were as high as 43 to 44 GPa and 400 to 520 MPa, respectively. The coefficient of variation (CV value) in tensile strength was as low as 3 to 4%. In Example 14, however, the incision length W was long, allowing the edges of the reinforcing fibers to spread over a wide range. Thus, a significant number of shrink marks were formed as compared with Example 1 and Examples 15 to 17.

Example 18

Example 19

Example 20

Example 21

According to an incision pattern similar to the one in Example 1, a rotary roller produced by providing two or more blades along the circumference of a metallic cylinder, used instead of a automatic cutting machine, was pressed against an elemental prepreg base material to make incisions in the elemental prepreg base material, thus altering the value of the length W. Except for this, the same procedure as in Example 1 was carried out, and a fiber-reinforced plastic was produced.

The incision length W was 0.725 mm in Example 18, 0.412 mm in Example 19, 0.05 mm in Example 20 and 0.025 mm in Example 21. Resulting from those, adjacent incision rows were shifted in the perpendicular direction to the orientation direction of the fibers. The shift was 0.625 mm in Example 18, 0.312 mm in Example 19, 0.03 mm in Example 20 and 0.02 mm in Example 21.

All resulting fiber-reinforced plastics were free of fiber undulations, and the fibers had flowed sufficiently to the edge. In addition, they were free of warp and had good appearance quality and smoothness. The tensile modulus and tensile strength were as high as 44 to 45 GPa and 560 to 660 MPa, respectively. The coefficient of variation (CV value) in tensile strength was as low as 3 to 6% except for Example 21. In particular, the use of a shorter incision length W served to produce a fiber-reinforced plastic having a largely improved tensile strength. The tensile modulus also improved, though only slightly. In Example 21, however, the fibers had not flowed sufficiently to the edge in some surface portions that underwent friction with the mold. And there were significant fiber undulations probably because fibers were not cut to 30 mm or less because of a short incision length W.

<Comparison in Thickness of Prepreg Base Material—See Table 6>

Example 22

Example 23

Example 24

Example 25

Example 26

The weight of carbon fibers per unit area of the elemental prepreg base material was changed from the value in Example 1 to change the thickness of the elemental prepreg base material. Except for this, the same procedure as in Example 1 was carried out to produce a fiber-reinforced plastic.

The weight of carbon fibers per unit area ($g/m^2$) and thickness (mm) were 50 $g/m^2$ and 0.05 mm in Example 22, 100 $g/m^2$ and 0.1 mm in Example 23, 150 $g/m^2$ and 0.15 mm in Example 24, 200 $g/m^2$ and 0.2 mm in Example 25 and 300 $g/m^2$ and 0.3 mm in Example 26.

All resulting fiber-reinforced plastics were free of fiber undulations and the fibers had flowed sufficiently to the edge. And they were free of warp and had good appearance quality and smoothness.

In Examples 22 to 24, the tensile modulus and tensile strength were as high as 43 to 44 GPa and 400 to 550 MPa, respectively. The coefficient of variation (CV value) in tensile strength was as low as 3 to 5%. The tensile modulus was 43 GPa and the tensile strength was 270 to 330 MPa in Examples 25 and 26. Although slightly inferior to the values in Examples 21 to 23, these products can be said to have high strength as compared with the values in Comparative examples 2 to 4 described later. In particular, it was found that the tensile strength was largely improved with a decreasing thickness of the elemental prepreg base material.

<Comparison in Terms of Fiber Volume Fraction—See Table 7>

Example 27

Example 28

Example 29

Example 30

The weight of carbon fibers per unit area of the elemental prepreg base material was changed from the value in Example 1 to change the volume fraction Vf of the carbon fibers in the elemental prepreg base material. Except for this, the same procedure as in Example 1 was carried out to produce a fiber-reinforced plastic.

The weight (g/m$^2$) of carbon fibers per unit area and volume fraction Vf (%) of the carbon fibers were 146 g/m$^2$ and 65% in Example 27, 135 g/m$^2$ and 60% in Example 28, 113 g/m$^2$ and 50% in Example 29 and 101 g/m$^2$ and 45% in Example 30.

Except for Example 27, the resulting fiber-reinforced plastics were free of fiber undulations and the fibers had flowed sufficiently to the edge. In Example 27, the resulting fiber-reinforced plastic suffered slight fiber undulations. In addition, the fibers had not flowed sufficiently to the edge in some surface portions that underwent friction with the mold. All fiber-reinforced plastics were free of warp and had good appearance quality and smoothness. The tensile modulus and tensile strength were as high as 36 to 49 GPa and 360 to 460 MPa, respectively. The coefficient of variation (CV value) in tensile strength was as low as 3 to 8%. These results show that both tensile modulus and strength improve as the fiber volume fraction Vf increases. However, the flowability decreases undesirably as the fiber volume fraction Vf increases largely.

<Comparison in Terms of Laminate Composition—See Table 8>

Example 31

Example 32

Except for the use of a laminate composition different from that in Example 1, the same procedure as in Example 1 was carried out to produce a fiber-reinforced plastic. For use in Example 31, 16 incised prepreg base material layers as prepared in Example 1 were combined into a [0/90]$_{4S}$ cross-ply laminated base material. For use in Example 32, 8 incision-free prepreg base material (elemental prepreg base material) layers comprising continuous fibers alone prepared in Example 1 and 8 incised prepreg base material layers produced by making incisions in elemental prepreg base material layers as prepared in Example 1 were combined, one on top of the other, into a [0/C90]$_{4S}$ ("C" referring to prepreg base material comprising continuous fibers alone) alternately cross-ply laminated base material.

All resulting fiber-reinforced plastics were free of fiber undulations and the fibers had flowed sufficiently to the edge. In Example 31, the resulting fiber-reinforced plastic had good appearance quality and smoothness though suffering slight warp. The tensile modulus and tensile strength were as high as 59 to 60 GPa and 500 to 510 MPa, respectively. The coefficient of variation (CV value) in tensile strength was as low as 2 to 3%. However, the tensile test is performed in the 0° direction, accordingly resulting in very high mechanical characteristics. Thus, the resulting fiber-reinforced plastics are not sufficiently versatile because fibers are not oriented in the ±45° directions.

Example 33

Example 34

Example 35

Except for the use of a laminate composition different from that in Example 1, the same procedure as in Example 1 was carried out in Example 33 to produce a fiber-reinforced plastic. In Example 33, 12 incised prepreg base material layers as prepared in Example 1 were combined in a pseudo-isotropic manner into a [60/0/−60]$_{2S}$ laminated base material.

In Example 34, the epoxy resin film as used in Example 1 was transferred onto resin layers and a laminated base material was produced by inserting them between incised prepreg base material layers as prepared in Example 1. Except for this, the same procedure as in Example 1 was carried out to produce a fiber-reinforced plastic. The laminated base material used in Example 34 was produced by inserting the resin layers between the 16 incised prepreg base material layers as prepared in Example 1 in a pseudo-isotropic manner to provide a [45/R/0/R/−45/R/90/R]$_{2S}$ ("R" denoting resin layer) laminated base material. The final fiber volume fraction Vf was 49%.

In Example 35, plain weave prepreg base material layers having a fiber volume fraction Vf of 55% and a layer thickness of 250 µm were prepared by impregnation of the epoxy resin used in Example 1 and a laminated base material was produced by adding them as the outermost layers to the incised prepreg base material prepared in Example 1. Except for this, the same procedure as in Example 1 was carried out to produce a fiber-reinforced plastic. The laminated base material used in Example 35 was produced by piling the 16 incised prepreg base material layers prepared in Example 1 in a pseudo-isotropic manner and adding the plain weave prepreg base material layers with 0° and 90° fiber orientation directions on top of the former to provide a [WF 0/45/0/−45/90]$_{2S}$ ("WF" denoting plain weave prepreg base material) laminated base material.

All fiber-reinforced plastics products produced in Examples 33 and 34 were free of fiber undulations, and the fibers had flowed sufficiently to the edge. The fiber-reinforced plastic obtained in Example 34, in particular, had a high fiber flowability and the fibers had spread very uniformly. All resulting fiber-reinforced plastics were free of warp and had good appearance quality and smoothness.

Their tensile modulus and tensile strength were 44 GPa and 39 GPa, and 420 MPa and 370 MPa, respectively. These values are sufficiently high as expected from the measured fiber volume fraction Vf. The coefficient of variation (CV value) in tensile strength was as low as 5% and 3%, respectively.

In the fiber-reinforced plastic obtained in Example 35, no flow was seen in the plain weave portions in the outermost layers, but sufficiently flow to the edge took place in portions between the plain weave ones. Some fiber undulations were seen particularly at the edge, but as whole, the product was free of warp and had good appearance quality and smoothness. The tensile modulus and tensile strength were 52 GPa and 490 MPa, respectively. Thus, the hybrid composition served to achieve high mechanical characteristics.

Example 36

The same procedure as in Example 1 was carried out to prepare a resin film. Then, the resin film was applied to both sides of a sheet of carbon fibers oriented in one direction as in Example 1, followed by heating and pressing to a degree where the carbon fibers were not completely impregnated with the resin, providing a semi-impregnated prepreg base material that has a carbon fiber weight per unit area of 125 g/m² and fiber volume fraction Vf of 55%.

The same procedure as in Example 1 was carried out to make incisions in this semi-impregnated prepreg base material as shown in FIG. 10. Though some area in the central portion in the thickness direction were left un-impregnated with the resin, the resulting incised prepreg base material was free of fiber fuzzing caused incisions and fiber separation and had a sufficient handleability as in Example 1. Then, lamination and molding were carried out as in Example 1 to produce a fiber-reinforced plastic.

The resulting fiber-reinforced plastic was free of fiber undulations and the fibers had flowed uniformly to the edge. Furthermore, it was free of warp and had good appearance quality and smoothness. The tensile modulus and tensile strength were as high as 43 GPa and 440 MPa, respectively. The coefficient of variation (CV value) in tensile strength was as low as 5%.

<Comparison of Two-Face Incision Prepreg Base Materials—See Table 9>

Example 37

Example 38

Example 39

In the step for making incisions in the elemental prepreg base material as in Example 1, the incisions were made from the top and bottom faces of the elemental prepreg base material without penetrating the layer. Except for this, the same procedure as in Example 1 was carried out to produce a fiber-reinforced plastic.

Figure 7:
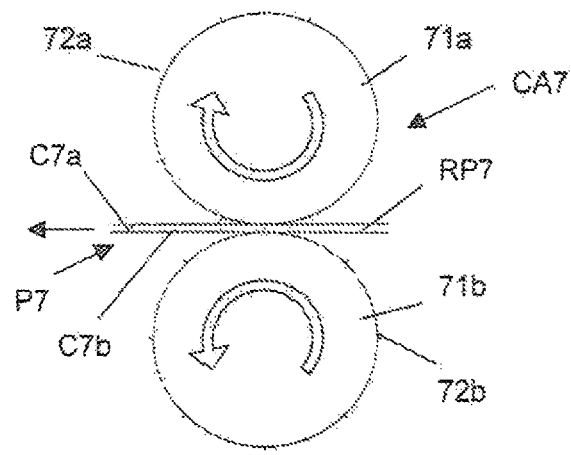
FIG. 7 shows a schematic side view of a typical incision apparatus to form incisions in the prepreg base material.

FIG. 7 shows a schematic side view of an incision forming apparatus used in a step for providing incisions in an elemental prepreg base material. In FIG. 7, the incision forming apparatus CA7 comprising an upper rotary roller 71a and a lower rotary roller 71b that are provided on the top face side and the bottom face side, respectively, of an elemental prepreg base material RP7. The upper rotary roller 71a has cutting blades 72a that protrude out of the surface, align at intervals and had a predetermined length. The lower rotary roller 71b has cutting blades 72b that protrude out of the surface, align at intervals and had a predetermined length. The upper rotary roller 71a and the lower rotary roller 71b have the same radius and rotate at the same rotating speed.

The elemental prepreg base material RP7 was supplied to the incision forming apparatus CA7 shown in FIG. 7, and the cutting blades on the upper and lower rotary rollers worked to make incisions C7a and C7b in the elemental prepreg base material RP7 from the top and bottom faces of the elemental prepreg base material RP7 without allowing them to penetrate the base material RP7, to produce a two-face incision prepreg base material P7.

The thickness of the two-face incision prepreg base material P7, the cutting depth of the incisions C7a made from the top face of the two-face incision prepreg base material P7 and the cutting depth of the incisions C7b made from the bottom face are referred as H, U and D, respectively.

In Example 37, the cutting depth U is 35 μm and this value is equal to 0.28H. The cutting depth D is 100 μm and this value is equal to 0.8H.

In Example 38, the cutting depth U is 55 μm and this value is equal to 0.44H. The cutting depth D is 75 μm and this value is equal to 0.6H.

In Example 39, both the cutting depths U and D are 67 μm and this value is equal to 0.54H.

In the incised prepreg base material P7, the distance between a randomly selected incision A in the top face and the incision B that is adjacent in the top face to the former in the length direction of the fibers, or the fiber segment length L, is 30 mm and the incision C in the bottom face is located at a position 15 mm (0.5 L) away from the incision A toward the incision B in the length direction of the fibers. Thus, in the incised prepreg base material P7, all fibers were cut by either the top incisions C7a or the bottom incisions C7b and had a fiber segment length L of 30 mm or less.

All resulting fiber-reinforced plastics were free of fiber undulations and the fibers had flowed sufficiently to the edge. Although a fiber-reinforced plastic produced in Example 37 suffered slight warp, all of the resulting fiber-reinforced plastics had good appearance quality and smoothness. The tensile modulus was in the range of 43 to 44 GPa, roughly as expected theoretically. The tensile strength was 480 MPa in Example 37, 540 MPa in Example 38 and 580 MPa in Example 39, and all these values were sufficiently high as compared with those in Example 1. The coefficient of variation (CV value) in tensile strength was as low as 2 to 4%. In particular, the tensile strength was found to increase with a decreasing difference between the number of incisions in the top face and that in the bottom face. This is likely to be attributed to the fact that the thickness of the fiber's cut edge is minimized when the depth of incisions in the top is equal to that in the bottom face.

Example 40

Example 41

Example 42

Except that incisions were made in the elemental prepreg base material as in Examples 37 to 39, the same procedure as in Example 9 was carried out to produce a fiber-reinforced plastic.

The thickness of the prepreg base material, the cutting depth of the incisions made from the top face and the cutting depth of the incisions made from the bottom face are referred as H, U and D, respectively. In Example 40, the cutting depth U is 35 μm and this value is equal to 0.28H. The cutting depth D is 100 μm and this value is equal to 0.8H.

In Example 41, the cutting depth U is 55 μm and this value is equal to 0.44H. The cutting depth D is 75 μm and this value is equal to 0.6H.

In Example 42, both the cutting depths U and D are 67 μm and this value is equal to 0.54H.

All resulting fiber-reinforced plastics were free of fiber undulations. Although a fiber-reinforced plastic produced in Example 40 suffered slight warp, all of the resulting fiber-reinforced plastics had good appearance quality and smoothness. The tensile modulus was in the range of 43 to 44 GPa as expected theoretically. The tensile strength was 400 MPa in Example 40, 460 MPa in Example 41 and 490 MPa in Example 42, and all these values were sufficiently high as compared with those in Example 9. The coefficient of variation (CV value) in tensile strength was as low as 2 to 5%. In particular, as in the case of Examples 37 to 39, the tensile strength was found to increase with a decreasing difference between the depth of incisions in the top and that in the bottom face.

<Comparison of Sloped Incision Prepreg Base Material—See Table 10>

Example 43

Example 44

Example 45

Example 46

Example 47

Incisions were made in an elemental prepreg base material as produced in Example 1, and a shear force was applied to the resulting incised prepreg base material in its thickness direction to incline the incisions from the thickness direction. Except for this, the same procedure as in Example 1 was carried out to produce a fiber-reinforced plastic. Vertical incisions penetrating the elemental prepreg base material were made as in Example 1, and the resulting incised prepreg base material was allowed to pass through a nip roller comprising an upper rotary roller and a lower rotary roller having different rotating speeds so that the upper rotary roller and the lower rotary roller would be applied respectively to the top and the bottom faces of the prepreg base material. The prepreg base material heated and softened at a temperature of 60° C. as it was fed to the nip roller. A shear force was applied to the prepreg base material by the nip roller and as a result, the cut planes in the reinforcing fiber segments, which were originally in the thickness direction of the prepreg base material, were inclined from the thickness direction.

Figure 8:
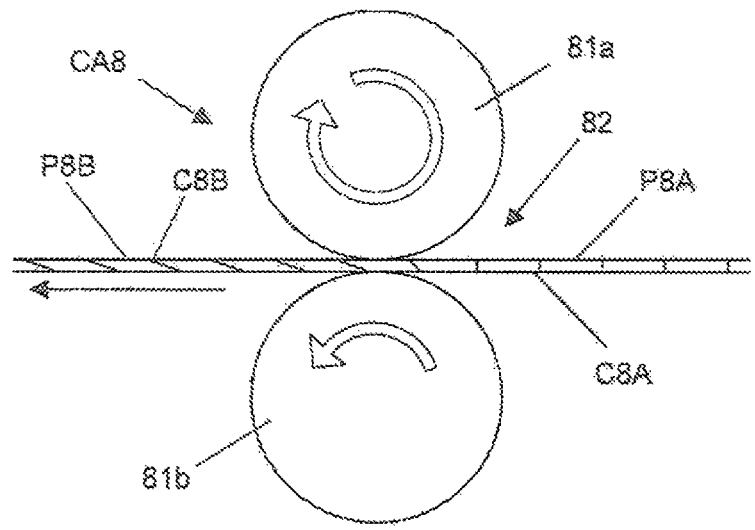
FIG. 8 shows a schematic side view of another typical incision apparatus to form sloped incisions to produce the sloped-incision prepreg base material.

FIG. 8 shows a schematic side view of a typical apparatus for making inclined incisions. An apparatus CA8 for making inclined incisions shown in FIG. 8 has a nip roller 82 comprising an upper rotary roller 81a and a lower rotary roller 81b. The upper rotary roller 81a and the lower rotary roller 81b have different rotating speeds. A prepreg base material P8A, which have incisions C8A in the thickness direction of the prepreg base material, is supplied between the upper rotary roller 81a and the lower rotary roller 81b. As the prepreg base material passes through the nip roller 82, the difference in the rotating speed between the two rotary rollers works to incline the incisions C8A, which are originally in the thickness direction of the prepreg base material, in the thickness direction. This produces a sloped-incision prepreg base material P8B having incisions C8B which are formed by inclining the incisions C8A in the thickness direction.

The shear distance S is defined as the distance 63 measured in the fiber direction between the cut line in the reinforcing fibers in the top face and that in the bottom face of the sloped-incision prepreg base material P8B (see FIG. 6). A specimen having an area 250×250 mm was cut out of the sloped incision prepreg base material C8B and the shear distance S was measured for 5 or more incisions. Their average was substituted in Formula I to calculate the angle 62 of the incisions, i.e., inclination angle Θa.

The shear distance S was 12.5 mm and the inclination angle Θa was 0.6° in Example 43. The shear distance S was 6.25 mm and the inclination angle Θa was 1.1° in Example 44. The shear distance S was 1 mm and the inclination angle Θa was 7.1° in Example 45. The shear distance S was 0.5 mm and the inclination angle Θa was 1.4° in Example 46. The shear distance S was 0.25 mm and the inclination angle Θa was 27° in Example 47.

All resulting fiber-reinforced plastics were free of fiber undulations. Although a fiber-reinforced plastic produced in Example 43 suffered slight warp, all of the resulting fiber-reinforced plastics had good appearance quality and smoothness. The tensile modulus was in the range of 43 to 45 GPa as expected theoretically. The tensile strength was 460 MPa in Example 44, 450 MPa in Example 45, 440 MPa in Example 46 and 430 MPa in Example 47, and all these values were nearly equal to or higher than those in Example 1.

In particular, the tensile strength increased with a decreasing inclination angle Θa, probably because of a decrease in the stress concentration at fiber's cut edges. In Example 43 where the inclination angle Θa was less than 1°, however, the shear distance S was very large and the variation in the shear distance S among different incisions was also large, indicating that the stability of the molding process was low.

Example 48

Example 49

Example 50

Example 51

Example 52

Except that the incisions were inclined in the incised prepreg base material as in Examples 43 to 47, the same procedure as in Example 9 was carried out to produce a fiber-reinforced plastic.

The shear distance S was 12.5 mm and the inclination angle Θa was 0.6° in Example 48. The shear distance S was 6.25 mm and the inclination angle Θa was 1.1° in Example 49. The shear distance S was 1 mm and the inclination angle Θa was 7.1° in Example 50. The shear distance S was 0.5 mm and the inclination angle Θa was 1.4° in Example 51. The shear distance S was 0.25 mm and the inclination angle Θa was 27° in Example 52.

All resulting fiber-reinforced plastics were free of fiber undulations. Although a fiber-reinforced plastic produced in Example 40 suffered slight warp, all of the resulting fiber-reinforced plastics had good appearance quality and smoothness. The tensile modulus was in the range of 45 to 47 GPa. The tensile strength was 480 MPa in Example 48, 460 MPa in Example 49, 420 MPa in Example 50, 380 MPa in Example 51 and 350 MPa in Example 52. Except for Example 52, not only the tensile strength but also the tensile modulus was high as compared with the values in Example 9. As in Examples 43 to 47, in particular, the tensile strength increased with a decreasing inclination angle Θa. The increase rate of the strength values in Examples 43 to 47 from those in Example 1 is larger than that from those in Example 9, indicating that the stress concentration decreases with a decreasing distance between fiber's cut edges, i.e., with a decreasing inclination angle Θa.

<Comparison of Oblique-Incision Prepreg Base Material—See Table 11>

Example 53

Example 54

Using an automatic cutting machine, a large number of incisions having the incision pattern shown in FIG. 2(f) were made in an elemental prepreg base material produced as in Example 1. Specifically, the incisions, which have a straight shape having a constant length, are oblique from the perpendicular direction to the orientation direction of the fibers. The actual incision length W measured in the direction of the incisions was 5.1 mm. The distance between the geometrical centers of two incisions that are adjacent in the orientation direction of the fibers, i.e., the fiber segment length L was 30 mm. The oblique angle of the incisions from the orientation direction of the fibers was 30° in Example 53 and 45° in Example 54. As a result, the slit segment length (projected length) Ws was 2.55 mm in Example 53 and 3.61 mm in Example 54. Accordingly, adjacent incision rows are shifted in the perpendicular direction to the orientation direction of the fibers by 2.5 mm in Example 53 and 3.5 mm in Example 54.

All resulting fiber-reinforced plastics were free of fiber undulations and the fibers had flowed sufficiently to the edge. They were free of warp and had good appearance quality and smoothness. The tensile modulus and tensile strength were as high as 43 to 44 GPa and 410 to 470 MPa, respectively. The coefficient of variation (CV value) in tensile strength was as low as 2 to 4%. The tensile strength greatly improved as the incisions became more oblique to decrease the slit segment length (projected length) Ws and as the number of cut fibers per incision decreased.

Example 55

Example 56

Using the same method as in Examples 53 and 54, incisions that were straight and oblique from the perpendicular direction to the orientation direction of the fibers were made in an elemental prepreg base material. The slit segment length W was 1.35 mm. The fiber segment length L was 30 mm. The oblique angle of the incisions from the orientation direction of the fibers was 30° in Example 55 and 45° in Example 56. As a result, the slit segment length (projected length) Ws was 0.68 mm in Example 55 and 0.95 mm in Example 56. Accordingly, adjacent incision rows are shifted in the perpendicular direction to the orientation direction of the fibers by 0.6 mm in Example 55 and 0.9 mm in Example 56.

All resulting fiber-reinforced plastics were free of fiber undulations and the fibers had flowed sufficiently to the edge. They were free of warp and had good appearance quality and smoothness. The tensile modulus was 44 to 45 GPa and the tensile strength was 580 to 670 MPa and all these values were very high as compared with those in Example 17. The coefficient of variation (CV value) in tensile strength was as low as 4 to 5%.

Example 57

Example 58

For an elemental prepreg base material produced as Example 1, the thickness of the elemental prepreg base material was changed to 0.2 mm by changing the weight of carbon fibers per unit area to 200 g/m². Except for this, the same procedure with the same incision pattern as in Examples 55 and 56 was carried out to make incisions in the elemental prepreg base material. The incisions were straight and oblique from the perpendicular direction to the orientation direction of the fibers.

All resulting fiber-reinforced plastics were free of fiber undulations and the fibers had flowed sufficiently to the edge. They were free of warp and had good appearance quality and smoothness. The tensile modulus and tensile strength were as extremely high as 43 to 44 GPa and 520 to 600 MPa, respectively. The coefficient of variation (CV value) in tensile strength was as low as 3 to 6%.

Example 59

For an elemental prepreg base material produced as Example 1, the thickness of the elemental prepreg base material was changed to 0.2 mm by changing the weight of carbon fibers per unit area to 200 g/m². The actual length W of the incisions was 1.35 mm, i.e., the slit segment length (projected length) Ws was 1.35 mm, and adjacent incision rows were shifted by 1.3 mm in the perpendicular direction to the orientation direction of the fibers. Except for these changes, the same procedure as in Examples 1 was carried out.

The resulting fiber-reinforced plastic was free of fiber undulations and the fibers had flowed sufficiently to the edge. They were free of warp and had good appearance quality and smoothness. The tensile modulus and tensile strength were as high as 43 GPa and 440 MPa, respectively. The coefficient of variation (CV value) in tensile strength was as low as 4%. However, the tensile strength was slightly lower than in Examples 57 and 58.

<Comparison in Terms of Laminate Composition—See Table 8>

Reference Example 1

Reference Example 2

Except for the use of a laminated base material produced as in Example 1 but with a different laminate composition, the same procedure as in Example 1 was carried out to produce a fiber-reinforced plastic. For use in Reference example 1, 8 incised prepreg base material layers as prepared in Example 1 were combined in the same direction to provide a $[0]_8$ laminated base material. For use in Reference example 2, 16 incised prepreg base material layers as prepared in Example 1 were combined to provide a $[0/45]_{4S}$ laminated base material.

In a fiber-reinforced plastic produced in Reference example 1, it was found that the fibers had flowed only in the 90° direction while substantially no flow had taken place in the 0° direction though fibers were protruded like cirri in some portions. Gaps in the cavity in the 0° direction contained resin that had been squeezed out and the resulting fiber-reinforced plastic had poor appearance quality. In the resulting fiber-reinforced plastic in Reference example 2, the fibers had flowed over the entire cavity, but the flow of fibers was anisotropy as in the case of the laminate composition, resulting in large fiber undulations. In addition, the resulting fiber-reinforced plastic suffered large warp.

Comparative Examples are described below.

<Comparison in Terms of Shape of Prepreg Base Material—See Table 1>

Comparative Example 1

The same procedure as in Example 1 was carried out except that no incisions were made in the elemental prepreg base material.

In the resulting fiber-reinforced plastic, the laminated base material stretched little, that is, flowed little, with the area staying nearly at the original size of 250×250 mm, during the molding of the laminated base material into the fiber-reinforced plastic, and the matrix resin was squeezed out to form resin burr between the fiber-reinforced plastic and the mold. Because of the resin squeezed out, the molding had a leathery surface and did not seem to serve to provide as a commercial molding material.

Comparative Example 2

A thick resin film was produced from an epoxy resin composition as used in Example 1. Then, a bundle of carbon fibers (tensile strength 4,900 MPa, tensile modulus 235 GPa, 12,000 fibers) cut to a length of 25 mm were dropped and scattered uniformly over the resin film up to a weight per unit area of 125 g/m². Another resin film was put on top of the former to sandwich the cut carbon fibers and allowed to pass through a calendar roll to provide a SMC sheet having a fiber volume fraction Vf of 55%. From this SMC sheet, 16 specimens having an area of 250×250 mm were cut out and piled up to provide a laminated base material. Then, the same molding procedure as in Example 1 was carried out to produce a fiber-reinforced plastic.

In the resulting fiber-reinforced plastic, the fibers had flowed sufficiently to the edge. Warp took place though only slightly, and an uneven fiber distribution also took place and caused sink marks in resin-rich portions, leading to poor smoothness. The tensile modulus was 33 GPa, which is significantly lower than the theoretical value probably because the fibers were not straight. The tensile strength was 220 MPa, and the coefficient of variation (CV value) in tensile strength was as extremely high as 12%. Thus, the molding was unlikely to serve as structural material.

Comparative Example 3

Using 100 parts by weight of vinyl ester resin (Derakane 790 produced by The Dow Chemical Company) as a matrix resin, 1 part by weight of tert-butylperoxy benzoate (Perbutyl Z produced by NOF Corporation) as a curing agent, 2 parts by weight of zinc stearate (SZ-2000 produced by Sakai Chemical Industry Co., Ltd.) as an internal mold releasing agent and 4 parts by weight of magnesium oxide (MgO #40 produced by Kyowa Chemical Industry Co., Ltd.) as a viscosity improver, their mixture was sufficiently mixed by stirring to provide a resin paste. The resulting resin paste was applied over a polypropylene mold releasing film with a doctor blade.

As in Comparative Example 2, carbon fibers cut to a length of 25 mm were dropped and scattered uniformly over the film up to a weight per unit area of 500 g/m$^2$. Then, another polypropylene film coated with resin paste was combined, with the resin paste sandwiched in between. The volume fraction of the carbon fiber in an SMC sheet was 40%.

The resulting sheet was left to stand for 24 hours at 40° C. to ensure a sufficient increase in the viscosity of the resin paste to provide the SMC sheet. From the SMC sheet, 4 specimens having an area of 250×250 mm were cut out and combined to produce a laminated base material. For the resulting laminated base material, the same molding procedure as in Example 1 was carried out to produce a fiber-reinforced plastic.

In the resulting fiber-reinforced plastic, the fibers had flowed sufficiently to the edge. Warp took place though only slightly. As compared with Comparative Example 2, a larger resin content led to an improved smoothness, but some sink marks took place. The tensile modulus and the tensile strength were generally low, specifically 30 GPa and 160 MPa, respectively. The coefficient of variation (CV value) in tensile strength was as extremely high as 16%. Thus, the molding was unlikely to serve as a structural material.

Comparative Example 4

Resin paste was prepared as in Comparative Example 3 and then the resin paste was applied over polypropylene film. Glass fibers (tensile strength 1,500 MPa, tensile modulus 74 GPa, 800 fibers) were cut to a length of 25 mm and dropped and scattered uniformly on the film up to a weight per unit area of 700 g/m$^2$. Then, the same procedure as in Comparative Example 3 was carried out to produce a fiber-reinforced plastic.

In the resulting fiber-reinforced plastic, the fibers had flowed sufficiently to the edge. Warp took place though only slightly. As compared with Comparative Example 2, a larger resin content led to an improved smoothness, but some sink marks took place. The tensile modulus and the tensile strength were generally low, specifically 15 GPa and 180 MPa, respectively. The coefficient of variation (CV value) in tensile strength was as extremely high as 14%. Thus, the molding was unlikely to serve as a structural material.
<Comparison in Terms of Fiber Segment Length—See Table 4>

Comparative Example 5

Comparative Example 6

In the incision pattern used in Example 1, the interval L between the incisions (the fiber segment length) was changed. Except for this, the same procedure as in Example 1 was carried out to produce a fiber-reinforced plastic. The fiber segment length L was 7.5 mm in Comparative Example 5 and 120 mm in Comparative Example 6. As a result, in the laminated base material, the incisions in rows in the prepreg base material layer were shifted in the fiber orientation direction by 0.5 times the interval L as compared with the incisions in the prepreg base material layer that was adjacent to the former and had the same orientation direction. This shift in the length direction of the fibers was 3.75 mm in Comparative Example 5 and 60 mm in Comparative Example 6.

In Comparative Example 5, the resulting fiber-reinforced plastic was free of fiber undulations and the fibers had flowed sufficiently to the edge. It was free of warp and had good appearance quality and smoothness. But the tensile strength is a low 320 MPa as compared with Example 1 and Examples 10 to 13. For the fiber-reinforced plastic produced in Comparative Example 6, the fibers had not flowed over the entire face of the mold cavity, leaving resin-rich portions at the edge. Fiber undulations and warp were also found.
<Comparison in Terms of Thickness of Prepreg Base Material—See Table 6>

Comparative Example 7

For an incised elemental prepreg base material as prepared in Example 1, the thickness of the elemental prepreg base material was changed by adjusting the weight of carbon fibers per unit area. Except for this, the same procedure as in Example 1 was carried out to produce a fiber-reinforced plastic.

The weight of carbon fibers per unit area was 25 (g/m$^2$) and the thickness was 0.025 (mm).

The resulting fiber-reinforced plastic was free of fiber undulations and the fibers had flowed sufficiently to the edge. In addition, it was free of warp and had good appearance quality and smoothness. However, the incised elemental prepreg base material was very thin, leading to a very high production cost.
<Comparison in Terms of Fiber Volume Fraction—See Table 7>

Comparative Example 8

Comparative Example 9

For an elemental prepreg base material as prepared in Example 1, the volume fraction Vf of carbon fibers was changed by adjusting the weight of carbon fibers per unit area. Except for this, the same procedure as in Example 1 was carried out to produce a fiber-reinforced plastic. The weight of carbon fibers per unit area (g/m$^2$) and the fiber volume fraction Vf (%) were 158 g/m$^2$ and 70% in Comparative Example 8 and 90 g/m$^2$ and 40% in Comparative Example 9, respectively.

The resulting fiber-reinforced plastic in Comparative Example 8 suffered fiber undulations and the fibers had not flowed to the edge in some surface portions that underwent friction with the mold. Resin was absent in some surface portions, and the molding had poor appearance quality as well as significant warp. The resulting fiber-reinforced plastic in Comparative Example 9 was free of warp and had good appearance quality and smoothness. However, the tensile modulus and the tensile strength were 33 GPa and 320 MPa, respectively, which are significantly lower than the values obtained in Example 1 and Examples 27 to 30.

<Comparison in Terms of Shape of Prepreg Base Material—Table 12>

Example 60

The same procedure as in Example 1 was carried out to produce an elemental prepreg base material and a large number of continuous straight incisions inclined by 10° from the orientation direction of the fibers (vertical direction VD in FIG. 14(a)) were formed as shown in FIG. 14(a) with an automatic cutting machine to produce an incised prepreg base material. The incisions are aligned at regular intervals. Prepreg base material specimens having an area of 300×300 mm were cut out of this incised prepreg base material. Because each incision is continuous, however, the incisions were made in such a manner that the 5 mm wide periphery of each specimen area was free of incisions, to prevent the fibers from being loosened.

From this prepreg base material prepared above, two types of prepreg base material specimens having an area of 300× 300 mm to be used for lamination were cut out in the orientation direction of the carbon fibers (0° direction) and in the direction at 45° (45° direction) to the right from the orientation direction of the carbon fibers. The prepreg base material specimens for lamination had an overall area of 300×300 mm and the 5 mm wide periphery of each specimen area was free of incisions. Thus, the incisions existed inside the area of 290×290 mm. The segment length L of the fibers cut by the incisions was 30 mm. This prepreg base material had tackiness as the epoxy resin constituting the prepreg base material had a viscosity of $2 \times 10^4$ Pa·s in a 25° C. atmosphere.

The aforementioned 16 prepreg base material specimens for lamination were combined to prepare a pseudo-isotropic ([−45/0/+45/90]$_{2S}$) laminate, followed by cutting off a 25 mm wide periphery to produce a laminated base material having an area 250×250 mm and having incisions over its entire face.

For the resulting laminated base material, the same molding procedure as in Example 1 was carried out to produce a fiber-reinforced plastic.

The resulting fiber-reinforced plastic was free of fiber undulations and the fibers had flowed uniformly to the edge. It was generally free of warp. In the outermost layer, furthermore, there were only few resin-rich incised gaps that were free of reinforcing fibers or where reinforcing fibers from the adjacent layer were exposed. Thus it had good appearance quality and smoothness. The tensile modulus was 46 GPa, roughly as expected theoretically, and the tensile strength was as high as 590 MPa. The coefficient of variation (CV value) in tensile strength was as extremely low as 5%. These results show that the resulting fiber-reinforced plastic had mechanical characteristics and quality for use as a structural material or an external plate material. When the specimen cut out in the 0° direction from the resulting fiber-reinforced plastic was observed, it was found that there no portions containing layer undulations or fibers and that there were only few resin-rich portions as seen in FIG. 16D. In addition, the fiber's cut edges are inclined to the thickness direction (about 5° or less from the fiber direction), allowing the molding to have a high stress transfer efficiency.

Example 61

Except for the use of a different way of making incisions, the same procedure as in Example 60 was carried out to produce a fiber-reinforced plastic. In an elemental prepreg base material as prepared in Example 60, a large number of incisions that are discontinuous, straight and inclined by ±10° from the orientation direction of the fibers were formed over the entire face as shown in FIG. 14(d) with an automatic cutting machine, thus providing an incised prepreg. The incisions were aligned at regular intervals.

From this incised prepreg base material, prepreg base material specimens having an area of 300×300 mm to be used for lamination were cut out in the orientation direction of the carbon fibers (0° direction) and in the direction at 45° (45° direction) to the right from the orientation direction of the carbon fibers. The slit segment length (projected length) Ws was 10 mm (the actual incision length W was 57.6 mm) and as seen in FIG. 12, fibers in some portions were cut by the adjacent incisions into fiber segments shorter than L. The length was about 15 mm in this Example.

The resulting fiber-reinforced plastic was free of fiber undulations and the fibers had flowed uniformly to the edge. It was generally free of warp. In the outermost layer, furthermore, there were only few resin-rich incised gaps that were free of reinforcing fibers or where reinforcing fibers from the adjacent layer were exposed. Thus it had good appearance quality and smoothness. The tensile modulus was 46 GPa, roughly as expected theoretically, and the tensile strength was as high as 550 MPa. The coefficient of variation (CV value) in tensile strength was as extremely low as 4%.

When a specimen cut out in the 0° direction from the resulting fiber-reinforced plastic was observed, it was found that there no portions containing layer undulations or fibers and that there were only few resin-rich portions as seen in FIG. 16D. In addition, the fiber's cut edges are inclined to the thickness direction (about 5° or less from the fiber direction), allowing the molding to have a high stress transfer efficiency.

Example 62

Except for the use of a different way of making incisions, the same procedure as in Example 60 was carried out to produce a fiber-reinforced plastic. In an elemental prepreg base material as prepared in Example 60, a large number of incisions that are discontinuous, straight and inclined by 10° from the orientation direction of the fibers were formed over the entire face as shown in FIG. 14(e) with an automatic cutting machine, thus providing an incised prepreg base material. The incisions were aligned at regular intervals.

From this incised prepreg base material, prepreg base material specimens having an area of 300×300 mm to be used for lamination were cut out in the orientation direction of the carbon fibers (0° direction) and in the direction at 45° (45° direction) to the right from the orientation direction of the carbon fibers. The slit segment length (projected length) Ws was 10 mm (the actual incision length W was 57.6 mm) and as seen in FIG. 12, fibers in some portions were cut by the adjacent incisions into fiber segments shorter than L. The length was about 15 mm in this Example.

The resulting fiber-reinforced plastic was free of fiber undulations and the fibers had flowed uniformly to the edge. It was generally free of warp. In the outermost layer, furthermore, there were only few resin-rich incised gaps that were free of reinforcing fibers or where reinforcing fibers from the adjacent layer were exposed. Thus it had good appearance quality and smoothness. The tensile modulus was 46 GPa, roughly as expected theoretically, and the tensile strength was as high as 580 MPa. The coefficient of variation (CV value) in tensile strength was as extremely low as 5%.

When a specimen cut out in the 0° direction from the resulting fiber-reinforced plastic was observed, it was found that there no portions containing layer undulations or fibers and that there were only few resin-rich portions as seen in FIG. 16D. In addition, the fiber's cut edges are inclined to the thickness direction (about 5° or less from the fiber direction), allowing the molding to have a high stress transfer efficiency.
<Comparison in Terms of Reinforcing Fiber and Matrix Resin—See Table 13>

Example 63

Except for the use of 5 parts by weight of 2,4-toluene bis-dimethylurea (Omicure (registered trademark) 24 produced by PTI Japan Co., Ltd.) as a curing accelerator, the same procedure as in Example 60 was carried out to produce an incised prepreg base material and then a laminated base material was produced from the former. Except for the use of a pressing time (curing time) of 3 min in the heating-pressing machine, the same procedure as in Example 60 was carried out for the resulting laminated base material to produce a fiber-reinforced plastic. Although the pressing time was only 1/10 of that used in Example 60, the plastic had the same level of glass transition temperature, indicating that the epoxy resin composition used had fast curing capability.

The resulting fiber-reinforced plastic was free of fiber undulations and the fibers had flowed uniformly to the edge. It was free of warp. In the outermost layer, furthermore, there were only few resin-rich incised gaps that were free of reinforcing fibers or where reinforcing fibers from the adjacent layer were exposed. Thus it had good appearance quality and smoothness. The tensile modulus and the tensile strength were as high as 47 GPa and 580 MPa, respectively. The coefficient of variation (CV value) in tensile strength was as low as 4%. These values are by no means inferior to those obtained in Example 60.

Example 64

Except for the use of 7 parts by weight of 4,4-methylene bis(phenyl dimethylurea) (Omicure (registered trademark) 52 produced by PTI Japan Co., Ltd.) as a curing accelerator, the same procedure as in Example 63 was carried out to produce a fiber-reinforced plastic. Although the pressing time was only 1/10 of that used in Example 60, the plastic had the same level of glass transition temperature, indicating that the uncured epoxy resin composition used had fast curing capability.

The resulting fiber-reinforced plastic was free of fiber undulations and the fibers had flowed uniformly to the edge. It was free of warp. In the outermost layer, furthermore, there were only few resin-rich incised gaps that were free of reinforcing fibers or where reinforcing fibers from the adjacent layer were exposed. Thus it had good appearance quality and smoothness. The tensile modulus and the tensile strength were as high as 47 GPa and 580 MPa, respectively. The coefficient of variation (CV value) in tensile strength was as low as 5%. These values are by no means inferior to those obtained in Example 60.

Example 65

Pellets of copolymerized polyamide resin (Amilan (registered trademark) CM4000 produced by Toray Industries, Inc., a polyamide 6/66/610 copolymer product having a melting point of 155° C.) were heated and pressed at 200° C. into a film having a thickness of 34 μm. Except that the release paper was not used, the same procedure as in Example 60 was carried out to produce an incised prepreg base material. The polyamide resin was solid in an atmosphere of 25° C., and it was impossible to measure its viscosity. The prepreg base material produced was free of tackiness.

After being cut into test pieces having the same size as in Example 60, the 16 layers, which were free of tackiness, were simply piled up in a pseudo-isotropic manner ([−45/0/+45/90]$_{2S}$), and placed in a roughly central region of a flat plate mold having a cavity with an area of 300×300 mm. The material was pressed under a heating-pressing machine for a molding time of 1 min at a temperature of 200° C. at a pressure of 6 MPa to allow the laminated base material to flow. Without opening the mold, the material was cooled and removed to produce a fiber-reinforced plastic in the form of a flat plate having an area of 300×300 mm.

Though suffering slight fiber undulations, the fibers in the resulting fiber-reinforced plastic had flowed to the edge. A slightly non-uniform fiber distribution existed, causing slight warp. In the outermost layer, however, there were only few resin-rich incised gaps that were free of reinforcing fibers or where reinforcing fibers from the adjacent layer were exposed. As a whole, the product had almost good appearance quality and smoothness.

Example 66

A mixture of 55 wt % randomly copolymerized PP resin (J229E produced by Prime Polymer Co., Ltd., having a melting point of 155° C.) and 45 wt % acid-modified PP-based resin (Yumex 1010 produced by Sanyo Chemical Industries Ltd., having an acid value of about 52, melting point of 142° C. and weight average molecular weight of 30,000) were melt-kneaded in a twin screw extruder (TEX-30α2 manufactured by The Japan Steel Works, Ltd.) at 200° C. to prepare pellets, which were then processed under a press heated at 200° C. into a film having a thickness of 34 μm. Subsequently, the same procedure as in Example 65 was carried out to produce a fiber-reinforced plastic.

Though suffering slight fiber undulations, the fibers in the resulting fiber-reinforced plastic had flowed to the edge. A slightly non-uniform fiber distribution existed, causing slight warp. In the outermost layer, however, there were only few resin-rich incised gaps that were free of reinforcing fibers or where reinforcing fibers from the adjacent layer were exposed. As a whole, the product had almost good appearance quality and smoothness.

Example 67

The same procedure as in Example 60 was carried out to prepare a resin film. Then, the resin film prepared was applied to both sides of a sheet of glass fibers oriented in one direction (tensile strength 1,500 MPa, tensile modulus 74 GPa), followed by heating and pressing to impregnate the glass fiber sheet with the resin, resulting in an elemental prepreg base material having a glass fiber weight per unit area of 175 g/m$^2$, fiber volume fraction Vf of 55% and thickness of 0.125 mm. Subsequently, the same procedure as in Example 60 was carried out to produce a fiber-reinforced plastic.

The resulting fiber-reinforced plastic was free of fiber undulations and the fibers had flowed uniformly to the edge. It was free of warp. In the outermost layer, furthermore, there were only few resin-rich incised gaps that were free of reinforcing fibers or where reinforcing fibers from the adjacent layer were exposed. Thus it had good appearance quality and smoothness. The tensile modulus was 29 GPa and the tensile strength was 430 MPa. Compared with the values in Example 60, the tensile modulus was nearly as expected theoretically though lower by a difference reflecting the performance of the reinforcing fibers used. The coefficient of variation (CV value) in tensile strength was as low as 3%.

<Comparison in Terms of Oblique Angle of Incision—See Table 14>

Example 68

Example 69

Example 70

Example 71

Example 72

Example 73

Except for the use of different values for the oblique angle of the incisions, the same procedure as in Example 60 was carried out to produce a fiber-reinforced plastic. The oblique angle used was 1° in Example 68, 2° in Example 69, 5° in Example 70, 15° in Example 71, 25° in Example 72 and 45° in Example 73.

Except for Example 68, the resulting fiber-reinforced plastics were free of fiber undulations and the fibers had flowed uniformly to the edge. In all cases, they were free of warp. In the outermost layer, except for Example 73, there were only few resin-rich incised gaps that were free of reinforcing fibers or where reinforcing fibers from the adjacent layer were exposed. Thus they had good appearance quality and smoothness. In the case of Example 68, the oblique angle of the incisions is small and the distance between the incisions is small, i.e., about 0.5 mm, making cutting and lamination difficult. Probably because uncut fibers having a length of 100 mm or less remained, there were fibers suffering undulations, though the fibers had flowed to the edge. In Example 73, the outermost layer contained many resin-rich incised gaps that were free of reinforcing fibers or where reinforcing fibers from the adjacent layer were exposed. Some sink marks were found in these portions. As for the mechanical characteristics, the tensile modulus and the tensile strength were as high as 45 to 47 GPa and 460 to 660 MPa, respectively, except Example 73. In Example 73, the tensile modulus was 45 GPa, but the tensile strength was 330 MPa, which was significantly lower than in Example 60 and Examples 68 to 72. The coefficient of variation (CV value) in tensile strength was as low as 3 to 5%, except Example 68. In particular, the tensile strength was 600 MPa or more in Examples 68, 69 and 70 where the incision angle is small. In Examples 68 and 69, on the other hand, the incision angle was small and the distance between the incisions was small, i.e., about 1 mm, resulting in a low handleability during the lamination process.

<Comparison in Terms of Charge Rate—See Table 15>

Example 74

Example 75

Example 76

Except that the prepreg base material specimens cut out had a different size, the same procedure as in Example 60 was carried out to produce a fiber-reinforced plastic. The size of the prepreg base material specimen cut out was 212×212 mm in Example 74, 285×285 mm in Example 75 and 300×300 mm in Example 76, respectively. The charge rate used was 50% in Example 74, 90% in Example 75 and 100% in Example 76, respectively.

All resulting fiber-reinforced plastics were free of fiber undulations, and the fibers had flowed sufficiently to the edge. In Example 76, however, the charge rate was 100%, indicating that substantially no flow of fibers took place. In Example 74, the fiber had flowed over a long distance, and the resulting fiber-reinforced plastic suffered slightly non-uniform fiber distribution, causing slight warp. In the outermost layer, however, there were only few resin-rich incised gaps that were free of reinforcing fibers or where reinforcing fibers from the adjacent layer were exposed. Thus, the product had almost good appearance quality and smoothness.

In Examples 75 and 76, the resulting fiber-reinforced plastics were free of warp. In the outermost layer, furthermore, there were no resin-rich incised gaps that were free of reinforcing fibers or where reinforcing fibers from the adjacent layer were exposed. Thus they had good appearance quality and smoothness. The tensile modulus and the tensile strength were as high as 46 to 47 GPa and 510 to 690 MPa, respectively. The coefficient of variation (CV value) in tensile strength was as low as 3% to 7%.

In Example 74 where the charge rate was low, in particular, the elemental prepreg base material became thin as it was extended, and therefore, each layer in the resulting fiber-reinforced plastic was very thin. The tensile strength had a very high value of 690 MPa probably because of resistance to interlayer peeling from fiber's cut edges.

<Comparison in Terms of Fiber Segment Length—See Table 16>

Example 77

Example 78

Example 79

The same procedure as in Example 60 was carried out except that the intervals of incisions, i.e., the fiber segment length L, in the incision pattern used in Example 60 was changed, producing a fiber-reinforced plastic. The fiber segment length L was 10 mm in Example 77, 60 mm in Example 78 and 100 mm in Example 79, respectively.

Except for Example 79, the resulting fiber-reinforced plastics were free of fiber undulations and the fibers had flowed sufficiently to the edge. In Example 79, the resulting fiber-reinforced plastic suffered slight fiber undulations. In addition, the fibers had not flowed sufficiently to the edge in some surface portions that underwent friction with the mold. All fiber-reinforced plastics were free of warp, and in the outermost layer, furthermore, there were only few resin-rich incised gaps that were free of reinforcing fibers or where reinforcing fibers from the adjacent layer were exposed. Thus, they had good appearance quality and smoothness. The tensile modulus and the tensile strength were as high as 46 to 47 GPa and 510 to 650 MPa, respectively. The coefficient of variation (CV value) in tensile strength was as low as 3 to 6%.

<Comparison in Terms of Actual Length of Slit Segment—See Table 17>

Example 80

Example 81

Example 82

According to an incision pattern similar to the one in Example 62, a rotary roller produced by providing two or more blades along the circumference of a metallic cylinder, used instead of a automatic cutting machine, was pressed against an elemental prepreg base material to make discontinuous straight incisions oblique by 10° from the orientation direction of the fibers, thus altering the value of the incision length W. Except for this, the same procedure as in Example 62 was carried out to produce a fiber-reinforced plastic.

The slit segment length (projected length) Ws was 17 μm in Example 80, 30 μm in Example 81 and 170 μm in Example 82. The actual length W of the incisions was 0.1 mm in Example 80, 0.17 mm in Example 81 and 1 mm in Example 80.

Except for Example 80, the resulting fiber-reinforced plastics were free of fiber undulations. In Example 80, local disturbances in the fiber flow took place and slight fiber undulations were found probably because there were a larger number of cut edges. In all resulting fiber-reinforced plastics, the fibers had flowed sufficiently to the edge and no warp was found. In the outermost layer, furthermore, there were only few resin-rich incised gaps that were free of reinforcing fibers or where reinforcing fibers from the adjacent layer were exposed. Thus, they had good appearance quality and smoothness. The tensile modulus and the tensile strength were as high as 47 GPa and 690 to 710 MPa, respectively. The coefficient of variation (CV value) in tensile strength was as low as 4 to 5%, except for Example 80 where it was a slightly high 9%.

Example 83

Example 84

Example 85

Example 86

Except that the slit segment length (projected length) Ws was changed in the incision pattern used in Example 62, the same procedure as in Example 62 was carried out to produce a fiber-reinforced plastic. The slit segment length Ws used was 1 mm in Example 83, 1.5 mm in Example 84, 100 mm in Example 85 and 120 mm in Example 86. The actual incision length W was 5.8 mm in Example 83 and 8.6 mm in Example 84. In Examples 85 and 86, one end of each incision in a prepreg base material specimen having an area of 300×300 mm existed within the face of the prepreg base material specimen, but the other end was located near the periphery. Thus, each incision was so long that it was substantially continuous.

All resulting fiber-reinforced plastics were free of fiber undulations. The fibers had flowed sufficiently to the edge and no warp was found. In the outermost layer, furthermore, there were only few resin-rich incised gaps that were free of reinforcing fibers or where reinforcing fibers from the adjacent layer were exposed. Thus, they had good appearance quality and smoothness. The tensile modulus and the tensile strength were as high as 45 to 46 GPa and 580 to 640 MPa, respectively. The coefficient of variation (CV value) in tensile strength was as low as 3% to 6%. In Examples 85 and 86, on the other hand, the incisions were substantially in a continuous form and therefore, fibers were loose at the edge, leading to poor handleability during the lamination operation.

<Comparison in Terms of Thickness of Prepreg Base Material—See Table 18>

Example 87

Example 88

For an elemental prepreg base material as prepared in Example 60, the thickness of the elemental prepreg base material was changed by adjusting the weight of carbon fibers per unit area. Except for this, the same procedure as in Example 60 was carried out to produce a fiber-reinforced plastic. The weight of carbon fibers per unit area and the thickness were 50 g/m² and 0.05 mm in Example 87 and 300 g/m² and 0.3 mm in Example 88.

All resulting fiber-reinforced plastics were free of fiber undulations and the fibers had flowed sufficiently to the edge. They were free of warp. In the outermost layer, furthermore, there were only few resin-rich incised gaps that were free of reinforcing fibers or where reinforcing fibers from the adjacent layer were exposed. Thus they had good appearance quality and smoothness. The tensile modulus was a high 46 to 47 GPa. The tensile strength was a high 750 MPa in Example 87 while it was a slightly low 370 MPa in Example 88. In all cases, the coefficient of variation (CV value) in tensile strength was as low as 4 to 5%. In particular, it was found that the tensile strength is improved as the thickness of the incised prepreg base material decreases.

<Comparison in Terms of Fiber Volume Fraction—See Table 19>

Example 89

Example 90

For an elemental prepreg base material as prepared in Example 60, the volume fraction Vf of carbon fibers in the elemental prepreg base material was changed by adjusting the weight of carbon fibers per unit area. Except for this, the same procedure as in Example 60 was carried out to produce a fiber-reinforced plastic.

The weight of carbon fibers per unit area (g/m²) and the carbon fiber volume fraction Vf (%) were 146 g/m² and 65% in Example 89 and 101 g/m² and 45% in Example 90, respectively.

In Example 89, the resulting fiber-reinforced plastic suffered slight fiber undulations and the fibers had not flowed sufficiently to the edge in some surface portions that underwent friction with the mold. In Example 90, the resulting fiber-reinforced plastic was free of fiber undulations and the fibers had flowed sufficiently to the edge. All fiber-reinforced plastics were free of warp, and in the outermost layer, furthermore, there were only few resin-rich incised gaps that were free of reinforcing fibers or where reinforcing fibers from the adjacent layer were exposed. Thus, they had good appearance quality and smoothness. The tensile modulus and the tensile strength were as high as 39 to 52 GPa and 490 to 630 MPa, respectively. The coefficient of variation (CV value) in tensile strength was as low as 4 to 8%. These results showed that the tensile modulus increased with an increasing fiber volume fraction Vf. However, the flowability was found to decrease undesirably as the fiber volume fraction Vf became too high.

<Comparison in Terms of Laminate Composition—See Table 20>

Example 91

Example 92

In Example 91, except for the use of a laminated base material produced as in Example 60 but with a different laminate composition, the same procedure as in Example 60 was carried out to produce a fiber-reinforced plastic. And, 16 incised prepreg base material layers as prepared in Example 60 were combined into a $[0/90]_{4S}$ cross-ply laminated base material. For use in Example 92, elemental prepreg base material layers comprising continuous fibers alone prepared in Example 60 and incised prepreg base material layers produced by making incisions in the elemental prepreg base material layers were prepared and combined into a laminated base material. Except for this, the same procedure as in Example 60 was carried out to produce a fiber-reinforced plastic.

And, 8 incision-free elemental prepreg base material layers comprising continuous fibers alone and 8 incised prepreg base material layers were combined, one on top of the other, into a $[0/C90]_{4S}$ ("C" referring to prepreg base material comprising continuous fibers alone) alternately cross-ply laminated base material.

All resulting fiber-reinforced plastics were free of fiber undulations and the fibers had flowed sufficiently to the edge. The resulting fiber-reinforced plastics, though one obtained in Example 91 was suffered slight warp, in the outermost layer, there were only few resin-rich incised gaps that were free of reinforcing fibers or where reinforcing fibers from the adjacent layer were exposed. Thus, they had good appearance quality and smoothness. The tensile modulus and the tensile strength were as high as 63 to 64 GPa and 680 to 690 MPa, respectively. The coefficient of variation (CV value) in tensile strength was as low as 4 to 5%. However, though the tensile test, which was performed in the 0° direction, gave very good mechanical characteristics, there were no fibers that were oriented in the ±45° direction, and therefore, the resulting fiber reinforced plastics were undesirably low in versatility.

Example 93

Example 94

Example 95

Except for the use of a laminate composition different from that in Example 60, the same procedure as in Example 60 was carried out in Example 93 to produce a fiber-reinforced plastic. In Example 93, 12 incised prepreg base material layers as prepared in Example 60 were combined in a pseudo-isotropic manner into a $[60/0/-60]_{2S}$ laminated base material.

In Example 94, the epoxy resin film as used in Example 60 was transferred onto resin layers and a laminated base material was produced by inserting them between incised prepreg base material layers as prepared in Example 60. Except for this, the same procedure as in Example 60 was carried out to produce a fiber-reinforced plastic. The laminated base material used in Example 94 was produced by inserting the resin layers between the 16 incised prepreg base material layers as prepared in Example 60 in a pseudo-isotropic manner to provide a $[45/R/0/R/-45/R/90/R]_{2S}$ ("R" denoting resin layer) laminated base material. The final fiber volume fraction Vf was 49%.

In Example 95, plain weave prepreg base material layers having a fiber volume fraction Vf of 55% and a layer thickness of 250 μm were prepared by impregnation of the epoxy resin used in Example 60 and a laminated base material was produced by adding them as the outermost layers to the incised prepreg base material prepared in Example 60. Except for this, the same procedure as in Example 60 was carried out to produce a fiber-reinforced plastic. The laminated base material used in Example 95 was produced by piling the 16 incised prepreg base material layers prepared in Example 60 in a pseudo-isotropic manner and adding the plain weave prepreg base material layers with 0° and 90° fiber orientation directions on top of the former to provide a $[WF\ 0/45/0/-45/90]_{2S}$ ("WF" denoting plain weave prepreg base material) laminated base material.

All resulting fiber-reinforced plastics in Examples 93 and 94 were free of fiber undulations. The fibers had flowed sufficiently to the edge. In the fiber-reinforced plastic produced in Example 94, in particular, the fibers had a very high flowability and had extended extremely uniformly. All resulting fiber-reinforced plastics were free of warp, and in the outermost layer, furthermore, there were only few resin-rich incised gaps that were free of reinforcing fibers or where reinforcing fibers from the adjacent layer were exposed. Thus, they had good appearance quality and smoothness.

Their tensile modulus and tensile strength were as high as 47 GPa and 42 GPa, and 580 MPa and 510 MPa, respectively, corresponding to the values of the fiber volume fraction Vf. The coefficient of variation (CV value) in tensile strength was as low as 6% and 4%, respectively.

In the fiber-reinforced plastic obtained in Example 95, no flow was seen in the plain weave portions in the outermost layers, but sufficiently flow to the edge took place in portions between the plain weave ones. Some fiber undulations were seen particularly at the edge, and at fiber's cut edges, there were some resin-rich incised gaps that were free of reinforcing fibers or where reinforcing fibers from the adjacent layer were exposed. As whole, however, the product was free of warp and had good appearance quality and smoothness. The tensile modulus and tensile strength were 54 GPa and 670 MPa, respectively. Thus, the hybrid composition served to achieve high mechanical characteristics.

Example 96

The same procedure as in Example 60 was carried out to prepare a resin film. Then, the resin film was applied to both sides of a sheet of carbon fibers oriented in one direction as in Example 60, followed by heating and pressing to a degree where the carbon fibers were not completely impregnated with the resin, providing a semi-impregnated prepreg base material that has a carbon fiber weight per unit area of 125 g/m² and fiber volume fraction Vf of 55%.

The same procedure as in Example 60 was carried out to make incisions in this semi-impregnated prepreg base material as shown in FIG. 11. Though the central portion in the thickness direction was left un-impregnated with the resin, the resulting incised prepreg base material was free of fiber fuzzing caused incisions and fiber separation and had a sufficient handleability as in Example 60. Then, lamination and molding were carried out as in Example 60 to produce a fiber-reinforced plastic.

The resulting fiber-reinforced plastic was free of fiber undulations and the fibers had flowed uniformly to the edge. Furthermore, it was free of warp and it had good appearance quality and smoothness. The tensile modulus and the tensile strength were as high as 46 GPa and 550 MPa, respectively. The coefficient of variation (CV value) in tensile strength was as low as 7%.

<Comparison of Two-Face Incision Prepreg Base Material—Table 21>

Example 97

Example 98

Example 99

In the step for making incisions in the elemental prepreg base material as in Example 60, the incisions were formed from the top and bottom faces of the elemental prepreg base material without penetrating the layer. Except for this, the same procedure as in Example 60 was carried out to produce a fiber-reinforced plastic. A cutting apparatus CA18 as shown in FIG. 18 was used to make incisions in elemental prepreg base materials. The rotary roller 181 provided with a helical blade 182 exposed over a predetermined length on the roller surface was pressed against the top face and subsequently the bottom face of the elemental prepreg base material RP18 to make incisions C18 that did not penetrate the elemental prepreg base material RP18.

The thickness of the two-face incision prepreg base material produced, the cutting depth of the incisions made from the top face of the two-face incision prepreg base material and the cutting depth of the incisions made from the bottom face are referred as H, U and D, respectively.

In Example 97, the cutting depth U is 35 μm and this value is equal to 0.28H. The cutting depth D is 100 μm and this value is equal to 0.8H.

In Example 98, the cutting depth U is 55 μm and this value is equal to 0.44H. The cutting depth D is 75 μm and this value is equal to 0.6H.

In Example 99, both the cutting depths U and D are 67 μm and this value is equal to 0.54H.

In the incised prepreg base material, the incisions in the top face and the incisions in the bottom face were at an oblique angle of 10° and −10°. In the incised prepreg base material, all fibers were cut by either the top incisions or the bottom incisions and had a fiber segment length L of 30 mm or less.

All resulting fiber-reinforced plastics were free of fiber undulations and the fibers had flowed sufficiently to the edge. The resulting fiber-reinforced plastics, though one obtained in Example 99 suffered slight warp, in the outermost layer, there were only few resin-rich incised gaps that were free of reinforcing fibers or where reinforcing fibers from the adjacent layer were exposed. Thus, all resulting fiber-reinforced plastics had good appearance quality and smoothness. The tensile modulus was in the range of 45 to 46 GPa, roughly as expected theoretically. The tensile strength was 650 to 750 MPa, which is sufficiently high as compared with the values in Example 60. In particular, the tensile strength was found to increase with a decreasing difference between the number of incisions in the top face and that in the bottom face. This is likely to be attributed to the fact that the thickness of the fiber's cut edge is minimized when the number of incisions in the top is equal to that in the bottom face.

Example 100

The elemental prepreg base material produced in Example 60 was used to prepare a two-face incision prepreg base material in which the incisions in the top face and those in the bottom face were at 10° and −10°, respectively, from the fiber direction. Two of such prepreg base material as prepared above were combined into a two-layer laminated base material. A laminated base material as in Example 60 was produced by using the resulting two-layer laminated base material as one prepreg base material layer. The laminated base material thus produced was molded to provide a fiber-reinforced plastic. If the two-layer laminated base material is seen as one prepreg base material layer, both the cutting depth U of the incisions in the top face (the depth denoted by Hs in FIG. 21) and the cutting depth D of the incisions in the bottom face (the depth denoted by Hs in FIG. 21) are 125 μm, which is equal to 0.5H.

The resulting fiber-reinforced plastic was free of fiber undulations, and in the outermost layer, furthermore, there were only few resin-rich incised gaps that were free of reinforcing fibers or where reinforcing fibers from the adjacent layer were exposed. Thus, the resulting fiber-reinforced plastic had good appearance quality and smoothness. The tensile modulus was in the range of 47 GPa, roughly as expected theoretically. The tensile strength was 690 MPa, which is sufficiently high as compared with the values in Example 60 and Examples 97 to 99 despite a two-fold thickness per layer. The coefficient of variation (CV value) in tensile strength was as low as 4%. The achievement of a high strength is likely to be attributed to the fact that the fibers in this structure are at such an angle to the adjacent incisions as to prevent the opening of the incisions.

<Comparison of Sloped-Incision Prepreg Base Material— See Table 22>

Example 101

Example 102

Example 103

Example 104

Example 105

Incisions were formed in an elemental prepreg base material as produced in Example 60, and a shear force was applied to the resulting incised prepreg base material in its thickness direction to incline the incisions from the thickness direction. Except for this, the same procedure as in Example 60 was carried out to produce a fiber-reinforced plastic. Vertical incisions penetrating the elemental prepreg base material were formed as in Example 60, and the resulting incised prepreg base material was allowed to pass through a nip roller comprising an upper rotary roller and a lower rotary roller having different rotating speeds so that the upper rotary roller and the lower rotary roller would be applied respectively to the top and the bottom face of the prepreg base material. The prepreg base material heated and softened at a temperature of 60° C. as it was fed to the nip roller. A shear force was applied to the prepreg base material by the nip roller and as a result, the cut planes in the reinforcing fiber segments, which were originally in the thickness direction of the prepreg base material, were inclined from the thickness direction.

The shear distance S is defined as the distance 223 measured in the fiber direction between the cut line in the reinforcing fibers in the top face and that in the bottom face of the sloped-incision prepreg base material P22 (see FIG. 22). A specimen having an area 250×250 mm is cut out of the sloped incision prepreg base material P22 and the shear distance S is measured for 5 incisions. Their average is substituted in Formula I to calculate the angle 222 of the incisions, i.e., inclination angle Θa.

The shear distance S was 12.5 mm and the inclination angle Θa was 0.6° in Example 101. The shear distance S was 6.25 mm and the inclination angle Θa was 1.1° in Example 102. The shear distance S was 1 mm and the inclination angle Θa was 7.1° in Example 103. The shear distance S was 0.5 mm and the inclination angle Θa was 1.4° in Example 104. The shear distance S was 0.25 mm and the inclination angle Θa was 27° in Example 105.

All resulting fiber-reinforced plastics were free of fiber undulations. The resulting fiber-reinforced plastics, though one produced in Example 101 suffered slight warp, in the outermost layer, there were only few resin-rich incised gaps that were free of reinforcing fibers or where reinforcing fibers from the adjacent layer were exposed. Thus, all resulting fiber-reinforced plastics had good appearance quality and smoothness. The tensile modulus was in the range of 46 to 47 GPa, roughly as expected theoretically. The tensile strength was 580 MPa in Example 101, 620 MPa in Example 102, 620 MPa in Example 103, 610 MPa in Example 104 and 590 MPa in Example 105, which are roughly equal to or higher than the values in Example 60. In Example 101 where the inclination angle Θa of the fiber's cut edges was less than 1°, however, the shear distance S was very large and the variation in the shear distance S among different incisions was also large, indicating that the stability of the molding process was low.

<Comparison in Terms of Area of Additional Resin—See Table 23>

Example 106

A non-woven fabric to be used to form an additional resin layer was prepared as follows. That is, pellets of a copolymerized polyamide resin (Amilan (registered trademark) CM4000 produced by Toray Industries, Inc., a polyamide 6/66/610 copolymer having a melting point of 155° C.) were processed by melt-blowing to produce a non-woven fabric having a resin weight per unit area of 30 g/m². The polyamide resin was solid in an atmosphere of 25° C., and it was impossible to measure its viscosity. The resulting non-woven fabric base material was free of tackiness. The resulting non-woven fabric base material was cut into a tape having a width of 0.2 mm. The tape-like non-woven fabric base material was applied over both faces of an incised prepreg base material prepared as in Example 60 to cover all continuous incisions in such a manner that the incisions came at the center of the tapes, covering a ±0.1 mm width from each incision measured in the fiber direction. The tackiness of the epoxy resin made served to allow the non-woven fabric base material to be adhered to the prepreg base material by simple pressing.

Thus, the resulting composite prepreg base material (resin-layer-added prepreg base material) had an overall fiber volume fraction Vf of 53%. Such composite incision prepreg base material layers were combined to produce a laminated base material, and the resulting laminated base material was molded to provide a fiber-reinforced plastic.

This one-layer composite incision prepreg base material was placed in an oven and, without applying a pressure, cured at a temperature of 130° C. for a processing time of 2 hours, followed by cutting to observe the cross section. In the material, portions free of the additional resin layer had an average thickness of 125 μm while those having the additional resin layer on both sides had an average thickness of 175 μm though the layer thickness was not uniform because of the use of the non-woven fabric as material for the additional resin layer.

A portion having the additional resin layer on both sides was cut in the vertical direction to the fibers, and the section was observed with an optical microscope. It was shown that the additional resin layer existed around the reinforcing fibers at a depth of about 10 μm from the layer surface of the prepreg base material. In comparison with the entire prepreg base material, the additional resin layer accounted for only 10% or less of the area of the cross section. Substantially, the additional resin layer did not enter into the prepreg base material layer and the average thickness of the additional resin layer was about 25 μm.

The resulting fiber-reinforced plastic was free of fiber undulations, and in the outermost layer, furthermore, there were only few resin-rich incised gaps that were free of reinforcing fibers or where reinforcing fibers from the adjacent layer were exposed. Thus, the resulting fiber-reinforced plastic had good appearance quality and smoothness. The tensile modulus was 45 GPa and the tensile strength was 580 MPa, which are at the same level as in Example 60. It is likely that the non-woven fabric tape used as the additional resin was too narrow to cover all incisions completely.

Example 107

Example 108

Except for the use of a different size of the non-woven fabric base material to form the additional resin layer, the same procedure as in Example 106 was carried out to produce a fiber-reinforced plastic. The tape-like non-woven fabric base material had a width of 3 mm in Example 107 and 20 mm in Example 108. The non-woven fabric tape was applied over prepreg base material to cover the incisions in such a manner that the incisions came at the center of the width of the tapes. The distance from the incisions to the edge of the non-woven fabric tape measured in the orientation direction of the fibers was ±1.5 mm in Example 107 and ±10 mm in Example 108. It was found that the additional resin applied formed a layer as in Example 106 and did not enter into the prepreg base material layer. The additional resin layer had an average thickness of about 25 μm.

All resulting fiber-reinforced plastics were free of fiber undulations, and in the outermost layer, furthermore, there were only few resin-rich incised gaps that were free of reinforcing fibers or where reinforcing fibers from the adjacent layer were exposed. Thus, all resulting fiber-reinforced plastics had good appearance quality and smoothness. The tensile modulus was in the slightly low range of 37 to 44 GPa, but the tensile strength was 590 to 680 MPa, which are higher than those in Example 60. In Example 108, the tensile modulus and the tensile strength tended to decrease slightly with an increasing area covered by the additional resin.

Example 109

A non-woven fabric base material to be used to form an additional resin layer was prepared as in Example 106 and applied over both entire faces of the prepreg base material produced in Example 60. Except for this, the same procedure as in Example 60 was carried out to produce a fiber-reinforced plastic. It was found that the additional resin applied formed a layer as in Example 106 and did not enter into the prepreg base material layer. The additional resin layer had an average thickness of about 25 μm.

The resulting fiber-reinforced plastic was free of fiber undulations, and in the outermost layer, furthermore, there were only few resin-rich incised gaps that were free of reinforcing fibers or where reinforcing fibers from the adjacent layer were exposed. Thus, the resulting fiber-reinforced plastic had good appearance quality and smoothness. The tensile strength was 590 MPa, which are at the same level as in Example 60. The tensile modulus largely decreased to 34 GPa as a result of a decrease in fiber volume fraction Vf. But, the additional resin having a high tensile elongation was applied over the entire inner faces, and this served to enhance the durability against out-of-plane loads.

<Comparison in Terms of Laminate Composition—See Table 20>

Reference Example 3

Reference Example 4

Except the use of a laminated base material as prepared in Example 60 but with a different laminate composition, the same procedure as in Example 60 was carried out to produce a fiber-reinforced plastic. For use in Reference Example 3, 8 incised prepreg base material layers as prepared in Example 60 were combined in the same direction to produce a $[0]_8$ laminated base material. For Reference Example 4, 16 incised prepreg base material layers as prepared in Example 60 were combined to produce a $[0/45]_{4S}$ laminated base material.

In the fiber-reinforced plastic produced in Reference Example 3, it was found that the fibers had flowed only in the 90° direction while substantially no flow had taken place in the 0° direction though fibers were protruded like cirri in some portions. Gaps in the cavity in the 0° direction contained resin that had been squeezed out and the resulting fiber-reinforced plastic had also poor appearance quality. In the resulting fiber-reinforced plastic in Reference Example 4, the fibers had flowed over the entire cavity, but the flow of fibers was anisotropy as in the case of the laminate composition, resulting in large fiber undulations. In addition, the resulting fiber-reinforced plastic suffered large warp. In all resulting fiber-reinforced plastics, the outermost layer contained some resin-rich incised gaps that were free of reinforcing fibers or where reinforcing fibers from the adjacent layer were exposed.

Comparative Examples are described below.

<Comparison in Terms of Fiber Segment Length—See Table 16>

Comparative Example 10

Comparative Example 11

Except for the use of an incision pattern as used in Example 60 but with a different incision interval L (the fiber segment length), the same procedure as in Example 60 was carried out to produce a fiber-reinforced plastic. The fiber segment length L was 7.5 mm in Comparative Example 10 and 120 mm in Comparative Example 11.

In Comparative Example 10, the resulting fiber-reinforced plastic was free of fiber undulations and the fibers had flowed sufficiently to the edge. It was free of warp and thus, it had good appearance quality and smoothness. However, the tensile strength was 4400 MPa, which is lower as compared with Example 60 and Examples 77 to 79. In the resulting fiber-reinforced plastic in Comparative Example 11, the fibers had not flowed over the entire face of the mold cavity, leaving resin-rich portions at the edge. The resulting fiber-reinforced plastic also suffered fiber undulations and warp.

<Comparison in Terms of Thickness of the Prepreg Base Material—See Table 18>

Comparative Example 12

Comparative Example 13

For a prepreg base material as prepared in Example 60, the thickness of the elemental prepreg base material was changed by adjusting the weight of carbon fibers per unit area. Except for this, the same procedure as in Example 60 was carried out to produce a fiber-reinforced plastic.

The weight of carbon fibers per unit area (g/m$^2$) and the thickness (mm) were 25 g/m$^2$ and 0.025 mm in Comparative example 12 and 400 g/m$^2$ and 0.4 mm in Comparative Example 13.

All resulting fiber-reinforced plastics were free of fiber undulations and the fibers had flowed sufficiently to the edge. They were free of warp and thus, they had good appearance quality and smoothness. In Comparative Example 12, however, the prepreg base material was very thin to make the production cost of the fiber-reinforced plastic very high. And it was found that in Comparative Example 13, the resulting fiber-reinforced plastic had a significantly low tensile strength of 320 MPa as compared with Example 60 and Examples 87 and 88.

<Comparison in Terms of Fiber Volume Fraction—See Table 19>

Comparative Example 14

Comparative Example 15

For an elemental prepreg base material as prepared in Example 60, the carbon fiber volume fraction Vf was changed by adjusting the weight of carbon fibers per unit area. Except for this, the same procedure as in Example 60 was carried out to produce a fiber-reinforced plastic. The weight of carbon fibers per unit area (g/m$^2$) and the fiber volume fraction Vf (%) were 158 g/m$^2$ and 70% in Comparative Example 14 and 90 g/m$^2$ and 40% in Comparative Example 15, respectively.

The resulting fiber-reinforced plastic in Comparative Example 14 suffered fiber undulations and the fibers had not flowed to the edge in some surface portions that underwent friction with the mold. Resin was absent in some surface portions, and the plastic had poor appearance quality as well as significant warp. The resulting fiber-reinforced plastic in Comparative Example 15 was free of warp and had good appearance quality and smoothness. However, the tensile modulus and the tensile strength were 36 GPa and 440 MPa, respectively, which are significantly lower than the values obtained in Example 60 and Examples 89 and 90.

TABLE 1

| Level | | Reinforcing fiber | Matrix resin | Type of base material | Vf (%) | Laminated base material Laminate structure |
|---|---|---|---|---|---|---|
| Example | 1 | CF | Epoxy resin | Prepreg base material with controlled incisions | 55 | [45/0/−45/90]2s |
| Comparative Example | 1 | | | Continuous fibers prepreg base material | 55 | [45/0/−45/90]2s |
| | 2 | | | 30 mm chopped strands SMC | 55 | Random |
| | 3 | | Unsaturated polyester | 30 mm chopped strands SMC | 40 | Random |
| | 4 | GF | | 30 mm chopped strands SMC | 40 | Random |

| Level | | FRP Fiber length (mm) | Moldability Charge rate (%) | Pressing time (min) | Flow-ability | Warp | Mechanical properties Tensile modulus (GPa) | Tensile strength (MPa) | CV (%) |
|---|---|---|---|---|---|---|---|---|---|
| Example | 1 | 30 | 70 | 30 | ○ | ○ | 43 | 430 | 4 |
| Comparative Example | 1 | Continuous | 70 | 30 | x | x | — | — | — |
| | 2 | 30 | 70 | 30 | ○ | Δ | 33 | 220 | 12 |
| | 3 | 30 | 70 | 10 | ○ | Δ | 30 | 160 | 16 |
| | 4 | 30 | 70 | 10 | ○ | Δ | 15 | 180 | 14 |

TABLE 2

| Level | | Prepreg base material | | | | | |
|---|---|---|---|---|---|---|---|
| | Reinforcing fiber | Matrix resin | Reaction accelerator | Fiber length L (mm) | Incision length W (mm) | Layer thickness H (μm) | Vf (%) |
| Example 1 | CF | Epoxy resin | 3-(3,4-dichlorophenyl)-1,1-dimethylurea | 30 | 5.1 | 125 | 55 |
| 2 | | | 2,4-toluene bis(dimethylurea) | 30 | 5.1 | 125 | 55 |
| 3 | | | 4,4-methylene bis(phenyl dimethylurea) | 30 | 5.1 | 125 | 55 |
| 4 | | Polyamide | — | 30 | 5.1 | 125 | 55 |
| 5 | | Modified PP | — | 30 | 5.1 | 125 | 55 |
| 6 | GF | Epoxy resin | 3-(3,4-dichlorophenyl)-1,1-dimethylurea | 30 | 5.1 | 125 | 55 |

| Level | Laminated base material | | | | | |
|---|---|---|---|---|---|---|
| | Laminate structure | Shift to fiber length direction (mm) | Shift to perpendicular to fiber direction (mm) | FRP Fiber length (mm) | FRP Incision length (mm) | FRP Layer thickness (μm) |
| Example 1 | [45/0/−45/90]2s | 15 | 5 | 30 | 6.1 | 87 |
| 2 | [45/0/−45/90]2s | 15 | 5 | 30 | 6.1 | 87 |
| 3 | [45/0/−45/90]2s | 15 | 5 | 30 | 6.1 | 87 |
| 4 | [45/0/−45/90]2s | 15 | 5 | 30 | 6.1 | 87 |
| 5 | [45/0/−45/90]2s | 15 | 5 | 30 | 6.1 | 87 |
| 6 | [45/0/−45/90]2s | 15 | 5 | 30 | 6.1 | 87 |

| Level | Moldability | | | | Mechanical properties | | |
|---|---|---|---|---|---|---|---|
| | Charge rate (%) | Pressing time (min) | Flow-ability | Warp | Tensile modulus (GPa) | Tensile strength (MPa) | CV (%) |
| Example 1 | 70 | 30 | ○ | ○ | 43 | 430 | 4 |
| 2 | 70 | 3 | ○ | ○ | 44 | 430 | 5 |
| 3 | 70 | 3 | ○ | ○ | 44 | 430 | 5 |
| 4 | 70 | — | Δ | Δ | — | — | — |
| 5 | 70 | — | Δ | Δ | — | — | — |
| 6 | 70 | 30 | ○ | ○ | 27 | 340 | 2 |

TABLE 3

| Level | Prepreg base material | | | |
|---|---|---|---|---|
| | Fiber length L (mm) | Incision length W (mm) | Layer thickness H (μm) | Vf (%) |
| Example 7 | 30 | 5.1 | 125 | 55 |
| 1 | 30 | 5.1 | 125 | 55 |
| 8 | 30 | 5.1 | 125 | 55 |
| 9 | 30 | 5.1 | 125 | 55 |

| Level | Laminated base material | | | | | |
|---|---|---|---|---|---|---|
| | Laminate structure | Shift to fiber length direction (mm) | Shift to perpendicular to fiber direction (mm) | FRP Fiber length (mm) | FRP Incision length (mm) | FRP Layer thickness (μm) |
| Example 7 | [45/0/−45/90]2s | 15 | 5 | 30 | 7.2 | 62 |
| 1 | [45/0/−45/90]2s | 15 | 5 | 30 | 6.1 | 87 |

TABLE 3-continued

|   | | | | | | |
|---|---|---|---|---|---|---|
| 8 | [45/0/−45/90]2s | 15 | 5 | 30 | 5.7 | 100 |
| 9 | [45/0/−45/90]2s | 15 | 5 | 30 | 5.1 | 125 |

| | Moldability | | | | Mechanical properties | | |
|---|---|---|---|---|---|---|---|
| Level | Charge rate (%) | Pressing time (min) | Flowability | Warp | Tensile modulus (GPa) | Tensile strength (MPa) | CV (%) |
| Example 7 | 50 | 30 | ○ | Δ | 43 | 510 | 6 |
| 1 | 70 | 30 | ○ | ○ | 43 | 430 | 4 |
| 8 | 80 | 30 | ○ | ○ | 44 | 400 | 4 |
| 9 | 100 | 30 | — | ○ | 44 | 360 | 3 |

TABLE 4

| | | Prepreg base material | | | |
|---|---|---|---|---|---|
| Level | | Fiber length L (mm) | Incision length W (mm) | Layer thickness H (μm) | Vf (%) |
| Comparative Example | 5 | 7.5 | 5.1 | 125 | 55 |
| Example | 10 | 15 | 5.1 | 125 | 55 |
| | 1 | 30 | 5.1 | 125 | 55 |
| | 11 | 45 | 5.1 | 125 | 55 |
| | 12 | 60 | 5.1 | 125 | 55 |
| | 13 | 90 | 5.1 | 125 | 55 |
| Comparative Example | 6 | 120 | 5.1 | 125 | 55 |

| | | Laminated base material | | | FRP | | |
|---|---|---|---|---|---|---|---|
| Level | | Laminate structure | Shift to fiber length direction (mm) | Shift to perpendicular to fiber direction (mm) | Fiber length (mm) | Incision length (mm) | Layer thickness (μm) |
| Comparative Example | 5 | [45/0/−45/90]2s | 3.75 | 5 | 7.5 | 6.1 | 87 |
| Example | 10 | [45/0/−45/90]2s | 7.5 | 5 | 15 | 6.1 | 87 |
| | 1 | [45/0/−45/90]2s | 15 | 5 | 30 | 6.1 | 87 |
| | 11 | [45/0/−45/90]2s | 22.5 | 5 | 45 | 6.1 | 87 |
| | 12 | [45/0/−45/90]2s | 30 | 5 | 60 | 6.1 | 87 |
| | 13 | [45/0/−45/90]2s | 45 | 5 | 90 | 6.1 | 87 |
| Comparative Example | 6 | [45/0/−45/90]2s | 60 | 5 | 120 | 6.1 | 87 |

| | | Moldability | | | | Mechanical properties | | |
|---|---|---|---|---|---|---|---|---|
| Level | | Charge rate (%) | Pressing time (min) | Flowability | Warp | Tensile modulus (GPa) | Tensile strength (MPa) | CV (%) |
| Comparative Example | 5 | 70 | 30 | ○ | ○ | 43 | 320 | 5 |
| Example | 10 | 70 | 30 | ○ | ○ | 43 | 390 | 4 |
| | 1 | 70 | 30 | ○ | ○ | 43 | 430 | 4 |
| | 11 | 70 | 30 | ○ | ○ | 43 | 420 | 5 |
| | 12 | 70 | 30 | ○ | ○ | 44 | 520 | 6 |
| | 13 | 70 | 30 | Δ | ○ | 44 | 490 | 8 |
| Comparative Example | 6 | 70 | 30 | x | Δ | — | — | — |

TABLE 5

| | | Prepreg base material | | | |
|---|---|---|---|---|---|
| Level | | Fiber length L (mm) | Incision length W (mm) | Layer thickness H (μm) | Vf (%) |
| Example | 14 | 30 | 15.1 | 125 | 55 |
| | 15 | 30 | 10.1 | 125 | 55 |

TABLE 5-continued

|   | | | | |
|---|---|---|---|---|
| 1  | 30 | 5.1   | 125 | 55 |
| 16 | 30 | 2.6   | 125 | 55 |
| 17 | 30 | 1.35  | 125 | 55 |
| 18 | 30 | 0.725 | 125 | 55 |
| 19 | 30 | 0.412 | 125 | 55 |
| 20 | 30 | 0.05  | 125 | 55 |
| 21 | 30 | 0.025 | 125 | 55 |

| | | Laminated base material | | | | |
|---|---|---|---|---|---|---|
| | | | Shift to fiber | Shift to perpendicular | FRP | | |
| Level | | Laminate structure | length direction (mm) | to fiber direction (mm) | Fiber length (mm) | Incision length (mm) | Layer thickness (μm) |
| Example | 14 | [45/0/−45/90]2s | 15 | 15    | 30 | 18.0 | 87 |
|         | 15 | [45/0/−45/90]2s | 15 | 10    | 30 | 12.1 | 87 |
|         | 1  | [45/0/−45/90]2s | 15 | 5     | 30 | 6.1  | 87 |
|         | 16 | [45/0/−45/90]2s | 15 | 2.5   | 30 | 3.1  | 87 |
|         | 17 | [45/0/−45/90]2s | 15 | 1.25  | 30 | 1.6  | 87 |
|         | 18 | [45/0/−45/90]2s | 15 | 0.625 | 30 | 0.9  | 87 |
|         | 19 | [45/0/−45/90]2s | 15 | 0.312 | 30 | 0.5  | 87 |
|         | 20 | [45/0/−45/90]2s | 15 | 0.03  | 30 | 0.1  | 87 |
|         | 21 | [45/0/−45/90]2s | 15 | 0.02  | 30 | —    | 87 |

| | | Moldability | | | | Mechanical properties | | |
|---|---|---|---|---|---|---|---|---|
| Level | | Charge rate (%) | Pressing time (min) | Flowability | Warp | Tensile modulus (GPa) | Tensile strength (MPa) | CV (%) |
| Example | 14 | 70 | 30 | ○ | ○ | 44 | 400 | 3 |
|         | 15 | 70 | 30 | ○ | ○ | 43 | 410 | 4 |
|         | 1  | 70 | 30 | ○ | ○ | 43 | 430 | 4 |
|         | 16 | 70 | 30 | ○ | ○ | 43 | 460 | 4 |
|         | 17 | 70 | 30 | ○ | ○ | 43 | 520 | 3 |
|         | 18 | 70 | 30 | ○ | ○ | 44 | 560 | 4 |
|         | 19 | 70 | 30 | ○ | ○ | 44 | 620 | 3 |
|         | 20 | 70 | 30 | ○ | ○ | 45 | 660 | 6 |
|         | 21 | 70 | 30 | Δ | ○ | 45 | 640 | 10 |

TABLE 6

| | | Prepreg base material | | | |
|---|---|---|---|---|---|
| Level | | Fiber length L (mm) | Incision length W (mm) | Layer thickness H (μm) | Vf (%) |
| Comparative Example | 7  | 30 | 5.1 | 25  | 55 |
| Example             | 22 | 30 | 5.1 | 50  | 55 |
|                     | 23 | 30 | 5.1 | 100 | 55 |
|                     | 1  | 30 | 5.1 | 125 | 55 |
|                     | 24 | 30 | 5.1 | 150 | 55 |
|                     | 25 | 30 | 5.1 | 200 | 55 |
|                     | 26 | 30 | 5.1 | 300 | 55 |

| | | Laminated base material | | | | |
|---|---|---|---|---|---|---|
| | | | Shift to fiber | Shift to perpendicular | FRP | | |
| Level | | Laminate structure | length direction (mm) | to fiber direction (mm) | Fiber length (mm) | Incision length (mm) | Layer thickness (μm) |
| Comparative Example | 7  | [45/0/−45/90]2s | 15 | 5 | 30 | 6.1 | 17  |
| Example             | 22 | [45/0/−45/90]2s | 15 | 5 | 30 | 6.1 | 35  |
|                     | 23 | [45/0/−45/90]2s | 15 | 5 | 30 | 6.1 | 70  |
|                     | 1  | [45/0/−45/90]2s | 15 | 5 | 30 | 6.1 | 87  |
|                     | 24 | [45/0/−45/90]2s | 15 | 5 | 30 | 6.1 | 105 |
|                     | 25 | [45/0/−45/90]2s | 15 | 5 | 30 | 6.1 | 140 |
|                     | 26 | [45/0/−45/90]2s | 15 | 5 | 30 | 6.1 | 210 |

TABLE 6-continued

| | | Moldability | | | | Mechanical properties | | |
|---|---|---|---|---|---|---|---|---|
| Level | | Charge rate (%) | Pressing time (min) | Flow-ability | Warp | Tensile modulus (GPa) | Tensile strength (MPa) | CV (%) |
| Comparative Example | 7 | 70 | 30 | ○ | ○ | 45 | 600 | 10 |
| Example | 22 | 70 | 30 | ○ | ○ | 44 | 550 | 5 |
| | 23 | 70 | 30 | ○ | ○ | 43 | 480 | 3 |
| | 1 | 70 | 30 | ○ | ○ | 43 | 430 | 4 |
| | 24 | 70 | 30 | ○ | ○ | 43 | 400 | 4 |
| | 25 | 70 | 30 | ○ | ○ | 43 | 330 | 2 |
| | 26 | 70 | 30 | ○ | ○ | 43 | 270 | 5 |

TABLE 7

| | | Prepreg base material | | | |
|---|---|---|---|---|---|
| Level | | Fiber length L (mm) | Incision length W (mm) | Layer thickness H (μm) | Vf (%) |
| Comparative Example | 8 | 30 | 5.1 | 125 | 70 |
| Example | 27 | 30 | 5.1 | 125 | 65 |
| | 28 | 30 | 5.1 | 125 | 60 |
| | 1 | 30 | 5.1 | 125 | 55 |
| | 29 | 30 | 5.1 | 125 | 50 |
| | 30 | 30 | 5.1 | 125 | 45 |
| Comparative Example | 9 | 30 | 5.1 | 125 | 40 |

| | | Laminated base material | | | FRP | | |
|---|---|---|---|---|---|---|---|
| Level | | Laminate structure | Shift to fiber length direction (mm) | Shift to perpendicular to fiber direction (mm) | Fiber length (mm) | Incision length (mm) | Layer thickness (μm) |
| Comparative Example | 8 | [45/0/−45/90]2s | 15 | 5 | 30 | 6.1 | 87 |
| Example | 27 | [45/0/−45/90]2s | 15 | 5 | 30 | 6.1 | 87 |
| | 28 | [45/0/−45/90]2s | 15 | 5 | 30 | 6.1 | 87 |
| | 1 | [45/0/−45/90]2s | 15 | 5 | 30 | 6.1 | 87 |
| | 29 | [45/0/−45/90]2s | 15 | 5 | 30 | 6.1 | 87 |
| | 30 | [45/0/−45/90]2s | 15 | 5 | 30 | 6.1 | 87 |
| Comparative Example | 9 | [45/0/−45/90]2s | 15 | 5 | 30 | 6.1 | 87 |

| | | Moldability | | | | Mechanical properties | | |
|---|---|---|---|---|---|---|---|---|
| Level | | Charge rate (%) | Pressing time (min) | Flowability | Warp | Tensile modulus (GPa) | Tensile strength (MPa) | CV (%) |
| Comparative Example | 8 | 70 | 30 | x | Δ | — | — | — |
| Example | 27 | 70 | 30 | Δ | ○ | 49 | 460 | 8 |
| | 28 | 70 | 30 | ○ | ○ | 46 | 440 | 4 |
| | 1 | 70 | 30 | ○ | ○ | 43 | 430 | 4 |
| | 29 | 70 | 30 | ○ | ○ | 40 | 400 | 4 |
| | 30 | 70 | 30 | ○ | ○ | 36 | 360 | 3 |
| Comparative Example | 9 | 70 | 30 | ○ | ○ | 33 | 320 | 7 |

TABLE 8

| | | Prepreg base material | | | | |
|---|---|---|---|---|---|---|
| Level | | Resin impregnation | Fiber length L (mm) | Incision length W (mm) | Layer thickness H (μm) | Vf (%) |
| Reference Example | 1 | Complete | 30 | 5.1 | 125 | 55 |
| | 2 | | 30 | 5.1 | 125 | 55 |

TABLE 8-continued

| Level | | | | | | |
|---|---|---|---|---|---|---|
| Example | 31 | | 30 | 5.1 | 125 | 55 |
| | 32 | | 30 | 5.1 | 125 | 55 |
| | 33 | | 30 | 5.1 | 125 | 55 |
| | 1 | | 30 | 5.1 | 125 | 55 |
| | 34 | | 30 | 5.1 | 125 | 49 |
| | 35 | | 30 | 5.1 | 125 | 55 |
| | 36 | Semi | 30 | 5.1 | 125 | 55 |

| | | Laminated base material | | FRP | | |
|---|---|---|---|---|---|---|
| Level | | Laminate structure | Shift to fiber length direction (mm) | Shift to perpendicular to fiber direction (mm) | Fiber length (mm) | Incision length (mm) | Layer thickness (μm) |
| Reference | 1 | [0]8 | 15 | 5 | 30 | 7.3 | 87 |
| Example | 2 | [0/45]4s | 15 | 5 | 30 | 6.1 | 87 |
| Example | 31 | [0/90]4s | 15 | 5 | 30 | 6.1 | 87 |
| | 32 | [0/C90]4s | 15 | 5 | 30 | 7.3 | 87 |
| | 33 | [60/0/−60]2s | 15 | 5 | 30 | 6.1 | 87 |
| | 1 | [45/0/−45/90]2s | 15 | 5 | 30 | 6.1 | 87 |
| | 34 | [45/R/0/R/−45/R/90/R]2s | 15 | 5 | 30 | 6.1 | 87 |
| | 35 | [WF0/45/0/−45/90]2s | 15 | 5 | 30 | 6.1 | — |
| | 36 | [45/0/−45/90]2s | 15 | 5 | 30 | 6.1 | 87 |

| | | Moldability | | | | Mechanical properties | | |
|---|---|---|---|---|---|---|---|---|
| Level | | Charge rate (%) | Pressing time (min) | Flowability | Warp | Tensile modulus (GPa) | Tensile strength (MPa) | CV (%) |
| Reference | 1 | 70 | 30 | x | x | — | — | — |
| Example | 2 | 70 | 30 | Δ | x | — | — | — |
| Example | 31 | 70 | 30 | ○ | Δ | 59 | 500 | 2 |
| | 32 | 70 | 30 | ○ | ○ | 60 | 510 | 3 |
| | 33 | 70 | 30 | ○ | ○ | 44 | 420 | 5 |
| | 1 | 70 | 30 | ○ | ○ | 43 | 430 | 3 |
| | 34 | 70 | 30 | ○ | ○ | 39 | 370 | 3 |
| | 35 | 70 | 30 | Δ | ○ | 52 | 490 | 6 |
| | 36 | 70 | 30 | ○ | ○ | 43 | 440 | 5 |

TABLE 9

| | | Prepreg base material | | | | | |
|---|---|---|---|---|---|---|---|
| Level | | Fiber length L (mm) | Incision length W (mm) | Layer thickness H (μm) | Vf (%) | Cut depth U (μm) | Cut depth D (μm) |
| Example | 1 | 30 | 5.1 | 125 | 55 | 125 | — |
| | 37 | 30 | 5.1 | 125 | 55 | 35 | 100 |
| | 38 | 30 | 5.1 | 125 | 55 | 55 | 75 |
| | 39 | 30 | 5.1 | 125 | 55 | 67 | 67 |
| | 9 | 30 | 5.1 | 125 | 55 | 125 | — |
| | 40 | 30 | 5.1 | 125 | 55 | 35 | 100 |
| | 41 | 30 | 5.1 | 125 | 55 | 55 | 75 |
| | 42 | 30 | 5.1 | 125 | 55 | 67 | 67 |

| | | Laminated base material | FRP | | |
|---|---|---|---|---|---|
| Level | | Laminate structure | Fiber length (mm) | Incision length (mm) | Layer thickness (μm) |
| Example | 1 | [45/0/−45/90]2s | 30 | 6.1 | 87 |
| | 37 | [45/0/−45/90]2s | 30 | 6.1 | 87 |
| | 38 | [45/0/−45/90]2s | 30 | 6.1 | 87 |
| | 39 | [45/0/−45/90]2s | 30 | 6.1 | 87 |
| | 9 | [45/0/−45/90]2s | 30 | 5.1 | 125 |
| | 40 | [45/0/−45/90]2s | 30 | 5.1 | 125 |
| | 41 | [45/0/−45/90]2s | 30 | 5.1 | 125 |
| | 42 | [45/0/−45/90]2s | 30 | 5.1 | 125 |

TABLE 9-continued

| | | | Moldability | | | Mechanical properties | | |
| --- | --- | --- | --- | --- | --- | --- | --- | --- |
| Level | | Charge rate (%) | Pressing time (min) | Flowability | Warp | Tensile modulus (GPa) | Tensile strength (MPa) | CV (%) |
| Example | 1 | 70 | 30 | ○ | ○ | 43 | 430 | 4 |
| | 37 | 70 | 30 | ○ | Δ | 43 | 480 | 3 |
| | 38 | 70 | 30 | ○ | ○ | 44 | 540 | 4 |
| | 39 | 70 | 30 | ○ | ○ | 44 | 580 | 2 |
| | 9 | 100 | 30 | — | ○ | 44 | 360 | 3 |
| | 40 | 100 | 30 | — | Δ | 43 | 400 | 5 |
| | 41 | 100 | 30 | — | ○ | 44 | 460 | 2 |
| | 42 | 100 | 30 | — | ○ | 44 | 490 | 4 |

TABLE 10

| | | Prepreg base material | | | | | |
| --- | --- | --- | --- | --- | --- | --- | --- |
| Level | | Fiber length L (mm) | Incision length W (mm) | Layer thickness H (μm) | Vf (%) | Shear distance (mm) | Incision's oblique angle θa (°) |
| Example | 43 | 30 | 5.1 | 125 | 55 | 12.5 | 0.6 |
| | 44 | 30 | 5.1 | 125 | 55 | 6.25 | 1.1 |
| | 45 | 30 | 5.1 | 125 | 55 | 1 | 7.1 |
| | 46 | 30 | 5.1 | 125 | 55 | 0.5 | 14 |
| | 47 | 30 | 5.1 | 125 | 55 | 0.25 | 27 |
| | 1 | 30 | 5.1 | 125 | 55 | 0 | 90 |
| | 48 | 30 | 5.1 | 125 | 55 | 12.5 | 0.6 |
| | 49 | 30 | 5.1 | 125 | 55 | 6.25 | 1.1 |
| | 50 | 30 | 5.1 | 125 | 55 | 1 | 7.1 |
| | 51 | 30 | 5.1 | 125 | 55 | 0.5 | 14 |
| | 52 | 30 | 5.1 | 125 | 55 | 0.25 | 27 |
| | 9 | 30 | 5.1 | 125 | 55 | 0 | 90 |

| | | | FRP | | |
| --- | --- | --- | --- | --- | --- |
| Level | | Laminated base material Laminate structure | Fiber length (mm) | Incision length (mm) | Layer thickness (μm) |
| Example | 43 | [45/0/−45/90]2s | 30 | 6.1 | 87 |
| | 44 | [45/0/−45/90]2s | 30 | 6.1 | 87 |
| | 45 | [45/0/−45/90]2s | 30 | 6.1 | 87 |
| | 46 | [45/0/−45/90]2s | 30 | 6.1 | 87 |
| | 47 | [45/0/−45/90]2s | 30 | 6.1 | 87 |
| | 1 | [45/0/−45/90]2s | 30 | 6.1 | 87 |
| | 48 | [45/0/−45/90]2s | 30 | 5.1 | 125 |
| | 49 | [45/0/−45/90]2s | 30 | 5.1 | 125 |
| | 50 | [45/0/−45/90]2s | 30 | 5.1 | 125 |
| | 51 | [45/0/−45/90]2s | 30 | 5.1 | 125 |
| | 52 | [45/0/−45/90]2s | 30 | 5.1 | 125 |
| | 9 | [45/0/−45/90]2s | 30 | 5.1 | 125 |

| | | Moldability | | | | Mechanical properties | | |
| --- | --- | --- | --- | --- | --- | --- | --- | --- |
| Level | | Charge rate (%) | Pressing time (min) | Flowability | Warp | Tensile modulus (GPa) | Tensile strength (MPa) | CV (%) |
| Example | 43 | 70 | 30 | ○ | Δ | 44 | 420 | 8 |
| | 44 | 70 | 30 | ○ | ○ | 45 | 460 | 3 |
| | 45 | 70 | 30 | ○ | ○ | 44 | 450 | 3 |
| | 46 | 70 | 30 | ○ | ○ | 44 | 440 | 2 |
| | 47 | 70 | 30 | ○ | ○ | 43 | 430 | 4 |
| | 1 | 70 | 30 | ○ | ○ | 43 | 430 | 4 |
| | 48 | 100 | 30 | — | Δ | 47 | 480 | 7 |
| | 49 | 100 | 30 | — | ○ | 47 | 460 | 3 |
| | 50 | 100 | 30 | — | ○ | 46 | 420 | 5 |
| | 51 | 100 | 30 | — | ○ | 45 | 380 | 7 |
| | 52 | 100 | 30 | — | ○ | 45 | 350 | 3 |
| | 9 | 100 | 30 | — | ○ | 44 | 360 | 3 |

TABLE 11

| Level | | Prepreg base material | | | | | |
|---|---|---|---|---|---|---|---|
| | | Fiber length L (mm) | Incision length W (mm) | Incision angle (°) | Incision width Ws (mm) | Layer thickness H (μm) | Vf (%) |
| Example | 53 | 30 | 5.1 | 30 | 2.55 | 125 | 55 |
| | 54 | 30 | 5.1 | 45 | 3.61 | 125 | 55 |
| | 1 | 30 | 5.1 | 90 | 5.10 | 125 | 55 |
| | 55 | 30 | 1.35 | 30 | 0.68 | 125 | 55 |
| | 56 | 30 | 1.35 | 45 | 0.95 | 125 | 55 |
| | 17 | 30 | 1.35 | 90 | 1.35 | 125 | 55 |
| | 57 | 30 | 1.35 | 30 | 0.68 | 200 | 55 |
| | 58 | 30 | 1.35 | 45 | 0.95 | 200 | 55 |
| | 59 | 30 | 1.35 | 90 | 1.35 | 200 | 55 |

| Level | | Laminated base material | | | FRP | | |
|---|---|---|---|---|---|---|---|
| | | Laminate structure | Shift to fiber length direction (mm) | Shift to perpendicular to fiber direction (mm) | Fiber length (mm) | Incision length (mm) | Layer thickness (μm) |
| Example | 53 | [45/0/−45/90]2s | 15 | 2.5 | 30 | 6.1 | 87 |
| | 54 | [45/0/−45/90]2s | 15 | 3.5 | 30 | 6.1 | 87 |
| | 1 | [45/0/−45/90]2s | 15 | 5 | 30 | 6.1 | 87 |
| | 55 | [45/0/−45/90]2s | 15 | 0.6 | 30 | 1.6 | 87 |
| | 56 | [45/0/−45/90]2s | 15 | 0.9 | 30 | 1.6 | 87 |
| | 17 | [45/0/−45/90]2s | 15 | 1.3 | 30 | 1.6 | 87 |
| | 57 | [45/0/−45/90]2s | 15 | 0.6 | 30 | 1.6 | 140 |
| | 58 | [45/0/−45/90]2s | 15 | 0.9 | 30 | 1.6 | 140 |
| | 59 | [45/0/−45/90]2s | 15 | 1.3 | 30 | 1.6 | 140 |

| Level | | Moldability | | | | Mechanical properties | | |
|---|---|---|---|---|---|---|---|---|
| | | Charge rate (%) | Pressing time (min) | Flowability | Warp | Tensile modulus (GPa) | Tensile strength (MPa) | CV (%) |
| Example | 53 | 70 | 30 | ○ | ○ | 44 | 470 | 2 |
| | 54 | 70 | 30 | ○ | ○ | 43 | 410 | 4 |
| | 1 | 70 | 30 | ○ | ○ | 43 | 430 | 4 |
| | 55 | 70 | 30 | ○ | ○ | 45 | 670 | 5 |
| | 56 | 70 | 30 | ○ | ○ | 44 | 580 | 4 |
| | 17 | 70 | 30 | ○ | ○ | 43 | 520 | 3 |
| | 57 | 70 | 30 | ○ | ○ | 44 | 600 | 6 |
| | 58 | 70 | 30 | ○ | ○ | 43 | 520 | 3 |
| | 59 | 70 | 30 | ○ | ○ | 43 | 440 | 4 |

TABLE 12

| Level | | Base material | | | | Laminated base material | FRP Opening |
|---|---|---|---|---|---|---|---|
| | | Reinforcing fiber | Matrix resin | Type of base material | Vf (%) | Laminate structure | at end of fibers |
| Example | 60 | CF | Epoxy resin | Prepreg base material having controlled incisions (continuous cut angle 10°) | 55 | [45/0/−45/90]2s | None |
| | 61 | | | Prepreg base material having controlled incisions (discontinuous cut angles 10° and −10°) | 55 | [45/0/−45/90]2s | None |
| | 62 | | | Prepreg base material having controlled incisions (discontinuous cut angle 10°) | 55 | [45/0/−45/90]2s | None |

TABLE 12-continued

| | | Moldability | | | Mechanical properties | | |
|---|---|---|---|---|---|---|---|
| Level | Charge rate (%) | Pressing time (min) | Flowability | Warp | Tensile modulus (GPa) | Tensile strength (MPa) | CV (%) |
| Example 60 | 70 | 30 | ○ | ○ | 46 | 590 | 5 |
| 61 | 70 | 30 | ○ | ○ | 46 | 550 | 4 |
| 62 | 70 | 30 | ○ | ○ | 46 | 580 | 5 |

TABLE 13

| | Prepreg base material | | |
|---|---|---|---|
| Level | Reinforcing fiber | Matrix resin | Reaction accelerator |
| Example 60 | CF | Epoxy resin | 3-(3,4-dchlorophenyl)-1,1-dimethylurea |
| 63 | | | 2,4-toluene bis(dimethlurea) |
| 64 | | | 4,4-methylene bis(phenyl dimethylurea) |
| 65 | | Polyamide | — |
| 66 | | Modified PP | — |
| 67 | GF | Epoxy resin | 3-(3,4-dchlorophenyl)-1,1-dimethylurea |

| | Prepreg base material | | | | |
|---|---|---|---|---|---|
| Level | Incision angle θb (°) | Fiber length L (mm) | Projected slit width Ws (mm) | Layer thickness H (μm) | Vf (%) |
| Example 60 | 10 | 30 | Base width | 125 | 55 |
| 63 | 10 | 30 | Base width | 125 | 55 |
| 64 | 10 | 30 | Base width | 125 | 55 |
| 65 | 10 | 30 | Base width | 125 | 55 |
| 66 | 10 | 30 | Base width | 125 | 55 |
| 67 | 10 | 30 | Base width | 125 | 55 |

| | Laminated base material | FRP | |
|---|---|---|---|
| Level | Laminate structure | Opening at end of fibers | Layer thickness (μm) |
| Example 60 | [45/0/−45/90]2s | None | 87 |
| 63 | [45/0/−45/90]2s | None | 87 |
| 64 | [45/0/−45/90]2s | None | 87 |
| 65 | [45/0/−45/90]2s | None | 87 |
| 66 | [45/0/−45/90]2s | None | 87 |
| 67 | [45/0/−45/90]2s | None | 87 |

| | | Moldability | | | Mechanical properties | | |
|---|---|---|---|---|---|---|---|
| Level | Charge rate (%) | Pressing time (min) | Flowability | Warp | Tensile Modulus (GPa) | Tensile strength (MPa) | CV (%) |
| Example 60 | 70 | 30 | ○ | ○ | 46 | 590 | 5 |
| 63 | 70 | 3 | ○ | ○ | 47 | 580 | 4 |
| 64 | 70 | 3 | ○ | ○ | 47 | 580 | 5 |
| 65 | 70 | — | Δ | Δ | — | — | — |
| 66 | 70 | — | Δ | Δ | — | — | — |
| 67 | 70 | 30 | ○ | ○ | 29 | 430 | 3 |

TABLE 14

| | Prepreg base material | | | | |
|---|---|---|---|---|---|
| Level | Incision angle θb (°) | Fiber length L (mm) | Projected slit width Ws (mm) | Layer thickness H (μm) | Vf (%) |
| Example 68 | 1 | 30 | Base width | 125 | 55 |
| 69 | 2 | 30 | Base width | 125 | 55 |
| 70 | 5 | 30 | Base width | 125 | 55 |
| 60 | 10 | 30 | Base width | 125 | 55 |
| 71 | 15 | 30 | Base width | 125 | 55 |

TABLE 14-continued

| | | | | | | |
|---|---|---|---|---|---|---|
| | 72 | 25 | 30 | Base width | 125 | 55 |
| | 73 | 45 | 30 | Base width | 125 | 55 |

| | | Laminated base material | | FRP | |
|---|---|---|---|---|---|
| Level | | Laminate structure | Opening at end of fibers | Layer thickness (μm) | |
| Example | 68 | [45/0/−45/90]2s | None | 87 | |
| | 69 | [45/0/−45/90]2s | None | 87 | |
| | 70 | [45/0/−45/90]2s | None | 87 | |
| | 60 | [45/0/−45/90]2s | None | 87 | |
| | 71 | [45/0/−45/90]2s | None | 87 | |
| | 72 | [45/0/−45/90]2s | None | 87 | |
| | 73 | [45/0/−45/90]2s | Existing | 87 | |

| | | Moldability | | | | Mechanical properties | | |
|---|---|---|---|---|---|---|---|---|
| Level | | Charge rate (%) | Pressing time (min) | Flowability | Warp | Tensile modulus (GPa) | Tensile strength (MPa) | CV (%) |
| Example | 68 | 70 | 30 | Δ | ○ | 45 | 650 | 10 |
| | 69 | 70 | 30 | ○ | ○ | 47 | 660 | 5 |
| | 70 | 70 | 30 | ○ | ○ | 47 | 640 | 6 |
| | 60 | 70 | 30 | ○ | ○ | 46 | 590 | 5 |
| | 71 | 70 | 30 | ○ | ○ | 46 | 550 | 3 |
| | 72 | 70 | 30 | ○ | ○ | 46 | 460 | 4 |
| | 73 | 70 | 30 | ○ | ○ | 45 | 330 | 4 |

TABLE 15

| | | Prepreg base material | | | | |
|---|---|---|---|---|---|---|
| Level | | Incision angle θb (°) | Fiber length L (mm) | Projected slit width Ws (mm) | Layer thickness H (μm) | Vf (%) |
| Example | 74 | 10 | 30 | Base width | 125 | 55 |
| | 60 | 10 | 30 | Base width | 125 | 55 |
| | 75 | 10 | 30 | Base width | 125 | 55 |
| | 76 | 10 | 30 | Base width | 125 | 55 |

| | | Laminated base material | | FRP | |
|---|---|---|---|---|---|
| Level | | Laminate Structure | Opening at end of fibers | Layer thickness (μm) | |
| Example | 74 | [45/0/−45/90]2s | None | 62 | |
| | 60 | [45/0/−45/90]2s | None | 87 | |
| | 75 | [45/0/−45/90]2s | None | 112 | |
| | 76 | [45/0/−45/90]2s | None | 125 | |

| | | Moldability | | | | Mechanical properties | | |
|---|---|---|---|---|---|---|---|---|
| Level | | Charge rate (%) | Pressing time (min) | Flowability | Warp | Tensile modulus (GPa) | Tensile strength (MPa) | CV (%) |
| Example | 74 | 50 | 30 | ○ | Δ | 46 | 690 | 7 |
| | 60 | 70 | 30 | ○ | ○ | 46 | 590 | 5 |
| | 75 | 90 | 30 | ○ | ○ | 47 | 520 | 3 |
| | 76 | 100 | 30 | — | ○ | 47 | 510 | 3 |

TABLE 16

| | | Prepreg base material | | | | |
|---|---|---|---|---|---|---|
| Level | | Incision angle θb (°) | Fiber length L (mm) | Projected slit width Ws (mm) | Layer thickness H (μm) | Vf (%) |
| Comparative Example | | 10 | 10 | 7.5 | Base width | 125 | 55 |
| Example | 77 | 10 | 10 | Base width | 125 | 55 |
| | 60 | 10 | 30 | Base width | 125 | 55 |
| | 78 | 10 | 60 | Base width | 125 | 55 |
| | 79 | 10 | 100 | Base width | 125 | 55 |

TABLE 16-continued

| Level | | | | | | | |
|---|---|---|---|---|---|---|---|
| Comparative Example | 11 | 10 | 120 | Base width | | 125 | 55 |

| Level | | Laminated base material Laminate structure | Opening at end of fibers | FRP Layer thickness (μm) | | | |
|---|---|---|---|---|---|---|---|
| Comparative Example | 10 | [45/0/−45/90]2s | None | 87 | | | |
| Example | 77 | [45/0/−45/90]2s | None | 87 | | | |
| | 60 | [45/0/−45/90]2s | None | 87 | | | |
| | 78 | [45/0/−45/90]2s | None | 87 | | | |
| | 79 | [45/0/−45/90]2s | None | 87 | | | |
| Comparative Example | 11 | [45/0/−45/90]2s | Existing | 87 | | | |

| Level | | Moldability | | | | Mechanical properties | | |
|---|---|---|---|---|---|---|---|---|
| | | Charge rate (%) | Pressing time (min) | Flowability | Warp | Tensile modulus (GPa) | Tensile strength (MPa) | CV (%) |
| Comparative Example | 10 | 70 | 30 | ○ | ○ | 44 | 440 | 5 |
| | | | | ○ | ○ | | | |
| Example | 77 | 70 | 30 | ○ | ○ | 46 | 510 | 4 |
| | 60 | 70 | 30 | ○ | ○ | 46 | 590 | 5 |
| | 78 | 70 | 30 | ○ | ○ | 47 | 640 | 3 |
| | 79 | 70 | 30 | Δ | ○ | 47 | 650 | 6 |
| Comparative Example | 11 | 70 | 30 | x | Δ | — | — | — |

TABLE 17

| | | Prepreg base material | | | | |
|---|---|---|---|---|---|---|
| Level | | Incision angle θb (°) | Fiber length L (mm) | Projected slit width Ws (mm) | Layer thickness H (μm) | Vf (%) |
| Example | 60 | 10 | 30 | Base width | 125 | 55 |
| | 61 | 10, −10 | 30 | 10 | 125 | 55 |
| | 80 | 10 | 30 | 0.017 | 125 | 55 |
| | 81 | 10 | 30 | 0.03 | 125 | 55 |
| | 82 | 10 | 30 | 0.17 | 125 | 55 |
| | 83 | 10 | 30 | 1 | 125 | 55 |
| | 84 | 10 | 30 | 1.5 | 125 | 55 |
| | 62 | 10 | 30 | 10 | 125 | 55 |
| | 85 | 10 | 30 | 100 | 125 | 55 |
| | 86 | 10 | 30 | 120 | 125 | 55 |

| Level | | Laminated base material Laminate structure | FRP Opening at end of fibers | Layer thickness (μm) |
|---|---|---|---|---|
| Example | 60 | [45/0/−45/90]2s | None | 87 |
| | 61 | [45/0/−45/90]2s | None | 87 |
| | 80 | [45/0/−45/90]2s | None | 87 |
| | 81 | [45/0/−45/90]2s | None | 87 |
| | 82 | [45/0/−45/90]2s | None | 87 |
| | 83 | [45/0/−45/90]2s | None | 87 |
| | 84 | [45/0/−45/90]2s | None | 87 |
| | 62 | [45/0/−45/90]2s | None | 87 |
| | 85 | [45/0/−45/90]2s | None | 87 |
| | 86 | [45/0/−45/90]2s | None | 87 |

| Level | | Moldability | | | | Mechanical properties | | |
|---|---|---|---|---|---|---|---|---|
| | | Charge rate (%) | Pressing time (min) | Flowability | Warp | Tensile modulus (GPa) | Tensile strength (MPa) | CV (%) |
| Example | 60 | 70 | 30 | ○ | ○ | 46 | 590 | 5 |
| | 61 | 70 | 30 | ○ | ○ | 46 | 550 | 4 |
| | 80 | 70 | 30 | Δ | ○ | 47 | 710 | 9 |
| | 81 | 70 | 30 | ○ | ○ | 47 | 730 | 5 |

TABLE 17-continued

| | | | | | | | |
|---|---|---|---|---|---|---|---|
| 82 | 70 | 30 | ○ | ○ | 47 | 690 | 4 |
| 83 | 70 | 30 | ○ | ○ | 47 | 640 | 6 |
| 84 | 70 | 30 | ○ | ○ | 46 | 610 | 4 |
| 62 | 70 | 30 | ○ | ○ | 46 | 580 | 5 |
| 85 | 70 | 30 | ○ | ○ | 46 | 580 | 4 |
| 86 | 70 | 30 | ○ | ○ | 45 | 580 | 3 |

TABLE 18

| | | Prepreg base material | | | | |
|---|---|---|---|---|---|---|
| Level | | Incision angle θb (°) | Fiber length L (mm) | Projected slit width Ws (mm) | Layer thickness H (μm) | Vf (%) |
| Comparative Example | 12 | 10 | 30 | Base width | 25 | 55 |
| Example | 87 | 10 | 30 | Base width | 50 | 55 |
| | 60 | 10 | 30 | Base width | 125 | 55 |
| | 88 | 10 | 30 | Base width | 300 | 55 |
| Comparative Example | 13 | 10 | 30 | Base width | 400 | 55 |

| | | Laminated base material | FRP | |
|---|---|---|---|---|
| Level | | Laminate structure | Opening at end of fibers | Layer thickness (μm) |
| Comparative Example | 12 | [45/0/−45/90]2s | None | 17 |
| Example | 87 | [45/0/−45/90]2s | None | 35 |
| | 60 | [45/0/−45/90]2s | None | 87 |
| | 88 | [45/0/−45/90]2s | None | 210 |
| Comparative Example | 13 | [45/0/−45/90]2s | None | 280 |

| | | Moldability | | | | Mechanical properties | | |
|---|---|---|---|---|---|---|---|---|
| Level | | Charge rate (%) | Pressing time (min) | Flowability | Warp | Tensile modulus (GPa) | Tensile strength (MPa) | CV (%) |
| Comparative Example | 12 | 70 | 30 | ○ | ○ | 48 | 790 | 10 |
| Example | 87 | 70 | 30 | ○ | ○ | 47 | 750 | 5 |
| | 60 | 70 | 30 | ○ | ○ | 46 | 590 | 5 |
| | 88 | 70 | 30 | ○ | ○ | 46 | 370 | 4 |
| Comparative Example | 13 | 70 | 30 | ○ | ○ | 45 | 320 | 5 |

TABLE 19

| | | Prepreg base material | | | | |
|---|---|---|---|---|---|---|
| Level | | Incision angle θb (°) | Fiber length L (mm) | Projected slit width Ws (mm) | Layer thickness H (μm) | Vf (%) |
| Comparative Example | 14 | 10 | 30 | Base width | 125 | 70 |
| Example | 89 | 10 | 30 | Base width | 125 | 65 |
| | 60 | 10 | 30 | Base width | 125 | 55 |
| | 90 | 10 | 30 | Base width | 125 | 45 |
| Comparative Example | 15 | 10 | 30 | Base width | 125 | 40 |

| | | Laminated base material | FRP | |
|---|---|---|---|---|
| Level | | Laminate structure | Opening at end of fibers | Layer thickness (μm) |
| Comparative Example | 14 | [45/0/−45/90]2s | Existing | 87 |
| Example | 89 | [45/0/−45/90]2s | None | 87 |
| | 60 | [45/0/−45/90]2s | None | 87 |
| | 90 | [45/0/−45/90]2s | None | 87 |

TABLE 19-continued

| | | | | | | |
|---|---|---|---|---|---|---|
| Comparative Example | 15 | [45/0/−45/90]2s | | None | | 87 |

| | | Moldability | | | | Mechanical properties | | |
|---|---|---|---|---|---|---|---|---|
| Level | | Charge rate (%) | Pressing time (mm) | Flowability | Warp | Tensile modulus (GPa) | Tensile strength (MPa) | CV (%) |
| Comparative Example | 14 | 70 | 30 | x | Δ | — | — | — |
| Example | 89 | 70 | 30 | Δ | ○ | 52 | 630 | 8 |
| | 60 | 70 | 30 | ○ | ○ | 46 | 590 | 5 |
| | 90 | 70 | 30 | ○ | ○ | 39 | 490 | 4 |
| Comparative Example | 15 | 70 | 30 | ○ | ○ | 36 | 440 | 7 |

TABLE 20

| | | Prepreg base material | | | | | |
|---|---|---|---|---|---|---|---|
| Level | | Resin impregnation | Incision angle $\theta b$ (°) | Fiber length L (mm) | Projected slit width Ws (mm) | Layer thickness H (μm) | Vf (%) |
| Reference Example | 3 | Complete | 10 | 30 | Base width | 125 | 55 |
| Example | 4 | | 10 | 30 | Base width | 125 | 55 |
| | 91 | | 10 | 30 | Base width | 125 | 55 |
| | 92 | | 10 | 30 | Base width | 125 | 55 |
| | 93 | | 10 | 30 | Base width | 125 | 55 |
| | 60 | | 10 | 30 | Base width | 125 | 55 |
| | 94 | | 10 | 30 | Base width | 125 | 49 |
| | 95 | | 10 | 30 | Base width | 125 | 55 |
| | 96 | Semi | 10 | 30 | Base width | 125 | 55 |

| | | Laminated base material | | FRP |
|---|---|---|---|---|
| Level | | Laminate structure | Opening at end of fibers | Layer thickness (μm) |
| Reference example | 3 | [0]8 | Existing | 87 |
| Example | 4 | [0/45]4s | Existing | 87 |
| | 91 | [0/90]4s | None | 87 |
| | 92 | [0/C90]4s | None | 87 |
| | 93 | [60/0/−60]2s | None | 87 |
| | 60 | [45/0/−45/90]2s | None | 87 |
| | 94 | [45/R/0/R/−45/R/90/R]2s | None | 87 |
| | 95 | [WF0/45/0/−45/90]2s | Existing | 87 |
| | 96 | [45/0/−45/90]2s | Existing | 87 |

| | | Moldability | | | | Mechanical properties | | |
|---|---|---|---|---|---|---|---|---|
| Level | | Charge rate (%) | Pressing time (min) | Flowability | Warp | Tensile modulus (GPa) | Tensile strength (MPa) | CV (%) |
| Reference Example | 3 | 70 | 30 | x | x | — | — | — |
| Example | 4 | 70 | 30 | Δ | x | — | — | — |
| | 91 | 70 | 30 | ○ | Δ | 63 | 680 | 4 |
| | 92 | 70 | 30 | ○ | ○ | 64 | 690 | 5 |
| | 93 | 70 | 30 | ○ | ○ | 47 | 580 | 6 |
| | 60 | 70 | 30 | ○ | ○ | 46 | 590 | 5 |
| | 94 | 70 | 30 | ○ | ○ | 42 | 510 | 4 |
| | 95 | 70 | 30 | Δ | ○ | 54 | 670 | 9 |
| | 96 | 70 | 30 | ○ | ○ | 46 | 550 | 7 |

TABLE 21

| | | Prepreg base material | | | | | | |
|---|---|---|---|---|---|---|---|---|
| Level | | Incision angle $\theta b$ (°) | Fiber length L (mm) | Projected slit width Ws (mm) | Layer thickness H (μm) | Vf (%) | Cut depth U (μm) | Cut depth D (μm) |
| Example | 60 | 10 | 30 | Base width | 125 | 55 | 125 | — |
| | 97 | 10 | 30 | Base width | 125 | 55 | 35 | 100 |

TABLE 21-continued

| | | | | | | | | |
|---|---|---|---|---|---|---|---|---|
| | 98 | 10 | 30 | Base width | 125 | 55 | 55 | 75 |
| | 99 | 10 | 30 | Base width | 125 | 55 | 67 | 67 |
| | 100 | 10 | 30 | Base width | 250 | 55 | 125 | 125 |

| | | Laminated base material | | FRP | |
|---|---|---|---|---|---|
| Level | | Laminate structure | Opening at end of fibers | Layer thickness (μm) | |
| Example | 60 | [45/0/−45/90]2s | None | 87 | |
| | 97 | [45/0/−45/90]2s | None | 87 | |
| | 98 | [45/0/−45/90]2s | None | 87 | |
| | 99 | [45/0/−45/90]2s | None | 87 | |
| | 100 | [45/0/−45/90]2s | None | 175 | |

| | | Moldability | | | | Mechanical properties | | |
|---|---|---|---|---|---|---|---|---|
| Level | | Charge rate (%) | Pressing time (min) | Flowability | Warp | Tensile modulus (GPa) | Tensile strength (MPa) | CV (%) |
| Example | 60 | 70 | 30 | ○ | ○ | 46 | 590 | 5 |
| | 97 | 70 | 30 | ○ | Δ | 45 | 650 | 10 |
| | 98 | 70 | 30 | ○ | Δ | 46 | 710 | 4 |
| | 99 | 70 | 30 | ○ | ○ | 46 | 750 | 7 |
| | 100 | 70 | 30 | ○ | ○ | 47 | 690 | 4 |

TABLE 22

| | | Prepreg base material | | | | | | |
|---|---|---|---|---|---|---|---|---|
| Level | | Incision angle θb (°) | Fiber length L (mm) | Projected slit width Ws (mm) | Layer thickness H (μm) | Vf (%) | Shear distance (mm) | Incision's oblique angle θa (°) |
| Example | 101 | 10 | 30 | Base width | 125 | 55 | 12.5 | 0.6 |
| | 102 | 10 | 30 | Base width | 125 | 55 | 6.25 | 1.1 |
| | 103 | 10 | 30 | Base width | 125 | 55 | 1 | 7.1 |
| | 104 | 10 | 30 | Base width | 125 | 55 | 0.5 | 14 |
| | 105 | 10 | 30 | Base width | 125 | 55 | 0.25 | 27 |
| | 60 | 10 | 30 | Base width | 125 | 55 | 0 | 90 |

| | | Laminated base material | | FRP | |
|---|---|---|---|---|---|
| Level | | Laminate structure | Opening at end of fibers | Layer thickness (μm) | |
| Example | 101 | [45/0/−45/90]2s | None | 87 | |
| | 102 | [45/0/−45/90]2s | None | 87 | |
| | 103 | [45/0/−45/90]2s | None | 87 | |
| | 104 | [45/0/−45/90]2s | None | 87 | |
| | 105 | [45/0/−45/90]2s | None | 87 | |
| | 60 | [45/0/−45/90]2s | None | 87 | |

| | | Moldability | | | | Mechanical properties | | |
|---|---|---|---|---|---|---|---|---|
| Level | | Charge rate (%) | Pressing time (min) | Flowability | Warp | Tensile modulus (GPa) | Tensile strength (MPa) | CV (%) |
| Example | 101 | 70 | 30 | ○ | Δ | 47 | 580 | 10 |
| | 102 | 70 | 30 | ○ | ○ | 47 | 620 | 4 |
| | 103 | 70 | 30 | ○ | ○ | 47 | 620 | 4 |
| | 104 | 70 | 30 | ○ | ○ | 46 | 610 | 3 |
| | 105 | 70 | 30 | ○ | ○ | 46 | 590 | 5 |
| | 60 | 70 | 30 | ○ | ○ | 46 | 590 | 5 |

TABLE 23

| | | Prepreg base material | | | | | |
|---|---|---|---|---|---|---|---|
| Level | | Incision angle θb (°) | Fiber length L (mm) | Projected slit width Ws (mm) | Layer thickness H (μm) | Vf (%) | Additional resin width in fiber direction (mm) |
| Example | 60 | 10 | 30 | Base width | 125 | 55 | 0 |
| | 106 | 10 | 30 | Base width | 125 | 55 | 0.1 |

TABLE 23-continued

| | | | | | | | |
|---|---|---|---|---|---|---|---|
| | 107 | 10 | 30 | Base width | 125 | 53 | 1.5 |
| | 108 | 10 | 30 | Base width | 125 | 43 | 10 |
| | 109 | 10 | 30 | Base width | 125 | 39 | 15 |

| | Laminated base material | | FRP | |
|---|---|---|---|---|
| Level | | Laminate structure | Opening at end of fibers | Layer thickness (μm) |
| Example | 60 | [45/0/−45/90]2s | None | 0 |
| | 106 | [45/0/−45/90]2s | None | 87 |
| | 107 | [45/0/−45/90]2s | None | 87 |
| | 108 | [45/0/−45/90]2s | None | 87 |
| | 109 | [45/0/−45/90]2s | None | 87 |

| | | Moldability | | | | Mechanical properties | | |
|---|---|---|---|---|---|---|---|---|
| Level | | Charge rate (%) | Pressing time (min) | Flowability | Warp | Tensile modulus (GPa) | Tensile strength (MPa) | CV (%) |
| Example | 60 | 70 | 30 | ○ | ○ | 46 | 590 | 5 |
| | 106 | 70 | 30 | ○ | ○ | 45 | 580 | 7 |
| | 107 | 70 | 30 | ○ | ○ | 44 | 680 | 4 |
| | 108 | 70 | 30 | ○ | ○ | 37 | 590 | 8 |
| | 109 | 70 | 30 | ○ | ○ | 34 | 590 | 3 |

The invention claimed is:

1. A laminated base material comprising a lamination and integration of prepreg base materials each of which comprises a multiplicity of reinforcing fibers arranged substantially in one direction and a matrix resin adhered to said reinforcing fibers, wherein 1) at least one of said laminated prepreg base materials is formed with a prepreg base material having, throughout its whole surface, a multiplicity of incisions each extending in a direction crossing the reinforcing fibers, substantially all of the reinforcing fibers are divided by incisions, 2) a length L of each of reinforcing fiber segments formed by the incisions is 10 to 100 mm, a thickness H of the prepreg base material is 30 to 300 μm, and a fiber volume content Vf of the reinforcing fibers is 45 to 65%, and arranging directions of said reinforcing fibers between one and another laminated prepreg base materials have at least two directions different from each other, and 3) each of said incisions is in the form of a slit segment having a selected length, and when said slit segment is projected in the arranging direction of said reinforcing fibers, a projected length Ws of said slit segment in the perpendicular direction of said reinforcing fibers is 30 μm to 1.5 mm.

2. The laminated base material according to claim 1, wherein the absolute value of an oblique angle Θb of each of said incisions in a face of said prepreg base material from the arranging direction of said reinforcing fibers is in the range of 2 to 25° and adjacent said slit segments in the arranging direction of said reinforcing fibers have the same geometrical shape as each other.

3. A fiber reinforced plastic comprising a laminate comprising a plurality of reinforcing fiber layers each of which comprises reinforcing fibers arranged substantially in one direction and a matrix resin, wherein at least two of said reinforcing fiber layers are laminated with their reinforcing fibers arranged in different directions, a fiber volume content Vf is 45 to 65%, and wherein at least one of the fiber-resin layers, each comprising one of said reinforcing fiber layers and said matrix resin accompanying thereto, has incised openings in an entire surface of said fiber-resin layer, each of which comprises a region in which the adjacent fiber-resin layer is not entered, said reinforcing fibers are cut by said incised openings, a length L of the reinforcing fiber segments of said cut reinforcing fibers is 10 to 100 mm, a surface area of said incised openings on the surface of said layer is 0.1 to 10% of the surface area of said layer, and an average thickness He of said layer is 15 to 300 μm.

4. The fiber reinforced plastic according to claim 3, wherein fiber cut edges cut by said incised openings are inclined from the thickness direction of said reinforcing fiber layer.

5. A prepreg base material which comprises a multiplicity of reinforcing fibers arranged substantially in one direction and a matrix resin existing between a multiplicity of reinforcing fibers, wherein the prepreg base material has, throughout its whole surface, a multiplicity of incisions each extending in a direction crossing the reinforcing fibers, substantially all of the reinforcing fibers are divided by incisions, wherein a length L of each of reinforcing fiber segments formed by the incisions is 10 to 100 mm, a thickness H of the prepreg base material is 30 to 300 μm, and a fiber volume content Vf of the reinforcing fibers is 45 to 65%, wherein the absolute value of an oblique angle Θb of each of said incisions in a face of said prepreg base material from the arranging direction of said reinforcing fibers is 2 to 25°.

6. A laminated base material comprising a lamination and integration of prepreg base materials each of which comprises a multiplicity of reinforcing fibers arranged substantially in one direction and a matrix resin adhered to said reinforcing fibers, wherein 1) at least one of said laminated prepreg base materials is formed with a prepreg base material having, throughout its whole surface, a multiplicity of incisions each extending in a direction crossing the reinforcing fibers, substantially all of the reinforcing fibers are divided by incisions, 2) a length L of each of reinforcing fiber segments formed by the incisions is 10 to 100 mm, a thickness H of the prepreg base material is 30 to 300 um, and a fiber volume Vf of the reinforcing fibers is 45 to 65%, and arranging directions of said reinforcing fibers between one and another laminated prepreg base materials have at least two directions different from each other, and 3) the absolute value of an oblique angle Θb of each of said incisions in a face of said prepreg base material from the arranging direction of said reinforcing fibers is in the range of 2 to 25°.

7. The laminated base material according to claim 6, wherein each of said incisions is continuous over the total width of said prepreg base material.

\* \* \* \* \*